US010547822B2

United States Patent
Hayasaka et al.

(10) Patent No.: US 10,547,822 B2
(45) Date of Patent: Jan. 28, 2020

(54) IMAGE PROCESSING APPARATUS AND METHOD TO GENERATE HIGH-DEFINITION VIEWPOINT INTERPOLATION IMAGE

(71) Applicant: SONY CORPORATION, Tokyo (JP)

(72) Inventors: Kengo Hayasaka, Kanagawa (JP); Katsuhisa Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 15/123,090

(22) PCT Filed: May 8, 2015

(86) PCT No.: PCT/JP2015/063267
§ 371 (c)(1),
(2) Date: Sep. 1, 2016

(87) PCT Pub. No.: WO2015/178217
PCT Pub. Date: Nov. 26, 2015

(65) Prior Publication Data
US 2017/0078637 A1 Mar. 16, 2017

(30) Foreign Application Priority Data
May 21, 2014 (JP) .................................. 2014-104941

(51) Int. Cl.
*H04N 13/111* (2018.01)
*H04N 13/243* (2018.01)
*G06T 3/40* (2006.01)

(52) U.S. Cl.
CPC ......... *H04N 13/111* (2018.05); *H04N 13/243* (2018.05); *G06T 3/4007* (2013.01)

(58) Field of Classification Search
None
See application file for complete search history.

(56) References Cited

U.S. PATENT DOCUMENTS 6,466,207 B1 10/2002 Gortler et al.
2007/0122027 A1 5/2007 Kunita et al.
(Continued)

FOREIGN PATENT DOCUMENTS

CA 2232757 A1 9/1999
CN 1809844 A 7/2006
(Continued)

OTHER PUBLICATIONS

Shade, et al., "Layered Depth Images", XP-002270434, 12 pages.
(Continued)

*Primary Examiner* — David N Werner
(74) *Attorney, Agent, or Firm* — Chip Law Group

(57) ABSTRACT

The present disclosure relates to an image processing apparatus and a method capable of generating high-definition viewpoint interpolation images at high speed. A space reconstruction unit reconstructs a space in which viewpoint images are photographed according to each viewpoint image and each disparity (pixel shift amount) map and supplying reconstruction data of the space to an interpolation position setting unit. The interpolation position setting unit sets an interpolation position in the reconstructed space while changing (an inclination of) a beam and supplies interpolation target coordinates indicating the set interpolation position to a data search unit. The data search unit generates an interpolation image at any viewpoint by sampling RGB values at interpolation target coordinates supplied from the interpolation position setting unit and outputs the generated interpolation image to a subsequent stage. The present disclosure is applicable to, for example, an image processing apparatus that performs image processing using multi-view images.

5 Claims, 36 Drawing Sheets

(56) References Cited

U.S. PATENT DOCUMENTS

| | | |
|---|---|---|
| 2009/0190852 A1 | 7/2009 | Lim et al. |
| 2011/0199379 A1 | 8/2011 | Benien et al. |
| 2013/0162634 A1 | 6/2013 | Baik |
| 2014/0218486 A1* | 8/2014 | Kobayashi ............. G03B 35/10 348/49 |
| 2015/0172623 A1* | 6/2015 | Wu ...................... H04N 13/139 348/43 |

FOREIGN PATENT DOCUMENTS

| | | | | |
|---|---|---|---|---|
| CN | 101902657 A | 12/2010 | | |
| CN | 102197415 A | 9/2011 | | |
| EP | 2180449 A1 | 4/2010 | | |
| EP | 2611182 A2 * | 7/2013 | ............ | G06T 15/00 |
| JP | 2000-215311 A | 8/2000 | | |
| JP | 2009-186369 A | 8/2009 | | |
| JP | 2009-211335 A | 9/2009 | | |
| JP | 2012-254288 A | 12/2012 | | |
| JP | 5173028 B2 | 3/2013 | | |
| JP | 2013-134787 A | 7/2013 | | |
| JP | 5986918 B2 | 9/2016 | | |
| KR | 10-2011-0074775 A | 7/2011 | | |
| KR | 10-2013-0074383 A | 7/2013 | | |
| RU | 2011120459 A | 11/2012 | | |
| TW | 201021544 A | 6/2010 | | |
| WO | 2010/046817 A1 | 4/2010 | | |

OTHER PUBLICATIONS

Kubota, et al., "Multiview Imaging and 3DTV", IEEE Signal Processing Magazine, Nov. 2007, pp. 10-21.

Extended European Search Report of EP Patent Application No. 15796608.6, dated Jun. 26, 2017, 04 pages.

Chen, et al., "View Interpolation for Image Synthesis", Apple Computer, Inc., ACM New York, 1993, pp. 279-288.

Office Action for JP Patent Application No. 2016-521029, dated May 9, 2019, 06 pages of Office Action and 05 pages of English Translation.

Office Action for CN Patent Application No. 201580011275.8, dated Feb. 12, 2018, 05 pages of Office Action and 08 pages of English Translation.

Office Action for JP Patent Application No. 2016-521029, dated Aug. 15, 2019, 07 pages of Office Action and 05 pages of English Translation.

* cited by examiner $d = \arg\min(D_L(x), D_C(x + D_L(x)))$
WHEN $D_L(x) == D_R(x + D_L(x))$  BLENDING OF TWO PARALLAXES
    $I(x+d) = (1-\alpha)L(x) + \alpha R(x)$
WHEN $D_L(x) < D_R(x + D_L(x))$  SAME COLOR/SAME BRIGHTNESS AS ONE PARALLAX
    $I(x+d) = L(x)$
WHEN $D_L(x) > D_R(x + D_L(x))$  SAME COLOR/SAME BRIGHTNESS AS ONE PARALLAX
    $I(x+d) = R(x)$

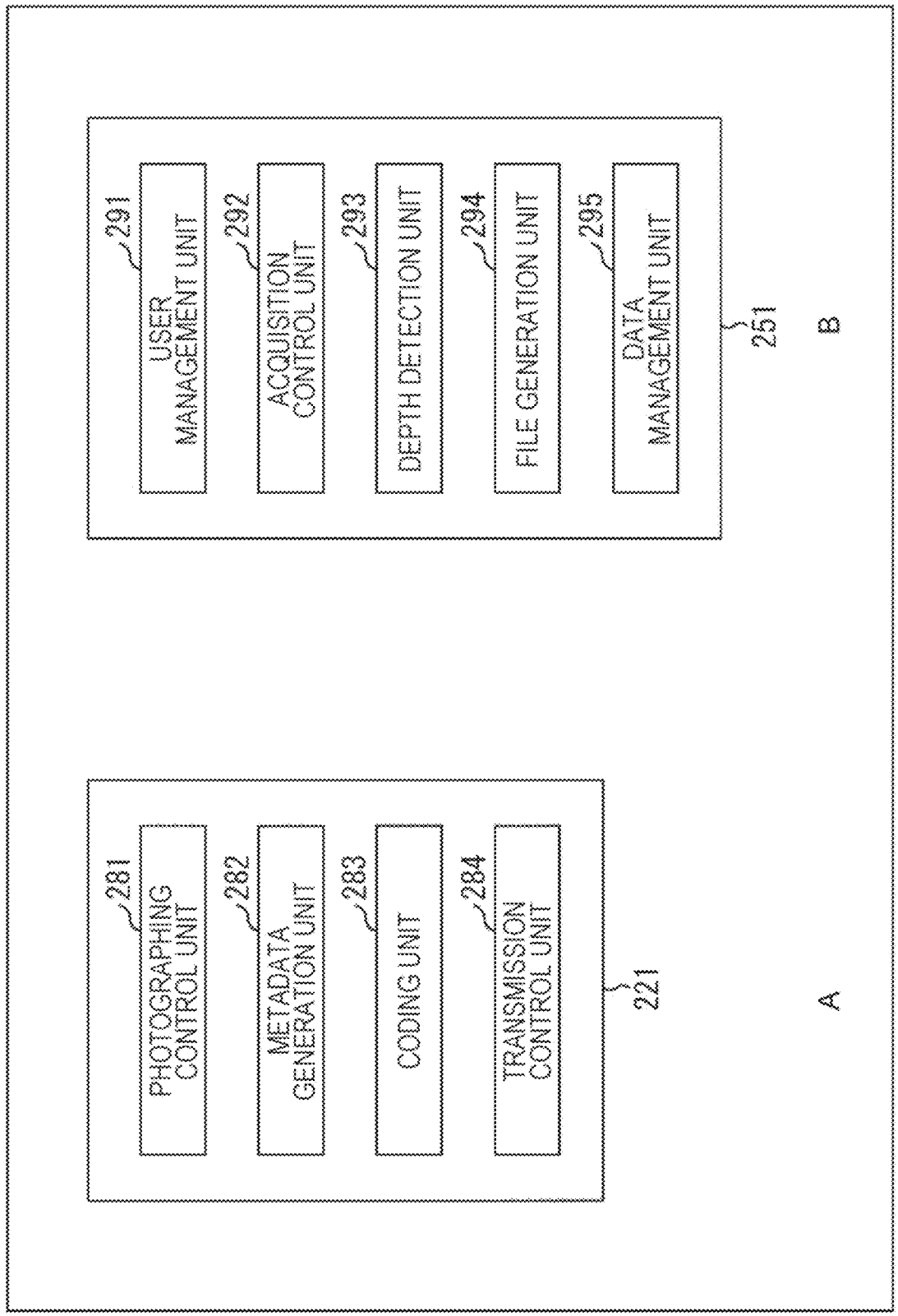

USER MANAGEMENT INFORMATION

· USER ID

· PURCHASE HISTORY

· FILE MANAGEMENT INFORMATION IDENTIFICATION INFORMATION

· FAVORITE SETTING EXPECTATION (STATISTICAL ANALYSIS)

· POINTS (MONEY)

· COMMENTS

⋮

A

302

FILE MANAGEMENT INFORMATION

· MULTI-VIEW IMAGE FILE IDENTIFICATION INFORMATION

· EDITING RESULT IMAGE IDENTIFICATION INFORMATION

· APPLICATION PARAMETER IDENTIFICATION INFORMATION

⋮

B

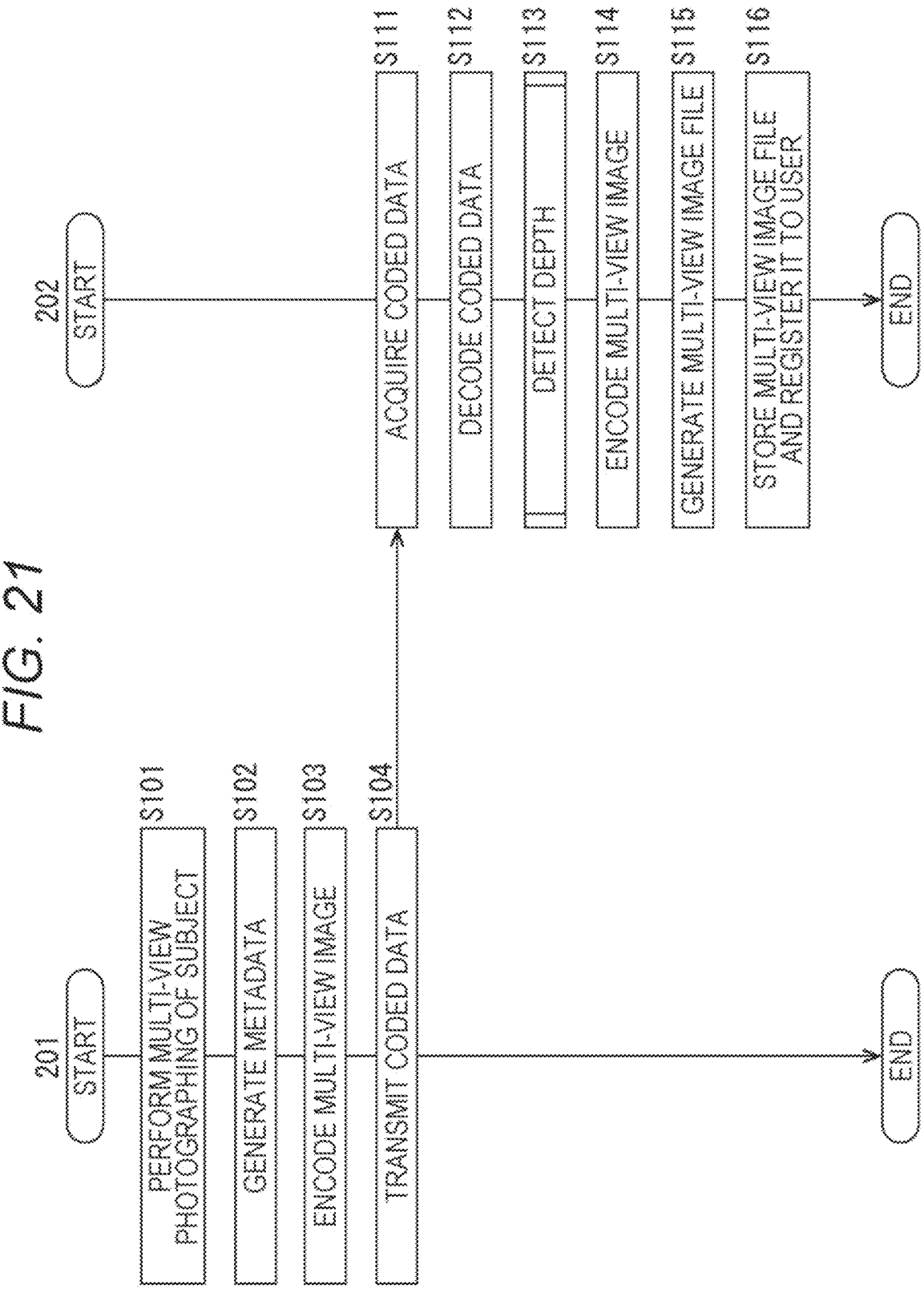

FIG. 22
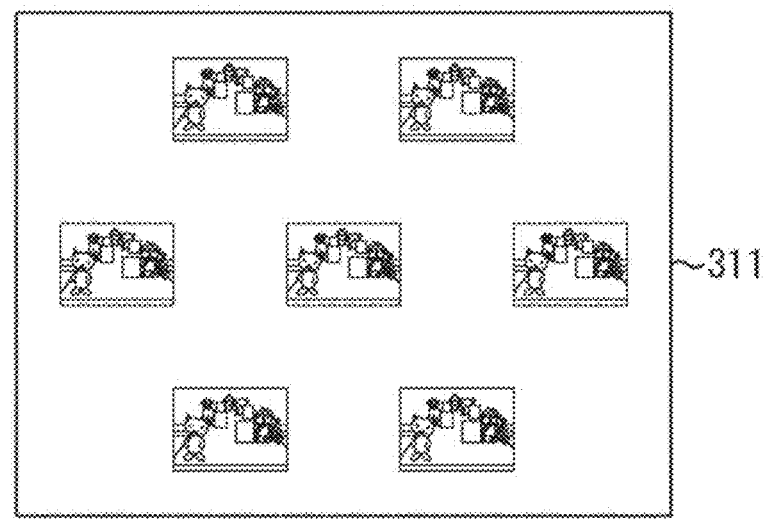
A
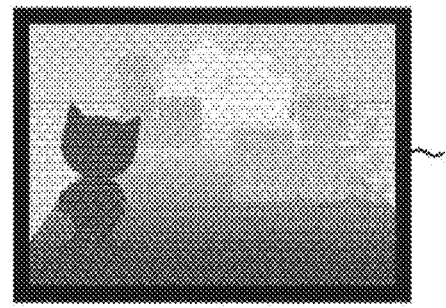
B

341 —
CAMERA MODULE INFORMATION
· RESOLUTION        : 2560 × 1920 × 1,  2048 × 1536 × 4, ⋯
· FOCAL LENGTH      : Inf. × 5, ⋯
· ISO SENSITIVITY   : ISO400 × 1,  ISO200 × 4, ⋯
· PHOTOGRAPHING DIRECTION : 180 × 5, ⋯
· SHUTTER SPEED     : 33ms × 5, ⋯
· F-VALUE           : F8 × 5, ⋯
· ANGLE OF VIEW     : 58 DEGREES × 5

342 — CAMERA ARRAY: X-TYPE

343 — NUMBER OF VIEWPOINTS: 5

344 —
CALIBRATION INFORMATION (CENTRAL COORDINATE)
   1296,  973   Camera0
   1298,  971   Camera1
   1295,  974   Camera2
   1294,  974   Camera3
   1293,  975   Camera4

A

345 —
CALIBRATION INFORMATION (LUMINANCE CORRECTION DATA INFORMATION)
CameraN: 1.25, 1.15, 1.15, 1.25
         1.20, 1.10, 1.10, 1.20
         1.20, 1.00, 1.20, 1.20
         1.20, 1.10, 1.10, 1.20
         1.25, 1.15, 1.15, 1.25

B

346 —
BASELINE LENGTH INFORMATION
   Camera0-1 : 11mm
   Camera0-2 : 12mm
   Camera0-3 : 13mm
   Camera0-4 : 11mm

C

FIG. 38
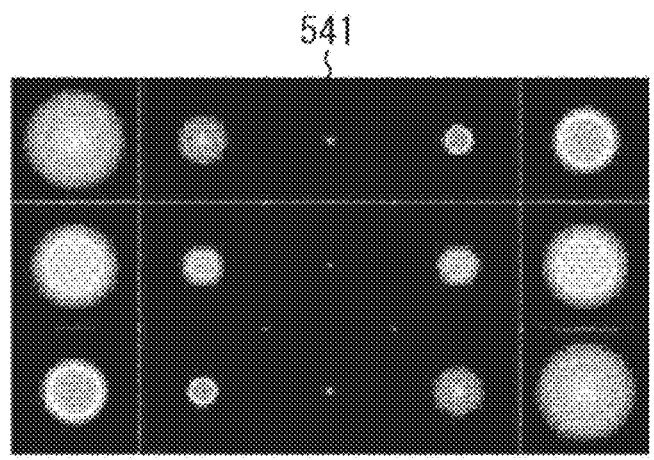
0.5m   1.0m   1.5m   2.0m   2.5m
IN-FOCUS PORTION
A
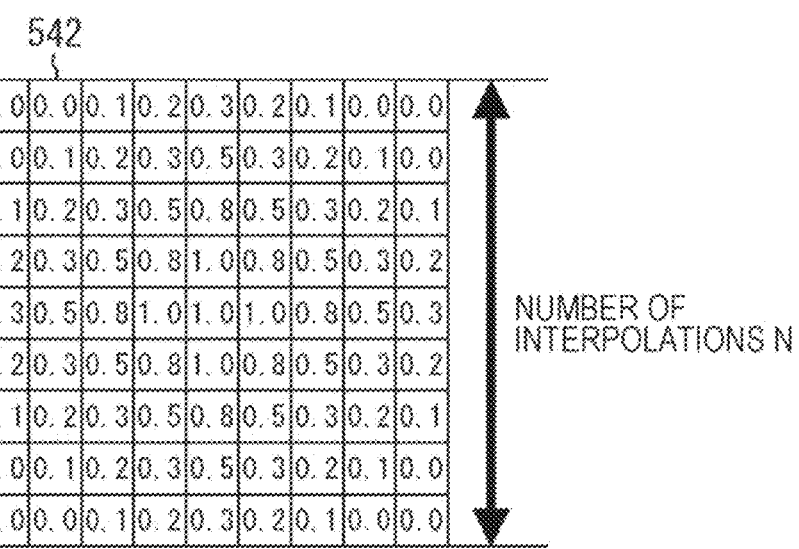
B

IMAGE PROCESSING APPARATUS AND METHOD TO GENERATE HIGH-DEFINITION VIEWPOINT INTERPOLATION IMAGE

CROSS REFERENCE TO RELATED APPLICATIONS

This application is a U.S. National Phase of International Patent Application No. PCT/JP2015/063267 filed on May 8, 2015, which claims priority benefit of Japanese Patent Application No. JP 2014-104941 filed in the Japan Patent Office on May 21, 2014. Each of the above-referenced applications is hereby incorporated herein by reference in its entirety.

TECHNICAL FIELD

The present disclosure relates to an image processing apparatus and a method, and more particularly, to an image processing apparatus and a method which are capable of generating a high-definition viewpoint interpolation image at high speed.

BACKGROUND ART

Heretofore, viewpoint interpolation techniques using various image processes have been proposed and developed. For example, Non-Patent Document 1 discloses that any viewpoint image is synthesized using the correspondence relationship (optical flow) between two images and an image position therebetween.

CITATION LIST

Patent Document

Non-Patent Document 1: Shenchang Eric Chen, "View Interpolation for Image Synthesis.", Lance Williams Apple Computer, Inc., IJCV 2002.

SUMMARY OF THE INVENTION

Problems to be Solved by the Invention

The above-mentioned processes are techniques for generating an interpolation image on the basis of depth information (a pixel shift amount between two viewpoints). However, when an interpolation image is generated, there are an overlap of the same pixel due to a foreground and a padding due to a lack of information. Accordingly, it is necessary to compare the pixel shift amounts at the same pixel for all pixels when one viewpoint image is generated.

The present disclosure has been made in view of the above-mentioned circumstances, and is capable of generating a high-definition viewpoint interpolation image at high speed.

Solutions to Problems

An image processing apparatus according to one aspect of the present disclosure includes: a reconstruction processing unit that performs processing of reconstructing a space in which multi-view images are photographed in accordance with depth information of a subject in the multi-view images; and an interpolation image generation unit that generates an interpolation image by changing an inclination of the space reconstructed by the reconstruction processing unit and sampling the reconstructed space.

The reconstruction processing unit may perform processing of reconstructing the space in which the multi-view images are photographed according to a pixel shift amount of the subject between the multi-view images as the depth information.

The reconstruction processing unit can perform processing of reconstructing the space by reflecting the luminance and disparity of another viewpoint in a space formed of the luminance of the reference viewpoint and the pixel shift amount.

When a value is already set in the same coordinates, the reconstruction processing unit may perform processing of reconstructing the space by storing an average value of RGB values as values of the coordinates.

The reconstructed space may have a value indicating a position where an occlusion occurs at any viewpoint.

The reconstructed space may have an average value of the plurality of viewpoints as a value present at the plurality of viewpoints.

The interpolation image generation unit may start sampling in a descending order of the pixel shift amount in the reconstructed space.

An image processing method according to one aspect of the present disclosure includes: performing, by an image processing apparatus, processing of reconstructing a space in which multi-view images are photographed in accordance with depth information of a subject in the multi-view images; and generating, by the image processing apparatus, an interpolation image by changing an inclination of the reconstructed space and sampling the reconstructed space.

In one aspect of the present disclosure, processing of reconstructing a space in which the multi-view images are photographed is performed in accordance with depth information of a subject in the multi-view image. Then, the reconstructed space whose inclination is changed is sampled and an interpolation image is generated.

Effects of the Invention

According to one aspect of the present disclosure, it is possible to process a multi-view image. In particular, it is possible to generate a high-definition viewpoint interpolation image at high speed.

Advantages effects described in the present specification are illustrated by way of example only, and the advantages effects of the present technology are not limited to the advantageous effects described in the present specification, and additional advantageous effects may be provided.

BRIEF DESCRIPTION OF DRAWINGS

FIG. 19 is a functional block illustrating functions included in the terminal device and the server.

FIG. 20 is a diagram illustrating an example of information managed by the server.

FIG. 21 is a flowchart showing an example of a flow of multi-view image utilization service provision processing.

FIG. 22 is a diagram showing an example of a multi-view image and depth data.

FIG. 25 is a diagram illustrating an example of metadata.

FIG. 38 is a diagram illustrating an example of a lens profile.

MODE FOR CARRYING OUT THE INVENTION

Modes for carrying out the present disclosure (hereinafter referred to as embodiments) will be explained below. Note that the explanation will be made in the following order.
1. First embodiment (an image pickup device for multi-view images)
2. Second embodiment (a multi-view image utilization service platform)
3. Third embodiment (management of multi-view images)
4. Fourth embodiment (application sales)
5. Fifth embodiment (virtual lens processing)

<1. First Embodiment>

<Configuration of an Image Pickup Device>

Figure 1:
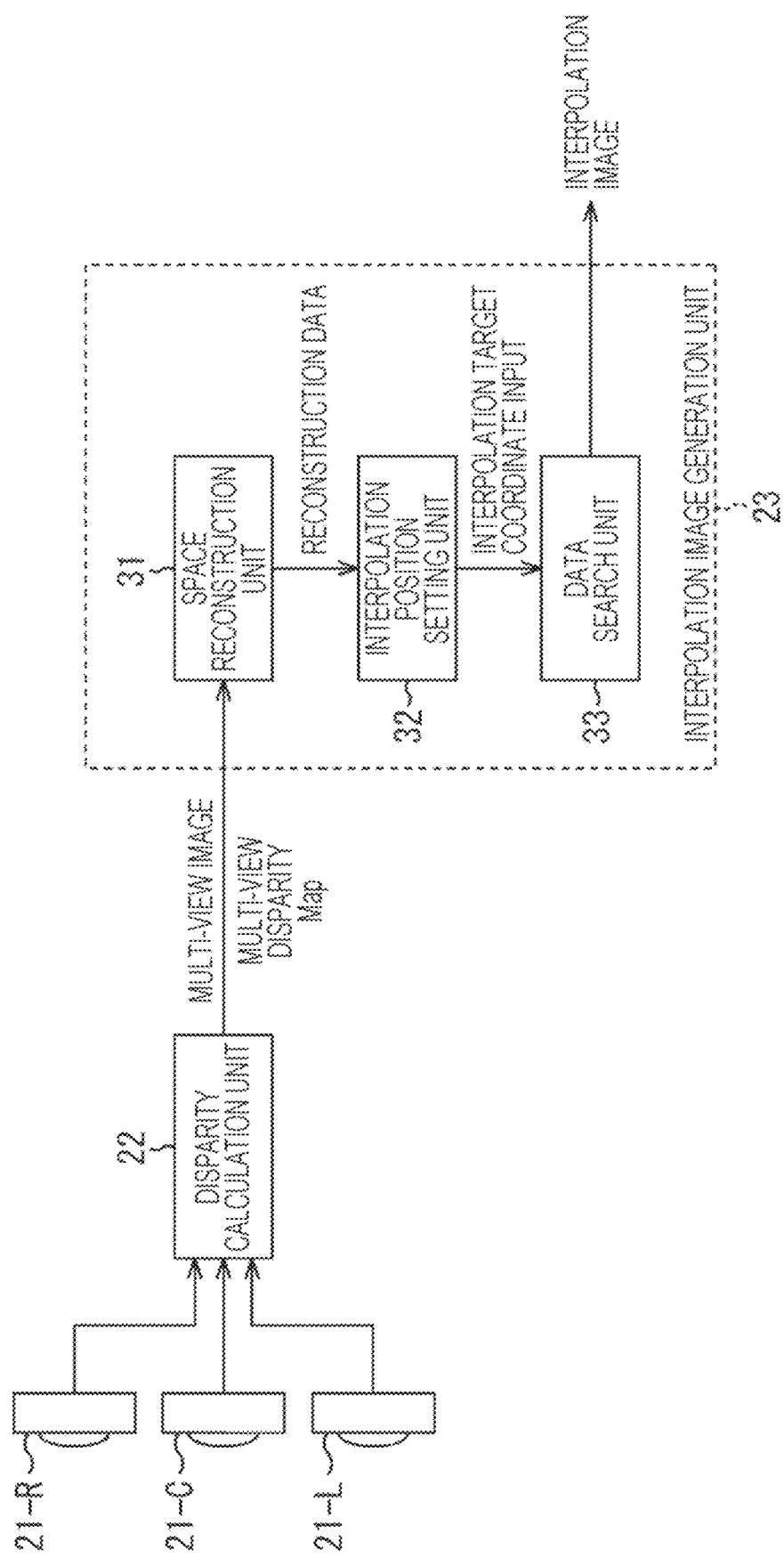
FIG. 1 is a block diagram showing a configuration example of an image pickup device to which the present technology is applied.

FIG. 1 is a block diagram showing a configuration example of an image pickup device as an image processing apparatus to which the present technology is applied. This image pickup device is an image pickup device that performs multi-view imaging using a camera array formed with a plurality of cameras in a light field imaging technique capable of ray tracing that traces the path of a beam. Note that, although FIG. 1 shows an example in which a camera array includes three cameras, the number of cameras is not limited to three.

An image pickup device 11 shown in FIG. 1 includes a camera 21-L, a camera 21-C, a camera 21-R, a disparity calculation unit 22, and an interpolation image generation unit 23.

In the example shown in FIG. 1, the camera 21-C is a camera positioned at the center; the camera 21-L is a camera positioned on the left side of the camera 21-C; and the camera 21-R is a camera positioned on the right side of the camera 21-C. When there is no need to distinguish the camera 21-L, the camera 21-C, and the camera 21-R, the cameras are generally referred to as the camera 21 as appropriate.

The viewpoint images of the camera 21-L, the camera 21-C, and the camera 21-R are input to the disparity calculation unit 22. The disparity calculation unit 22 generates each disparity map by calculating the disparity (pixel shift amount) of the subject between multi-view images by using the input viewpoint images. The disparity calculation unit 22 supplies the interpolation image generation unit 23 with the multi-view images as well as the disparity maps as multi-view disparity maps.

Note that when the viewpoint images of the camera 21-L, the camera 21-C, and the camera 21-R are distinguished from each other, the viewpoint images are hereinafter referred to as a viewpoint image L, a viewpoint image C, and a viewpoint image R, respectively. Further, the disparity maps of the calculated viewpoint image L, viewpoint image C, and viewpoint image R are referred to as Disparity Map_DL, Disparity Map_DC, Disparity Map_DR, respectively. Note that Disparity Map_DL and Disparity Map_DR can be simply generated from Disparity Map_DC.

The interpolation image generation unit 23 reconstructs a space in which viewpoint images are photographed in accordance with each viewpoint image and each disparity map, and generates an interpolation image at any viewpoint by sampling the reconstructed space while changing the inclination thereof.

The interpolation image generation unit 23 includes a space reconstruction unit 31, an interpolation position setting unit 32, and a data search unit 33.

The space reconstruction unit 31 reconstructs a space in which viewpoint images are photographed according to each viewpoint image and each disparity map. The space reconstruction unit 31 supplies reconstruction data of the space to the interpolation position setting unit 32.

The interpolation position setting unit 32 sets the interpolation position in the space reconstructed by the space reconstruction unit 31, while changing (the inclination of) a beam, and supplies interpolation target coordinates indicating the set interpolation position to the data search unit 33.

The data search unit 33 generates an interpolation image at any viewpoint by sampling RGB values at the interpolation target coordinates supplied from the interpolation position setting unit 32, and outputs the generated interpolation image to a subsequent-stage. Note that in the subsequent-stage, although not shown, in the case of the image pickup device 11 to which the light field image pickup technique is applied, ray tracing is performed using the interpolation image and the disparity map and further performs condensing processing, thereby generating a condensed image in a memory.

Note that the interpolation position setting unit 32 and the data search unit 33 in the example shown in FIG. 1 may be configured in an integrated manner.

<Example of Reconstruction of Photographing Space>

Next, the reconstruction of a photographing space will be described with reference to FIGS. 2 to 5.

Figure 2:
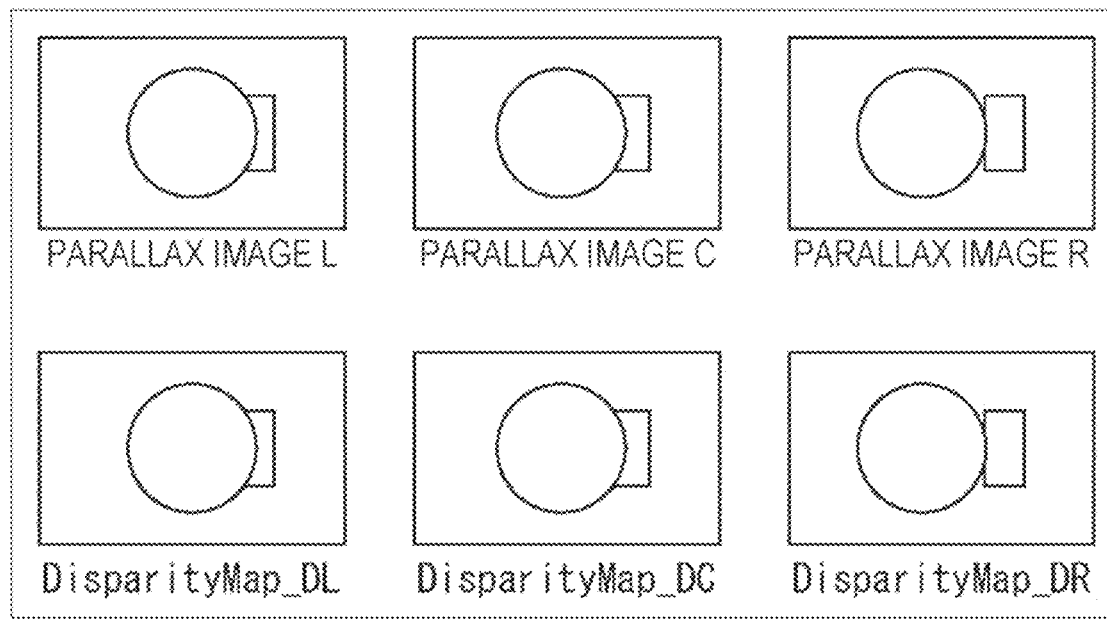
FIG. 2 is a diagram illustrating the reconstruction of a photographing space.

In the example shown in FIG. 2, the viewpoint image L, which is photographed at the viewpoint of the camera 21-L, and Disparity Map_DL of the viewpoint image are shown on the left side. The viewpoint image C, which is photographed at the viewpoint of the camera 21-C, and Disparity Map_DC of the viewpoint image are shown at the center. The viewpoint image R, which is photographed at the viewpoint of the camera 21-R, and Disparity Map_DR of the viewpoint image are shown in the right side.

The viewpoint image L, the viewpoint image C, and the viewpoint image R show that there is a round object in the foreground of the image as a subject; a rectangular object is on the right side at the back of the round object; and on the back side thereof there is a background.

The description is made assuming that the parallax image C is a reference image. Note that in each image, for example, (R, G, B, D) can be loaded from (x, y) of each viewpoint image as RGBD (D represents a disparity: a pixel shift amount) data.

In the present technology, the reconstruction of a photographing space is important. Accordingly, the viewpoint image L, the viewpoint image C, and the viewpoint image R are projected, and Disparity Map_DL and Disparity Map_DR are projected on a 3D space at the viewpoint of Disparity Map_DC in accordance with the disparity map (pixel shift amount map).

Figure 3:
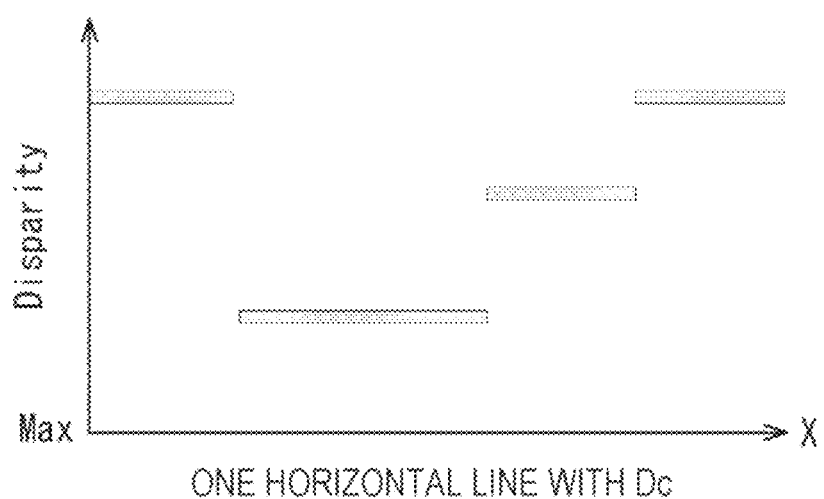
FIG. 3 is a diagram illustrating the reconstruction of the photographing space.

FIG. 3 is a multi-layer disparity map representing a disparity (pixel shift amount) in one horizontal line with Disparity Map_DC.

In the multi-layer disparity map, the disparity of the round object, which is in the foreground of the viewpoint image, is largest; the disparity of the rectangular object is second largest; and the disparity of the background is small. In other words, the disparity value is maximum at the position closest to the image; the disparity value becomes larger in a direction toward the image; and the disparity value becomes smaller in a direction away from the image.

In this case, the RGBD data of peripheral viewpoint images (in this case, the viewpoint image L and the viewpoint image R) are moved to the viewpoint of Disparity Map_DC in accordance with D (Disparity).

Figure 4:
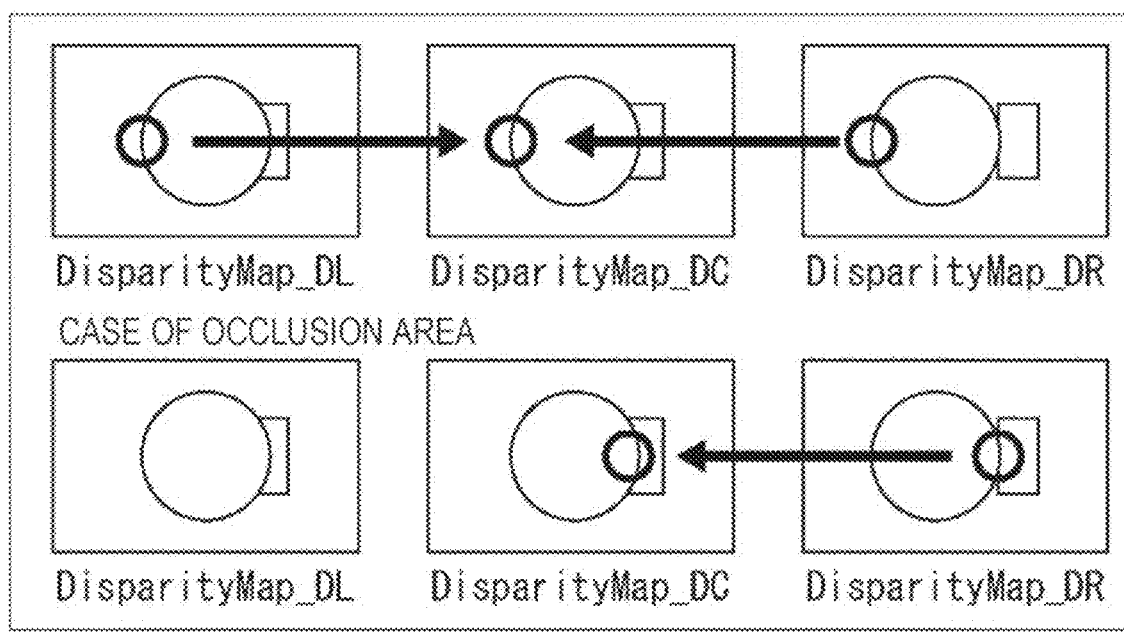
FIG. 4 is a diagram illustrating the reconstruction of the photographing space.

As shown in the upper part of FIG. 4, all overlapping points of RGB are superimposed. In the case of overlapping points, each viewpoint image is weighted on the basis of the viewpoint position to thereby obtain a luminance. For example, an average value of the luminances is set as the luminance value. Note that not only the average value, but also an intermediate value or other values may be used. Thus, noise in the generated interpolation image can be reduced.

As shown in the rectangular object shown in the lower part of FIG. 4, a surface which is called an occlusion and can be seen from any viewpoint though it cannot be seen from a certain viewpoint is developed into a memory space along the disparity.

Figure 5:
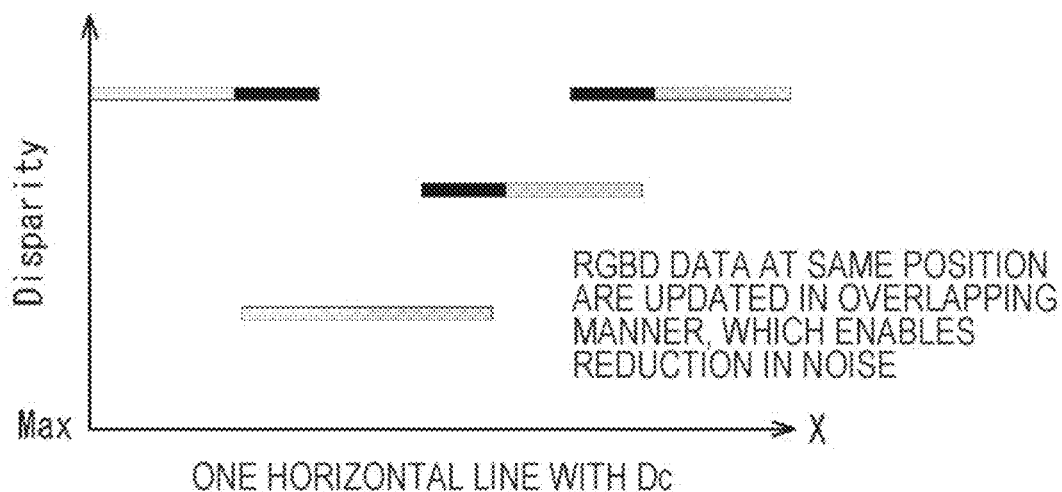
FIG. 5 is a diagram illustrating the reconstruction of the photographing space.

With these configurations, as indicated by the solid black portion shown in FIG. 5, the multi-layer disparity map for each disparity value can be created by utilizing information even in unnecessary portions. Further, in FIG. 5, the RGBD data at the same position is updated (reconstructed) in an overlapping manner, which makes it possible to reduce noise.

As described above, by developing the reference image on a 3D space, the multi-layer space which has a luminance and depth information and has a plurality of values even at the same horizontal/vertical coordinates is reconstructed.

In the reconstructed space, the case of generating a viewpoint image is equivalent to a case where the image having a small disparity value is hidden and cannot be seen. Accordingly, it is preferable that an operation be performed assuming that the luminance value with a largest disparity is effective. In other words, the disparity to be searched is started from, for example, a value MAX.

Figure 6:
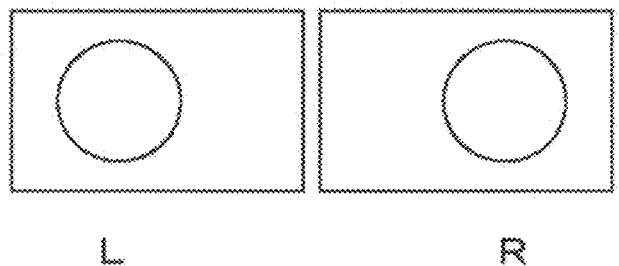
FIG. 6 is a diagram illustrating a case of interpolation on a two-dimensional plane.

Specifically, in the case of interpolation on a two-dimensional plane, as shown in FIG. 6 and Formula (1), for example, it is necessary to constantly compare the disparities of two L and R parallaxes.

[Mathematical Formula 1]

$$d = \arg\min(D_L(x), D_C(x+D_L(x)))$$

when $D_L(x) = D_R(x+D_L(x))$, blending of two parallaxes $$I(x+d) = (1-\alpha)L(x) + \alpha R(x)$$

when $D_L(x) < D_R(x+D_L(x))$, same color/same luminance as one parallax $$I(x+d) = L(x)$$

when $D_L(x) > D_R(x+D_L(x))$, same color/same luminance as one parallax $$I(x+d) = R(x) \qquad (1)$$

Note that $D_L$, $D_C$, and $D_R$ represent disparity maps of the respective viewpoints, and d represents a disparity value.

Figure 7:
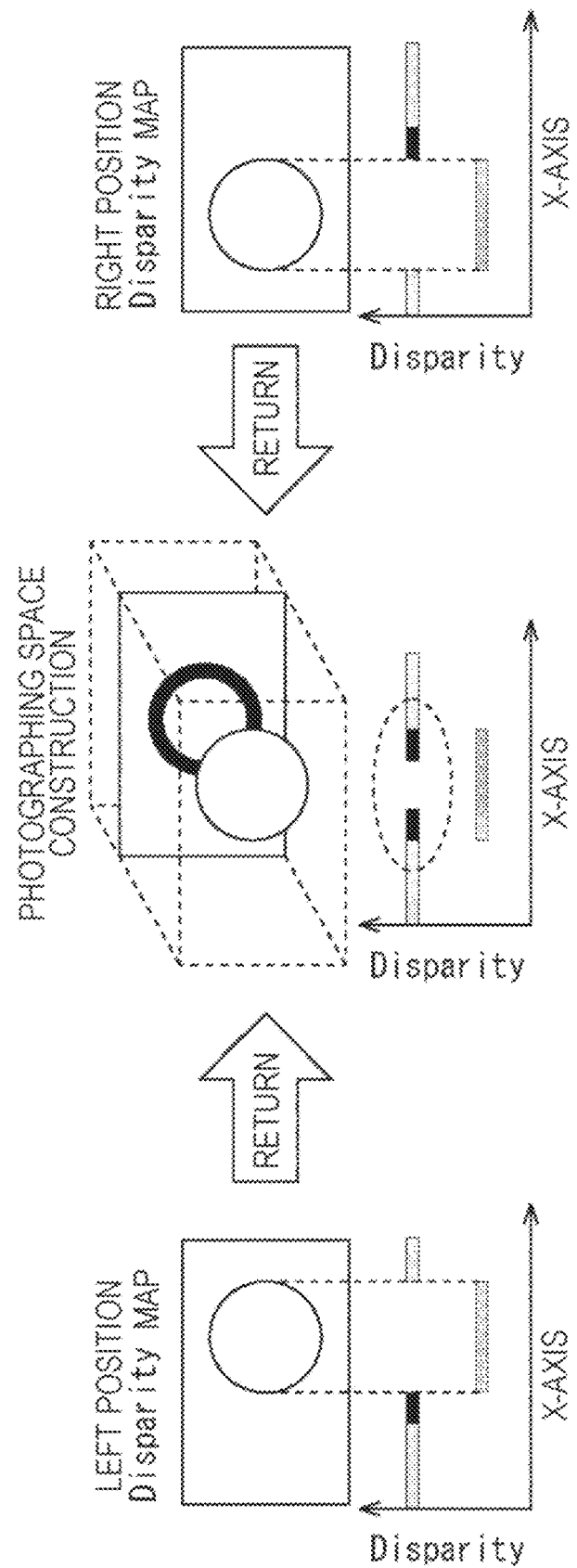
FIG. 7 is a diagram illustrating an example of a reconstructed photographing space.

On the other hand, in the present technology, the disparity map of a parallax image is developed into a three-dimensional memory space as shown in FIG. 7.

Specifically, the information about the disparity obtained from the disparity map at the left position is returned to the memory space including the disparity map at the central position. Similarly, the information about the disparity obtained from the disparity map at the right position is returned to the memory space. Accordingly, a photographing space also including information about an occlusion region is reconstructed in the memory space.

Sampling of this reconstructed photographing space from the foreground (one with a larger disparity (e.g., MAX)) is started, thereby making it possible to generate a high-definition interpolation image at high speed without the need for comparing two disparities.

Further, as the information about the memory space, RGBD (luminance information, disparity information), D+camera ID (depth information, information indicating which camera includes luminance information), and polarization information of each texture, and the like can be treated.

Note that, for example, at a viewpoint of R, the same viewpoint image is obtained by sampling the memory space with a vector inclined at 45 degrees with respect to the reconstructed photographing space shown in FIG. 7. Note that, similarly, for example, at the viewpoint of L, the same viewpoint image is obtained by sampling the memory space with a vector inclined at 135 degrees with respect to the reconstructed photographing space.

Figure 8:
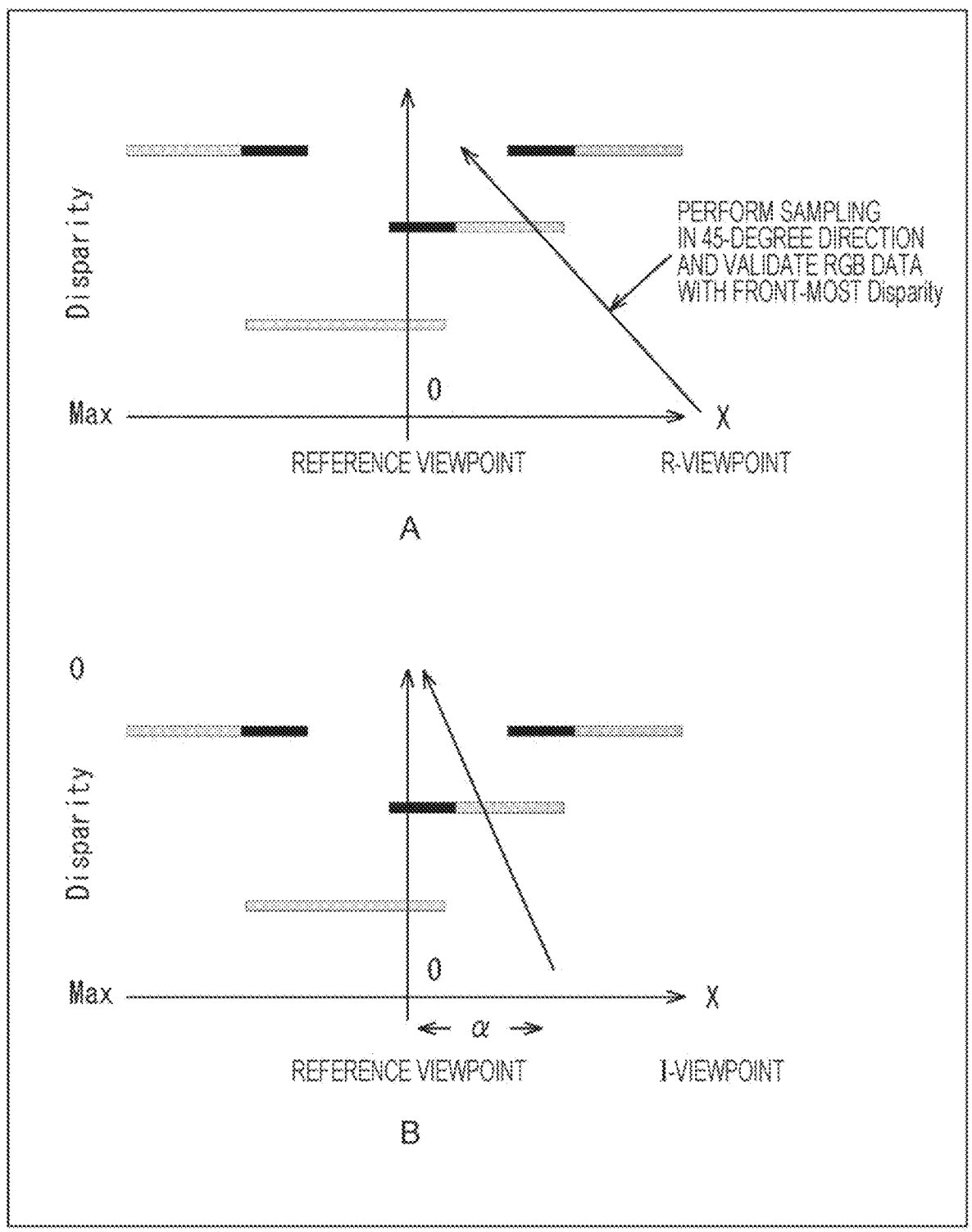
FIG. 8 is a diagram illustrating an example of sampling for a reconstructed photographing space.

As described above, the memory space is sampled while changing the inclination of the space as shown in FIG. 8, thereby making it possible to generate any viewpoint image at high speed without the need for comparing the disparity values of each pixel. In the example shown in FIG. 8, the vertical axis represents a disparity and the horizontal axis represents an X-coordinate.

Specifically, A of FIG. 8 indicates a diagram showing an R-viewpoint interpolation method. As shown in A of FIG. 8, sampling is performed in a direction of 45 degrees at the R-viewpoint located on the right side (rightmost side) as viewed from the reference viewpoint, and the RGB data in which the first disparity is in the foreground is validated. This makes it possible to generate an R-viewpoint image in which noise is reduced.

Similarly, B of FIG. 8 indicates a diagram showing an example of an I-viewpoint interpolation method. In this case, in the I-viewpoint apart from the reference viewpoint by a, sampling is performed at an inclination of $1/\alpha$, and the RGB data in which the first disparity is in the foreground is validated. This makes it possible to generate an I-viewpoint image in which noise is reduced.

Note that, while an example using one dimension has been described above, the present technology is a technique applicable to three dimensions, for example, in the vertical direction, or by shifting the camera array in the front-back direction. Further, an example using three viewpoints has been described above, but the number of viewpoints is not limited to three. The present technology can be applied to any number of viewpoints, as long as multiple viewpoints are used.

<Example of Image Processing>

Figure 9:
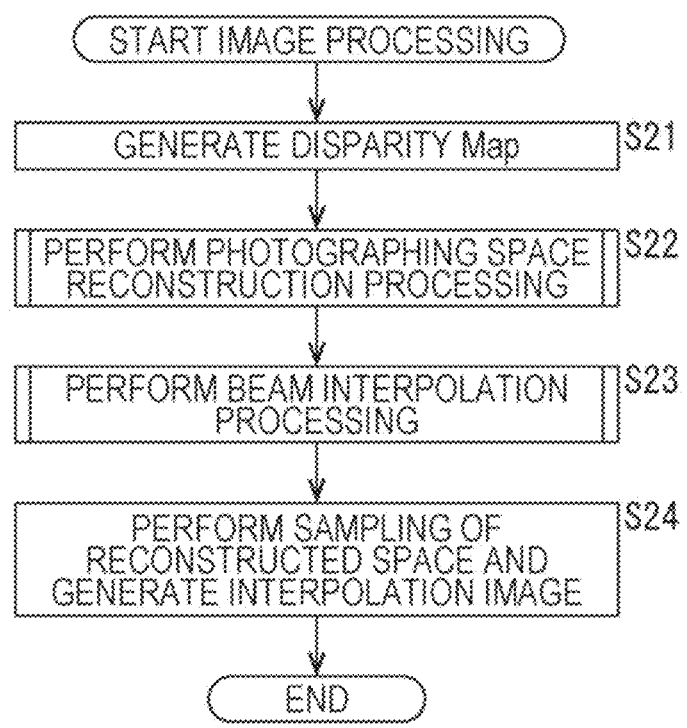
FIG. 9 is a flowchart illustrating image processing of an image pickup device.

Next, image processing of the image pickup device 11 will be described with reference to the flowchart in FIG. 9.

The disparity calculation unit 22 generates each disparity map in step S21.

Specifically, the viewpoint images of the camera 21-L, camera 21-C, and the camera 21-R are input to the disparity calculation unit 22. The disparity calculation unit 22 calculates the disparity (pixel shift amount) of the subject between multi-view images by using the input viewpoint images, thereby generating each disparity map. The disparity calculation unit 22 supplies the interpolation image generation unit 23 with the generated disparity maps as multi-view disparity maps, as well as the multi-view images.

In step S22, the space reconstruction unit 31 reconstructs the space in which viewpoint images are photographed according to each viewpoint image and each disparity map. Processing of reconstructing the photographing space will be described later with reference to FIG. 10. The space reconstruction unit 31 supplies the reconstruction data of the reconstructed space to the interpolation position setting unit 32.

In step S23, the interpolation position setting unit 32 performs beam interpolation processing. The beam interpolation processing will be described later with reference to FIG. 11. In step S23, the interpolation position is set to the space reconstructed by the space reconstruction unit 31 while changing (the inclination of) a beam, and the interpolation target coordinates representing the set interpolation position are supplied to the data search unit 33.

In step S24, the data search unit 33 samples the reconstructed space and generates the interpolation image. Specifically, the data search unit 33 samples the RGB values of the interpolation target coordinates supplied from the interpolation position setting unit 32, thereby generating the interpolation image at any viewpoint, and the generated interpolation image is output to the subsequent-stage.

Figure 10:
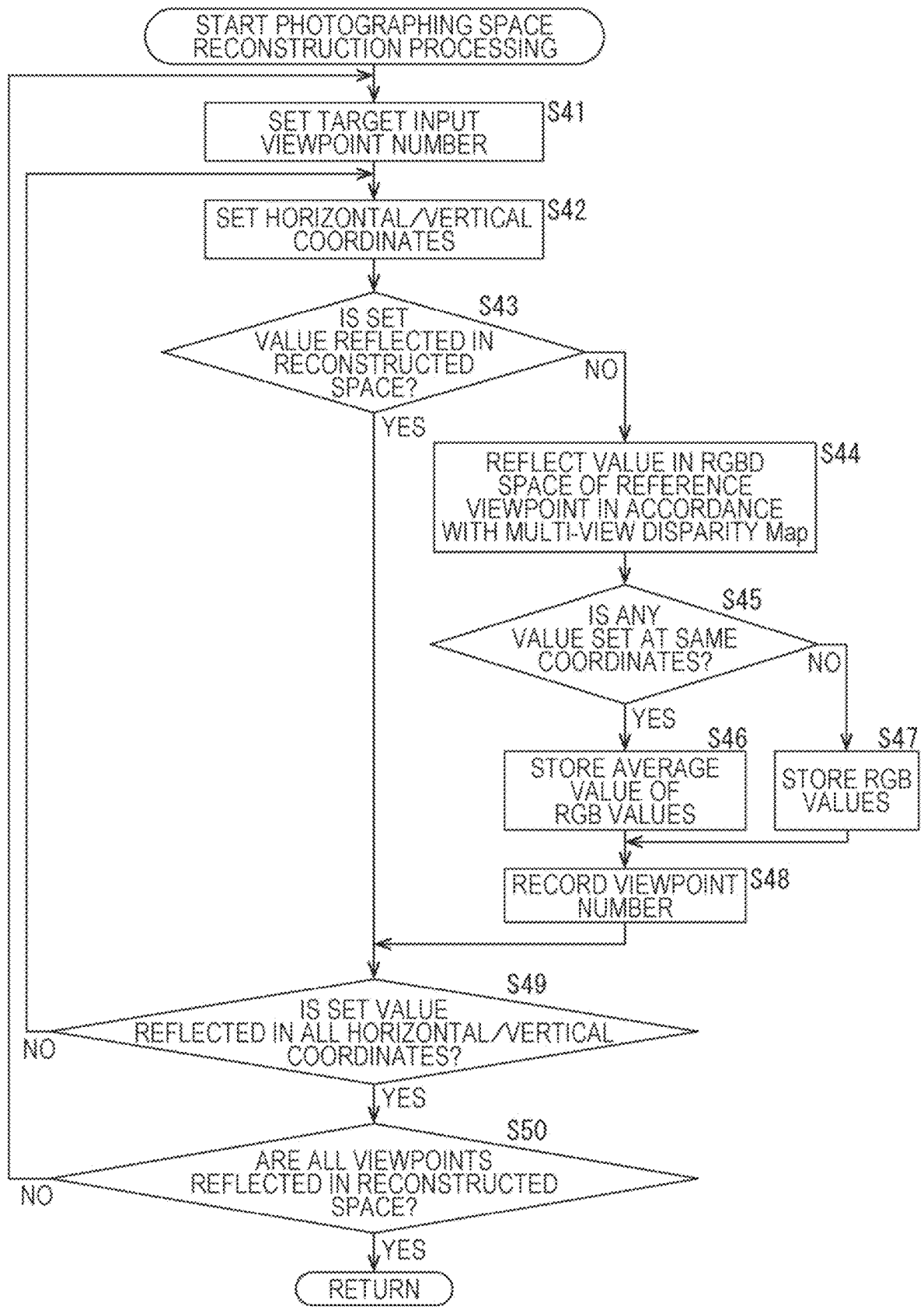
FIG. 10 is a flowchart illustrating processing of reconstructing a photographing space.

Next, the processing of reconstructing the photographing space in step S22 shown in FIG. 9 will be described with reference to the flowchart in FIG. 10.

In step S41, the space reconstruction unit 31 sets the target input viewpoint number, and sets horizontal/vertical coordinates in step S42.

In step S43, the space reconstruction unit 31 determines whether or not the set coordinate values are already reflected in the reconstructed space. In step S43, when it is determined that the set coordinate values are already reflected in the reconstructed space, the process skips steps S44 to S48 and proceeds to step S49.

In step S43, when it is determined that the set coordinate values are not reflected in the reconstructed space, the process proceeds to step S44.

In step S44, the space reconstruction unit 31 reflects the coordinate values in the RGBD space of the reference viewpoint according to the multi-view disparity map. In step S45, the space reconstruction unit 31 determines whether or not values are already set at the same coordinates.

In step S45, when it is determined that values are already set at the same coordinates, the process proceeds to step S46. In step S46, the space reconstruction unit 31 obtains the average value of the RGB values by using the already set values, and stores the average value in the memory. Then, the process proceeds to step S48.

In step S45, when it is determined that no values are set at the same coordinates, the process proceeds to step S47. In step S47, the space reconstruction unit 31 stores the RGB values in the memory, and the process proceeds to step S48.

In step S48, the space reconstruction unit 31 records the viewpoint number, and the process proceeds to step S49.

In step S49, the space reconstruction unit 31 determines whether or not the values are already reflected in all horizontal/vertical coordinates. In step S49, when it is determined that the values are not reflected at all horizontal/vertical coordinates, the process returns to step S42 and the processing in step S42 and subsequent steps is repeated.

In step S49, when it is determined that the values are already reflected at all horizontal/vertical coordinates, the process proceeds to step S50. In step S50, the space reconstruction unit 31 determines whether or not all viewpoints are already reflected in the reconstructed space. In step S50, when it is determined that not all viewpoints are reflected in the reconstructed space, the process returns to step S41 and the processing in step S41 and subsequent steps is repeated. In step S50, when it is determined that all viewpoints are already reflected in the reconstructed space, the processing of reconstructing the photographing space is finished and the process returns to step 22 in FIG. 9.

Figure 11:
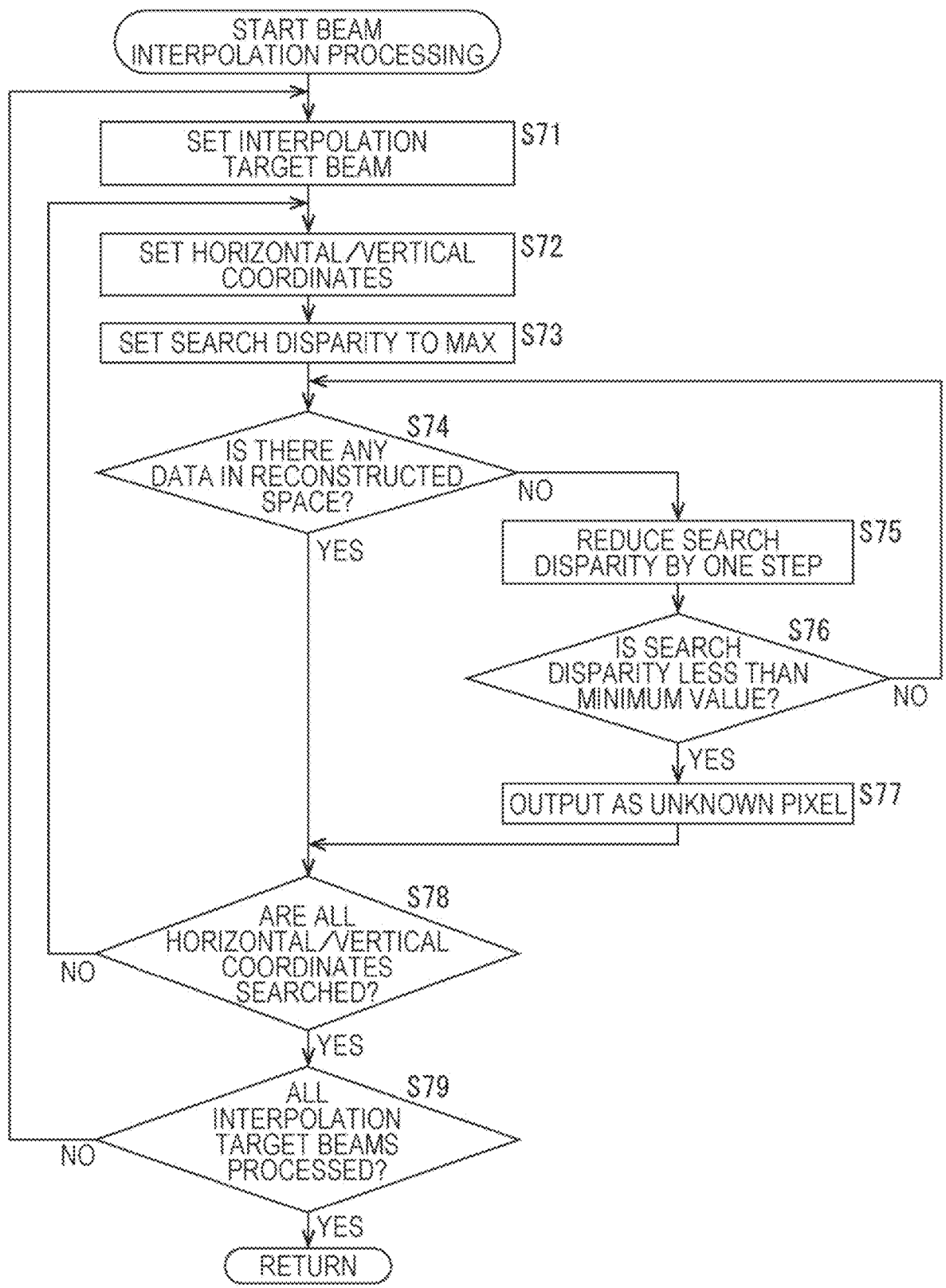
FIG. 11 is a diagram illustrating beam interpolation processing.

Next, the beam interpolation processing in step S23 shown in FIG. 9 will be described with reference to the flowchart in FIG. 11.

The interpolation position setting unit 32 sets an interpolation target beam (inclination) in step S71, and sets horizontal/vertical coordinates in step S72. In step S73, the interpolation position setting unit 32 sets the search disparity to MAX. This is because the data search is performed in a descending order of disparity as described above.

In step S74, the interpolation position setting unit 32 determines whether or not data is present in the reconstructed space. In step S74, when it is determined that data is present in the reconstructed space, the process skips steps S75 to S77 and proceeds to step S78.

In step S74, when it is determined that data is not present in the reconstructed space, the process proceeds to step S75. In step S75, the interpolation position setting unit 32 reduces the search disparity by one step.

In step S76, the interpolation position setting unit 32 determines whether the search disparity is less than a minimum disparity. The minimum disparity is a disparity corresponding to, for example, the background. In step S76, when it is determined that the search disparity is less than the minimum disparity, the process proceeds to step S77. In step S77, the interpolation position setting unit 32 outputs it as an unknown pixel, and the process proceeds to step S78.

In step S76, when it is determined that the search disparity is not less than the minimum disparity, the process returns to step S74 and the processing in step 74 and subsequent steps is repeated.

In step S78, the interpolation position setting unit 32 determines whether or not all horizontal/vertical coordinates are already searched. In step S78, when it is determined that not all horizontal/vertical coordinates are searched, the process returns to step S72 and the processing in step S72 and subsequent steps is repeated.

In step S78, when it is determined that all horizontal/vertical coordinates are already searched, the process proceeds to step S79. In step S79, the interpolation position setting unit 32 determines whether or not all interpolation target beams are processed. In step S79, when it is determined that all interpolation target beams are not processed yet, the process returns to step S71 and the processing in step S71 and subsequent steps is repeated. In step S79, when it is determined that all interpolation target beams are processed, the beam interpolation processing is finished, and the process returns to step S23 shown in FIG. 9.

As described above, according to the present technology, when the processing of generating a viewpoint interpolation image is performed from images having different parallaxes, a high-definition viewpoint interpolation image can be generated at high speed without the need for discriminating the depth of each pixel at each viewpoint.

In other words, since all luminances from the image pickup device capable of acquiring occlusion data can be utilized, the quality of the generated viewpoint interpolation image can be improved and noise in the image can be reduced.

Note that an example in which a disparity map is generated from a disparity (pixel shift amount) between multi-view images and the generated disparity map is used has been described above. However, in the present specification, the pixel shift amount and the depth are generally referred to as a depth as described below.

<Explanation of Depth in the Present Specification>

Figure 12:
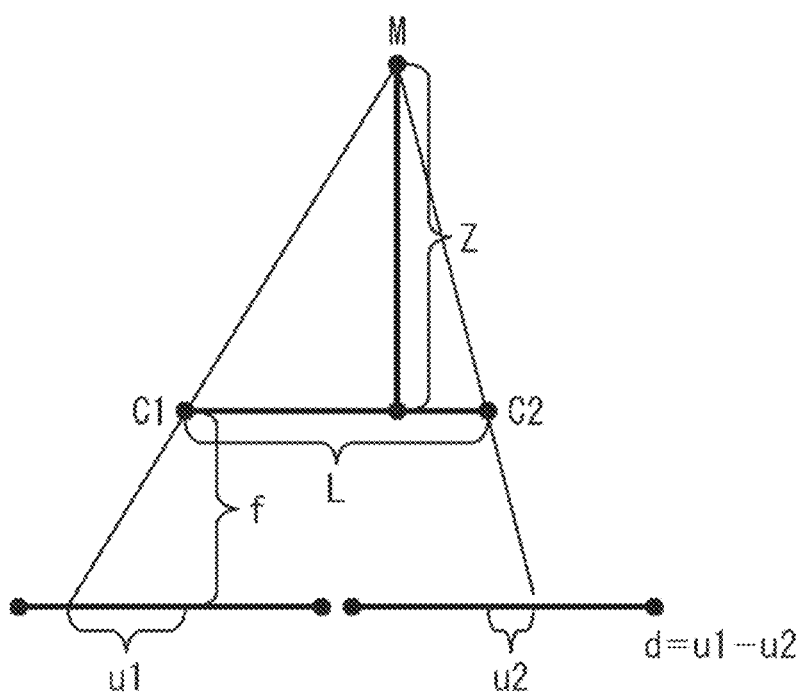
FIG. 12 is a diagram illustrating a pixel shift amount (disparity) and a depth.

FIG. 12 is a diagram illustrating the pixel shift amount (disparity) and depth.

As shown in FIG. 12, when a color image of a subject M is photographed by a camera c1 disposed at a position C1 and a camera c2 disposed at a position C2, a depth Z which is a distance in a depth direction of the subject M from the camera c1 (camera c2) is defined by the following Formula (2).

[Mathematical Formula 2]

$$Z=(L/d) \times f \qquad (2)$$

Note that L represents a distance in a horizontal direction between the position C1 and the position C2 (hereinafter referred to as a distance between cameras). Further, d represents a value obtained by subtracting a distance u2 in the horizontal direction from the center of the color image at the position of the subject M on the color image photographed by the camera c2, from the distance u1 in the horizontal direction from the center of the color image at the position of the subject M on the color image photographed by the camera c1, i.e., a pixel shift amount (which is also called a parallax). Further, f represents the focal length of the camera c1. In Formula (2), assume that the focal length of the camera c1 is the same as the focal length of the camera c2.

As shown in Formula (2), the pixel shift amount d and the depth Z can be uniquely converted. Accordingly, in the present specification, the image representing the pixel shift amount d of the color image and the image representing the depth Z at two viewpoints that are photographed by the camera c1 and the camera c2, respectively, are generally referred to as a depth image (parallax image).

Note that the depth image (parallax image) may be an image representing the pixel shift amount d or the depth Z. As the pixel value of the depth image (parallax image), a value obtained by normalizing the pixel shift amount d, or a value obtained by normalizing a reciprocal 1/Z of the depth Z, can be adopted, instead of using the pixel shift amount d or the depth Z as it is.

A value I obtained by normalizing the pixel shift amount d by 8 bits (0 to 255) can be obtained by the following Formula (3). Note that the number of bits for the normalization of the pixel shift amount d is not limited to 8 bits, but other numbers of bits such as 10 bits or 12 bits can be used.

[Mathematical Formula 3]

$$I = \frac{255 \times (d - D_{min})}{D_{max} - D_{min}} \qquad (3)$$

Note that in Formula (3), $D_{max}$ represents a maximum value of the pixel shift amount d and $D_{min}$ represents a minimum value of the pixel shift amount d. The maximum value $D_{max}$ and the minimum value $D_{min}$ may be set in a unit of one screen, or may be set in units of a plurality of screens.

Further, a value y obtained by normalizing the reciprocal 1/Z of the depth Z by 8 bits (0 to 255) can be obtained by the following Formula (4). Note that the number of bits for the normalization of the reciprocal 1/Z of the depth Z is not limited to 8 bits, but other numbers of bits such as 10 bits or 12 bits can be used

[Mathematical Formula 4]

$$y = 255 \times \frac{\frac{1}{Z} - \frac{1}{Z_{far}}}{\frac{1}{Z_{near}} - \frac{1}{Z_{far}}} \quad (4)$$

Note that in Formula (4), $Z_{far}$ represents a maximum value of the depth Z and $Z_{near}$ represents a minimum value of the depth Z. The maximum value $Z_{far}$ and the minimum value $Z_{near}$ may be set in a unit of one screen or may be set in units of a plurality of screens.

Thus, in the present specification, in consideration of the fact that the pixel shift amount d and the depth Z can be uniquely converted, an image for which the value I obtained by normalizing the pixel shift amount d is set as a pixel value and an image for which the value y obtained by normalizing the reciprocal 1/Z of the depth Z is set as a pixel value are generally referred to as a depth image (parallax image). Here, a color format of the depth image (parallax image) is assumed to be YUV420 or YUV400, but other color formats can be used.

Note that when focus is on information about the value I or the value y itself rather than on the pixel value of the depth image (parallax image), the value I or the value y is set as depth information (parallax information). Further, a result obtained by mapping the value I and the value y is referred to as a depth map (parallax map).

As described above, in the present specification, the above-mentioned disparity information can be generally referred to as depth information, and the disparity map can be generally referred to as the depth map.

Note that the present technology can be applied to, for example, a multi-view image utilization service platform which is described below. Specifically, the interpolation image generation method in the first embodiment described above is utilized for, for example, services to be described below as an application or the like.

<2. Second embodiment>
<Multi-view Image Utilization Service Platform>

Figure 13:
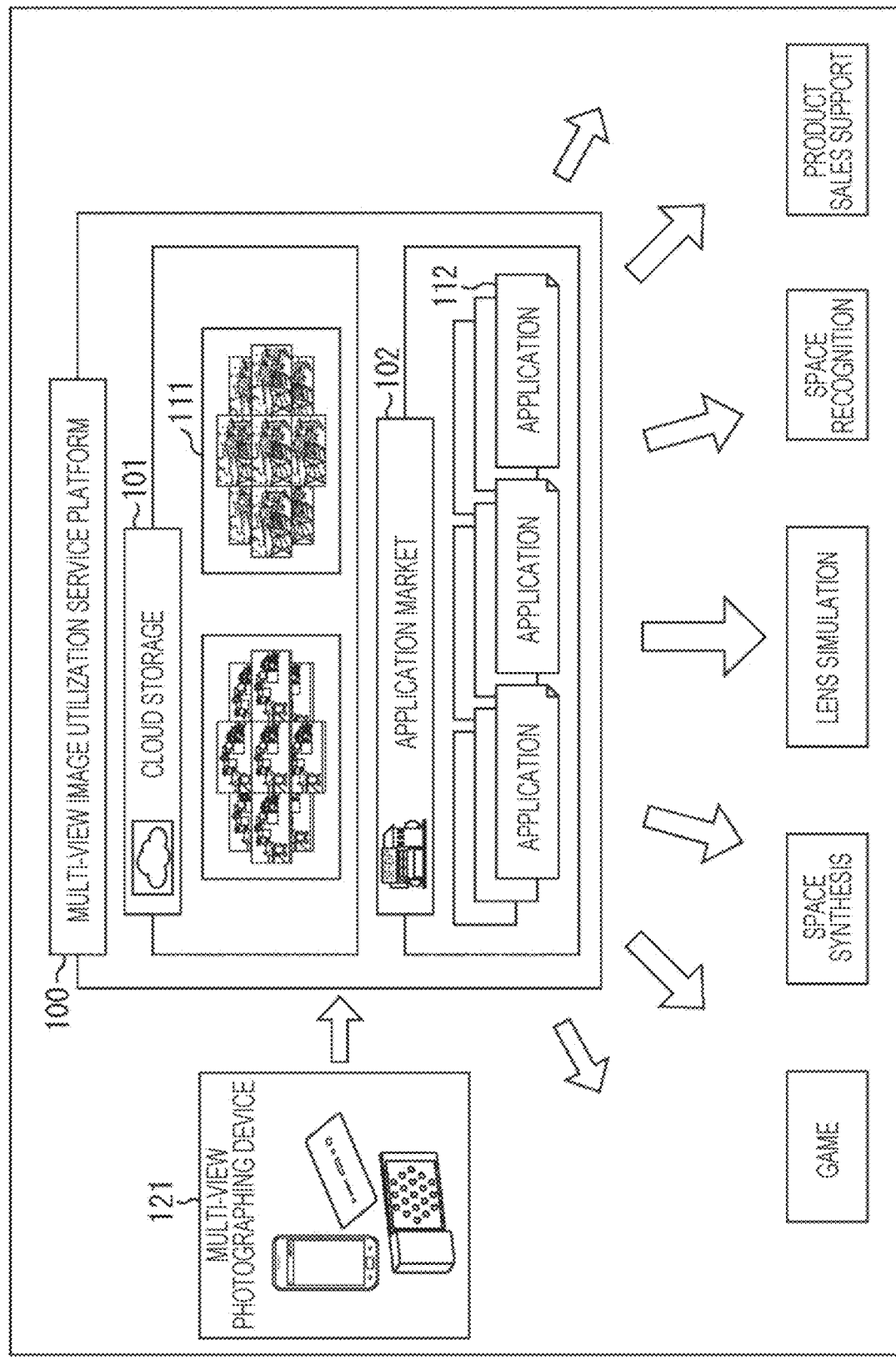
FIG. 13 is a diagram illustrating an example of a multi-view image utilization service platform.

FIG. 13 is a diagram illustrating an example of a multi-view image utilization service platform. A multi-view image utilization service platform 100 shown in FIG. 13 is a fundamental structure/environment for providing users with services using multi-view images formed of a plurality of images with different viewpoints. The multi-view image utilization service platform 100 includes functions such as a cloud storage 101 and an application market 102.

The cloud storage 101 is a service for storing and managing multi-view image data 111 which is multi-view image data. For example, each user registered in the multi-view image utilization service platform operates a multi-view imaging device 121, picks up images of a subject, and obtains a plurality of captured images with different viewpoints as a multi-view image. Further, the user operates the multi-view imaging device 121 and supplies the multi-view image data to the multi-view image utilization service platform 100. The cloud storage 101 stores the supplied multi-view image data and manages the data for each user.

Further, the cloud storage 101 can generate, as needed, data associated with the multi-view image data on the basis of the multi-view image data and the like, and can manage the generated data. Furthermore, the cloud storage 101 can provide, as needed, a terminal device operated by a user, or an application to be described later, with the managed multi-view image data, as well as the data associated with the multi-view image data, in response to a request from the user or the like.

The application market 102 is a service for performing some processing by utilizing the multi-view image data, providing a user with an application 112 to provide the user with services using multi-view images, selling, and executing the application. In other words, this application 112 may be executed by the multi-view image utilization service platform 100, or may be executed by the terminal device.

By executing the application 112, various convenient services, such as games using multi-view images, space synthesis, lens simulation, space recognition, and product sales support, can be provided to each user.

Any type of services can be provided by the application 112, as long as the services use a multi-view image. For example, the lens simulation is a service for simulating a virtual optical system (causing the system to appear in a pseudo manner) and generating a virtual captured image obtained by picking up an image of a subject using the multi-view image by using the virtual optical system. In this case, the application 112 sets, for example, a virtual lens 150 as indicated by A in FIG. 14, and a beam vector 151, which is incident light entering the virtual lens 150 from the subject, a beam vector 152, which is incident light which has been transmitted through the virtual lens 150, a virtual image sensor 153 which obtains a virtual captured image from the beam vector 152, and the like are simulated (caused to appear in a pseudo manner). Then, in this case, for example, the application 112 generates a virtual captured image from the multi-view image on the basis of the above-mentioned simulation, and provides the user with the virtual captured image. Further, the application 112 can perform, for example, selection or sales of the virtual lens 150 to be set.

Then, for example, when interpolation image generation is performed in the service executed by the application 112, the interpolation image generation method of the first embodiment can be applied. In this case, the same advantageous effect as that of the first embodiment can be obtained. That is, a high-definition viewpoint interpolation image can be generated at high speed.

Since the virtual lens can be set in the lens simulation, optical systems of any specifications can be simulated. In other words, in the lens simulation, not only actual optical systems but also unrealistic optical systems can be simulated. Accordingly, the provision of such services enables the user to reproduce captured images obtained by various optical systems. For example, the user can easily obtain a captured image using an optical system having a diaphragm wider than that of the optical system with which each captured image constituting the multi-view image is obtained can be easily obtained by the lens simulation. For example, the lens simulation enables the user to easily obtain an image with a higher resolution than that of each image of the multi-view image, a wide-angle image, an image with a narrow angle of view and a long focal length, and the like. Further, the lens simulation enables the user to, for example, easily obtain a captured image using a sophisticated lens, and a captured image using an unrealistic optical system. That is, the user can obtain various captured images at low costs.

For example, the interpolation image generation method of the first embodiment can also be applied to the lens simulation. In this case, the same advantageous effect as the advantageous effect of the first embodiment can be obtained. Specifically, since a high-definition viewpoint interpolation image can be generated at high speed, high-definition lens simulation can be provided to the user.

For example, the product sales support is a service for conducting sales of articles using multi-view images. The support for articles to be sold may be conducted in any way. For example, assuming that furniture is an article to be sold, a service for virtually disposing the image of the furniture on a captured image as shown in B of FIG. 14 may be provided. In this case, the application 112 generates the captured image by overlapping captured images of the multi-view image, disposes the image of the furniture on the generated captured image by using the three-dimensional modeling data (which is also referred to as 3D modeling data) and the depth data representing the distance to the subject in the multi-view image, and provides the composite image to the user. Further, the application 112 sets the furniture to be disposed and the position thereof on the basis of the user's operation.

The interpolation image generation method of the first embodiment can also be applied to such a service. In this case, the same advantageous effect as the advantageous effect of the first embodiment can be obtained. Specifically, since a high-definition viewpoint interpolation image can be generated at high speed, a high-definition composite image can be provided to the user.

The provision of such a service enables the user to, for example, photograph an image of his/her room and dispose the image of furniture at a desired position on the captured image (i.e., the image of his/her room). This allows the user to precisely assume a layout before purchase. Specifically, the service can reduce user's anxieties, such as an anxiety as to "whether the purchased furniture can be placed in his/her room", or an anxiety as to "whether the purchased furniture suits his/her room", before purchase. This leads to an increase in the users' willingness to buy. That is, the application 112 can support the sales of furniture.

As described above, the multi-view image utilization service platform 100 is capable of not only generating and providing one image from a multi-view image, but also managing data on users and multi-view images, conducting sales of an application, and providing services using an application. Thus, various services which are more convenient for users can be provided. In other words, the multi-view image utilization service platform 100 can improve the convenience of services using a multi-view image.

In this case, the application of the interpolation image generation method of the first embodiment makes it possible to generate a high-definition viewpoint interpolation image at high speed, so that a high-definition service can be provided to the user.

While a multi-view image formed of a plurality of captured images has been described above, a multi-view image may be formed of any number of images. Further, all or some of the images constituting the multi-view image, or the whole or a part of each image may be an unrealistic image, such as a computer graphic image artificially depicted (that is, the multi-view image may include an image other than a captured image).

Further, the terminal device to which services are provided by the multi-view image utilization service platform 100 may be the multi-view imaging device 121 which is operated by the user who owns the multi-view image, a terminal device other than the multi-view imaging device 121 operated by the user, or a terminal device operated by another user who is authorized to use the multi-view image by the user.

Further, the multi-view image utilization service platform 100 may have any physical configuration. For example, the multi-view image utilization service platform may be configured of one server, or may be configured of a plurality of servers. For example, a cloud computing configuration in which all or some of the functions of the multi-view image utilization service platform 100 are shared among a plurality of devices via a network and are processed in cooperation may be employed. Further, all or some of the functions of the multi-view image utilization service platform 100 may be executed by a terminal device.

Details of an example of services provided by the multi-view image utilization service platform 100 will be described below.

<3. Third Embodiment>
<Management of Multi-view Images>

As described in the second embodiment, the multi-view image utilization service platform 100 includes, for example, the function of the cloud storage 101, and can store multi-view image data and provide a management service. In this embodiment, the management of multi-view images will be described.

<Multi-view Image Utilization Service Provision System>

Figure 15:
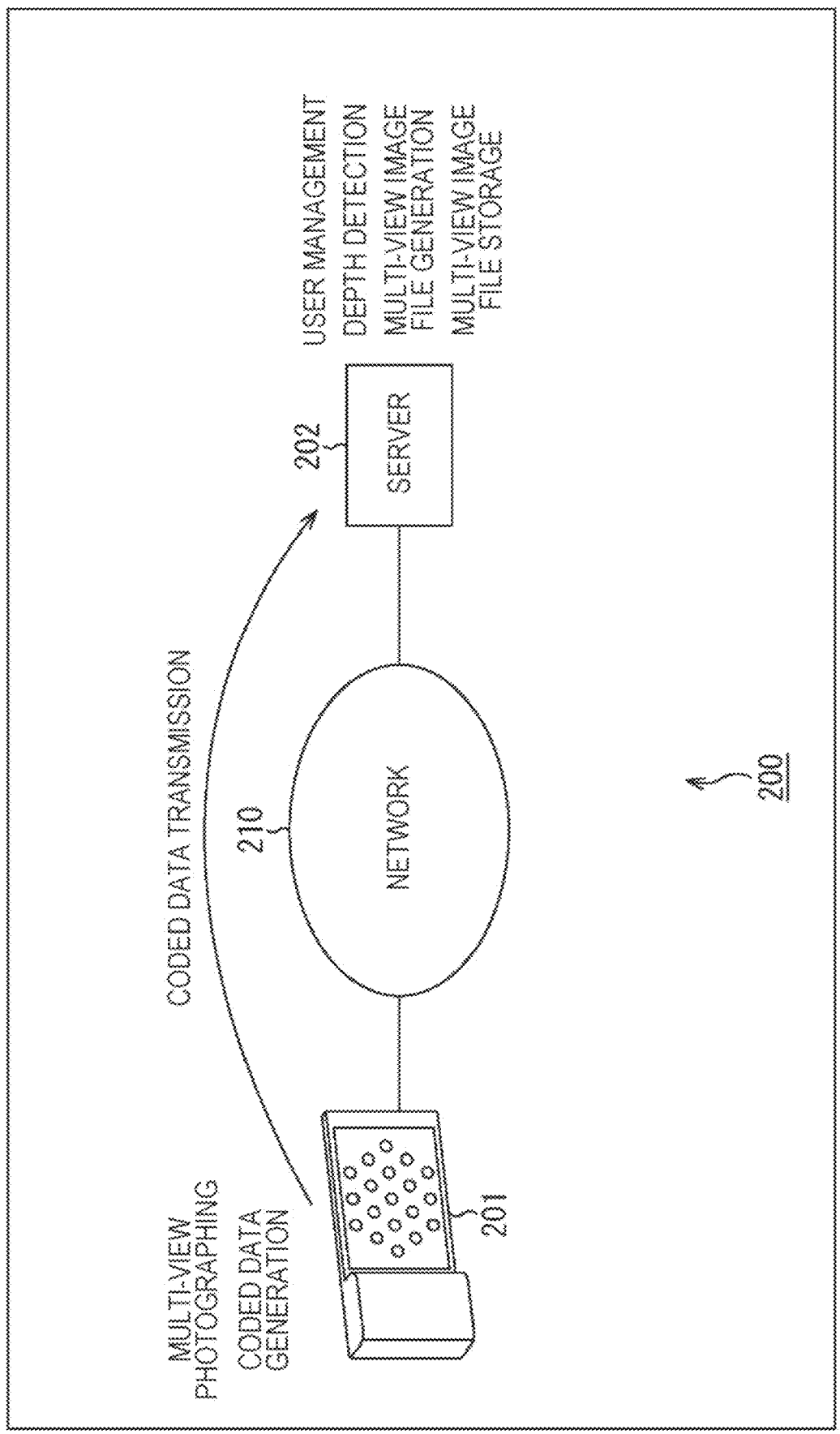
FIG. 15 is a diagram illustrating a main configuration example of a multi-view image utilization service provision system.

FIG. 15 is a diagram showing a main configuration example of the multi-view image utilization service provision system. A multi-view image utilization service provision system 200 shown in FIG. 15 is an example of the system to which the present technology is applied, and is a system in which a server 202 provides services utilizing a multi-view image to a terminal device 201 which is connected to the server via a network 210. In other words, the multi-view image utilization service provision system 200 is an example of a configuration for implementing the multi-view image utilization service platform 100.

FIG. 15 shows an example of a configuration for providing a service for managing multi-view images among the services to be provided by the multi-view image utilization service platform 100. In FIG. 15, the multi-view image utilization service provision system 200 includes the terminal device 201 and the server 202 which are each connected to the network 210.

The network 210 is any network such as the Internet or a local area network. The network 210 is formed with one or more networks configured in a wired or wireless manner, or in a combination of wired and wireless connections. The terminal device 201 and the server 202 are each connected to the network 210 in a wired or wireless manner.

The terminal device 201 performs multi-view imaging for obtaining a multi-view image formed of a plurality of captured images with different viewpoints by picking up images of a subject. In this case, for example, the interpolation image generation is performed by the interpolation image generation method of the first embodiment. Further, the terminal device 201 generates multi-view coded data by encoding the multi-view image data including the generated interpolation image. The terminal device 201 transmits the generated multi-view coded data to the server 202. Note that the interpolation image generation may be performed by the server 202. This leads to a reduction in the data to be transmitted.

The server 202 manages the users registered in advance. Further, the server 202 acquires the transmitted multi-view image coded data, detects the depth of the multi-view image, and generates depth data. Furthermore, the server 202 converts the data on the multi-view images into a file, thereby generating a multi-view image file. Then, the server 202 stores (saves) and manages the generated multi-view image file. The multi-view image file managed by the server 202 is associated with the terminal device 201 and the application to be executed, and is provided to the terminal device 201 or the application to be executed, as needed.

<Terminal Device>

Figure 16:
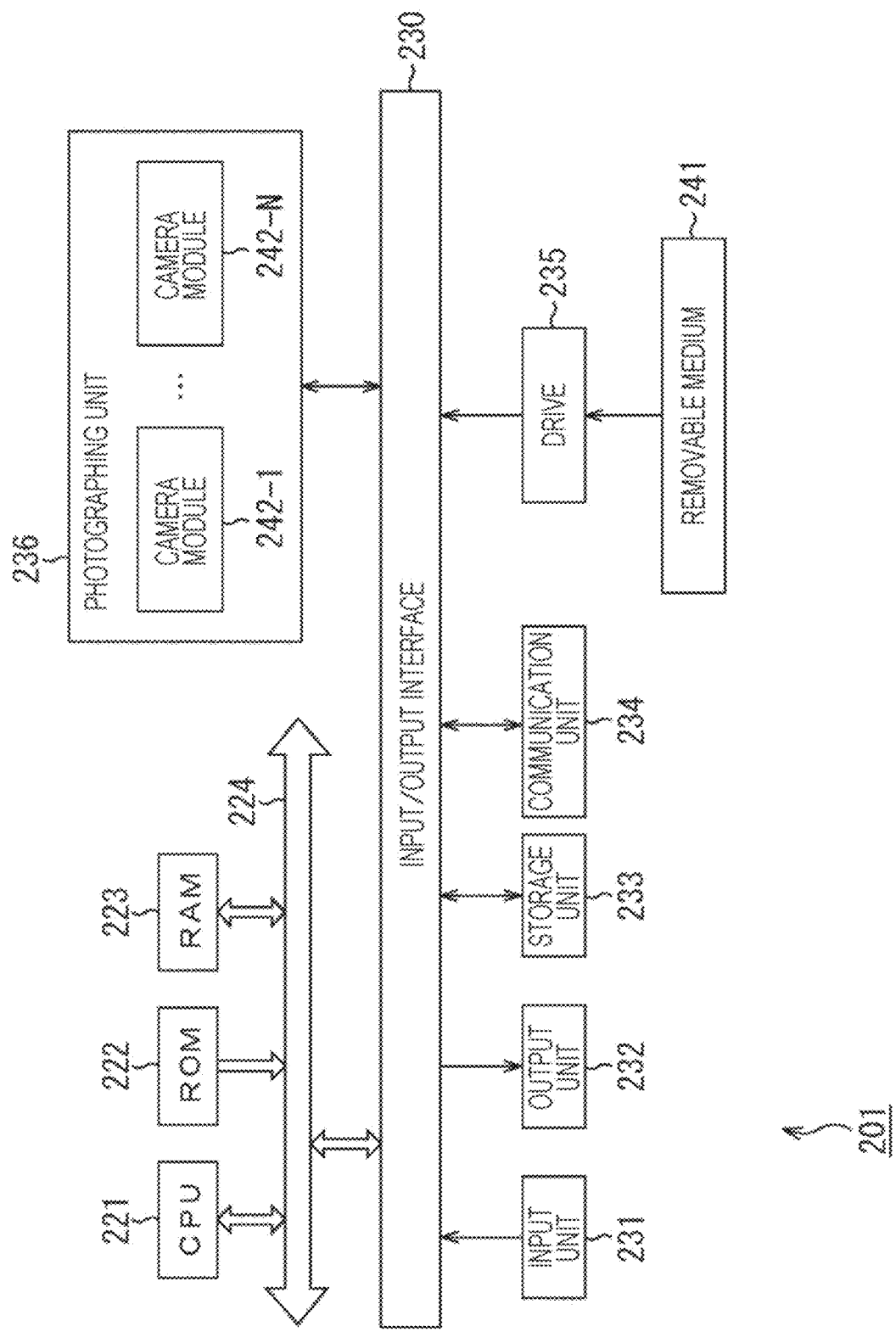
FIG. 16 is a diagram illustrating a main configuration example of a terminal device.

FIG. 16 is a block diagram showing a main configuration example of the terminal device 201. As shown in FIG. 16, in the terminal device 201, a central processing unit (CPU) 221, a read only memory (ROM) 222, and a random access memory (RAM) 223 are interconnected via a bus 224.

The bus 224 is also connected with an input/output interface 230. The input/output interface 230 is connected with an input unit 231, an output unit 232, a storage unit 233, a communication unit 234, and a drive 235.

The input unit 231 is formed with an input device that accepts external information such as a user input. For example, the input unit 231 includes operation buttons, a touch panel, microphone, an input terminal, and the like. Further, various sensors, such as an acceleration sensor, an optical sensor, and a temperature sensor may be included in the input unit 231. The output unit 232 is formed with an output device that outputs information such as an image and audio. For example, the output unit 232 includes a display, a speaker, and output terminal, and the like.

The storage unit 233 is formed with, for example, a hard disk, a RAM disk, and a non-volatile memory. The communication unit 234 is formed with, for example, a network interface. The drive 235 drives a removable medium 241, such as a magnetic disk, an optical disk, a magneto-optical disk, or a semiconductor memory.

The CPU 221 performs various kinds of processes by loading a program stored in the storage unit 233 into the RAM 223, for example, via the input/output interface 230 and the bus 224 and executing the program. The RAM 223 stores, for example, data necessary for the CPU 221 to execute various kinds of processes.

The program executed by the CPU 221 can be recorded in, for example, the removable medium 241 as a package medium, and can be provided to the terminal device 201. In this case, the program can be installed in the storage unit 233 via the input/output interface 230 when the removable medium 241 is mounted in the drive 235.

Further, this program can be provided to the terminal device 201 via a wired or wireless transmission medium such as a LAN, the Internet, or digital satellite broadcasting. In this case, the program can be received by the communication unit 234 via a wired or wireless transmission medium, and can be installed in the storage unit 233.

Alternatively, this program can also be preliminarily installed in the ROM 222 or the storage unit 233.

The input/output interface 230 is also connected with an image pickup unit 236. The image pickup unit 236 is controlled by, for example, the CPU 221, and performs multi-view imaging for obtaining a multi-view image, which is formed of a plurality of captured images with different viewpoints, by picking up images of a subject. The image pickup unit 236 includes camera modules 242-1 to 242-N. N is any integer equal to or greater than 2. The camera modules 242-1 to 242-N are modules which have similar configurations and perform similar processing. In the following description, when there is no need to distinguish the camera modules 242-1 to 242-N, the camera modules are referred to simply as the camera modules 242.

Figure 17:
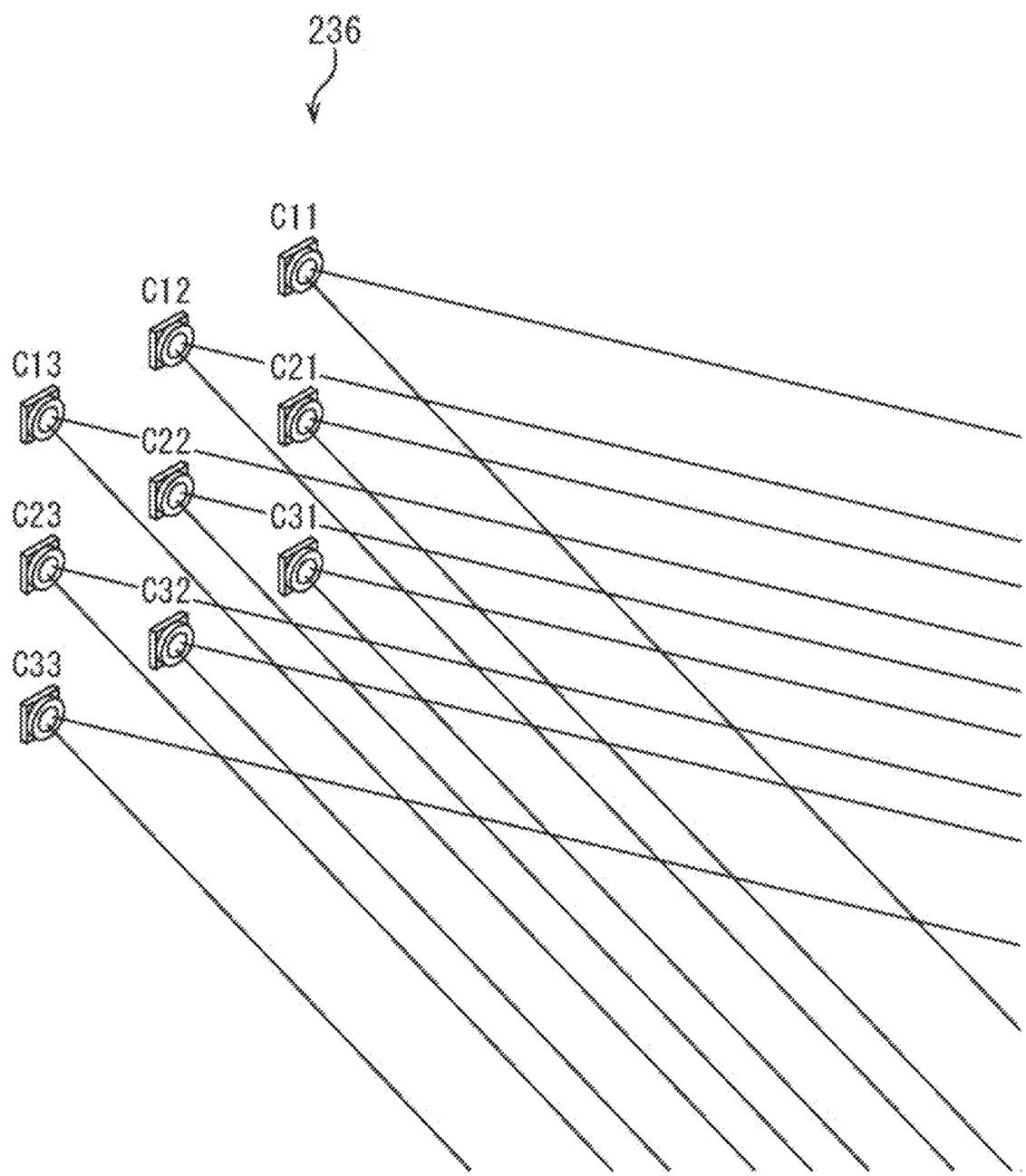
FIG. 17 is a diagram illustrating an outline of an image pickup unit.

The camera modules 242 are modules which include an optical system including an image sensor (image pickup element) and obtain a captured image by picking up an image of a subject. The camera modules 242 are disposed at different positions on a plane or a curved surface, such as C11, C12, C13, C21, C22, C23, C31, C32, and C33 shown in FIG. 17, and have different viewpoints. In other words, the camera modules 242-1 to 242-N pickup images of a subject and obtain captured images with reference viewpoints.

The image pickup unit 236 is, for example, controlled by the CPU 221 to pick up images of the subject by using the camera modules 242-1 to 242-N, thereby obtaining N (a plurality of) captured images with different viewpoints. The image pickup unit 236 obtains the plurality of captured images as the multi-view image (multi-view image data). That is, the image pickup unit 236 performs multi-view imaging using the camera modules 242.

The image pickup unit 236 is, for example, controlled by the CPU 221 to interpolate the obtained multi-view image data, supply the interpolation image data to the CPU 221 and the RAM 223 via the input/output interface 230, the bus 224, or the like, supplies the data to the storage unit 233 via the input/output interface 230 and causes the storage unit to store the data, supplies the data to the output unit 232 and causes the output unit to output the data, or supplies the data to the communication unit 234 and causes the communication unit to supply the data to the outside.

The camera modules 242 may have the same or different angles of view and image pickup directions. For example, one or both of the angle of view and the image pickup direction of some camera modules 242 may be different from that of other camera modules 242. Further, for example, all the camera modules 242 may have different angles of view and different image pickup directions. However, as described later, the multi-view captured images are used to generate an image by overlapping the images. Accordingly, it is desirable that the imaging ranges of each camera module 242 (i.e., the subjects of each camera module 242) overlap at least partially.

Note that in the multi-view imaging, imaging conditions for each camera module 242, such as an image pickup timing, exposure, and a diaphragm, may be the same or different. Further, each multi-view image obtained by multi-view imaging (each captured image constituting the multi-view image) may be a still image or a moving image.

Further, the image pickup unit 236 may be provided in a housing of the terminal device 201 during production thereof as one of the components thereof, or may be configured as a module which is provided separately from the terminal device 201 and is connectable to the terminal device 201. For example, the image pickup unit 236 may be an external accessory that is connected to an external terminal or the like of the terminal device 201 and operates according to the control of the terminal device 201. Also, the image pickup unit 236 may be a device that is provided separately from the terminal device 201. For example, the image pickup unit 236 may be an image pickup device, such as a camera, which is separately from the terminal device 201, may be connected to the terminal device 201 in a wired or wireless communication, and may supply the multi-view image obtained by multi-view imaging to the terminal device 201.

<Server>

Figure 18:
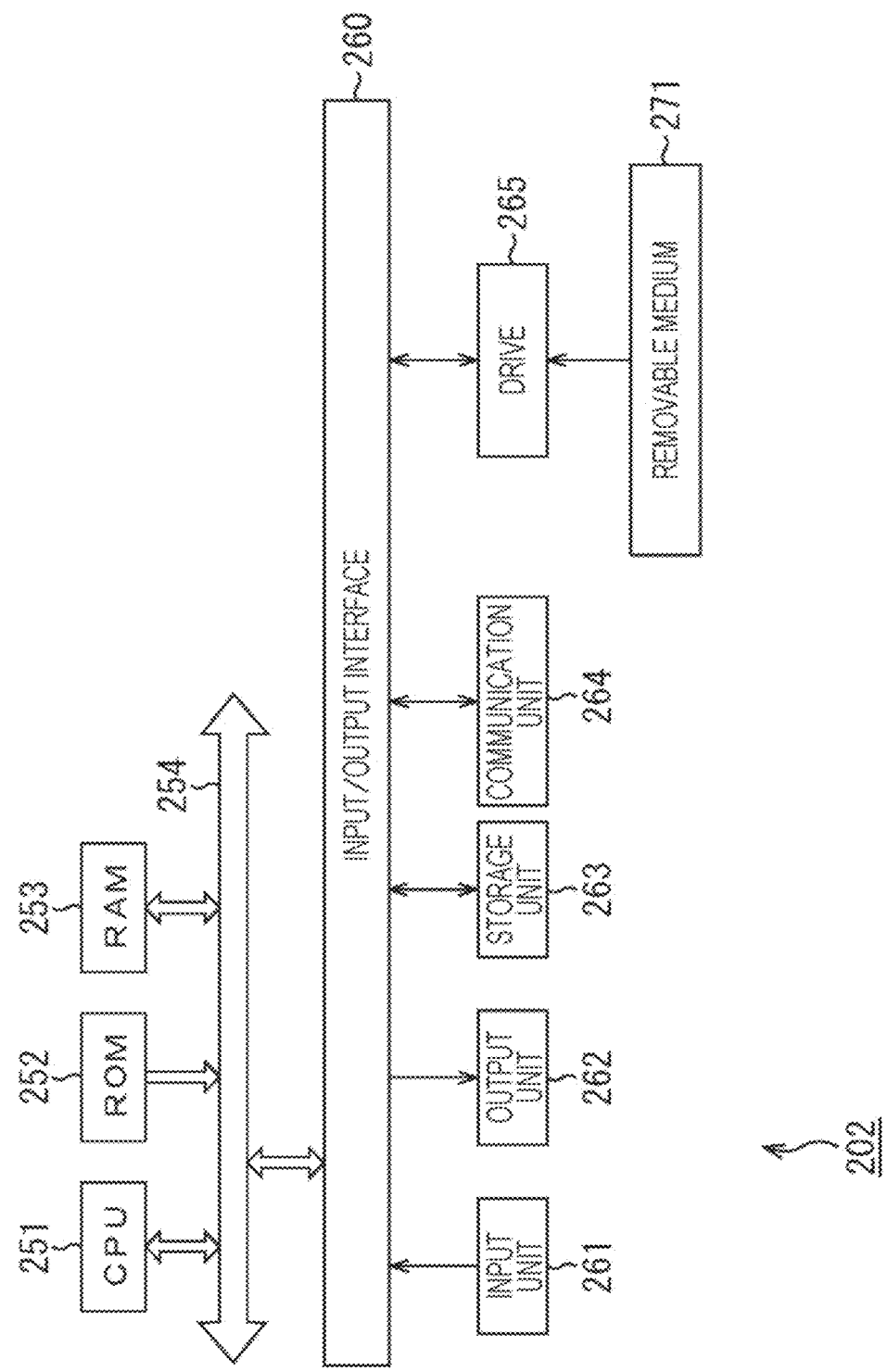
FIG. 18 is a diagram illustrating a main configuration example of a server.

FIG. 18 is a block diagram showing a main configuration example of the server 202. As shown in FIG. 18, in the server 202, the CPU 251, the ROM 252, and the RAM 253 are interconnected via a bus 254.

The bus 254 is also connected with an input/output interface 260. The input/output interface 260 is connected with an input unit 261, an output unit 262, a storage unit 263, a communication unit 264, and a drive 265.

The input unit 261 is formed with an input device that accepts external information such as a user input. For example, the input unit 261 includes operation buttons, a touch panel, a microphone, a camera, an input terminal, and the like. Further, various sensors such as an acceleration sensor, an optical sensor, and a temperature sensor may be included in the input unit 261. The output unit 262 is formed with an output device that outputs information such as an image and audio. For example, the output unit 262 includes a display, a speaker, and an output terminal.

The storage unit 263 is formed with, for example, a hard disk, a RAM disk, or a non-volatile memory. The communication unit 264 is formed with, for example, a network interface. The drive 265 drives a removable medium 271 such as a magnetic disk, an optical disk, a magneto-optical disk, or a semiconductor memory.

The CPU 251 performs various kinds of processes by loading a program stored in the storage unit 263 into the RAM 253 via the input/output interface 260 and the bus 254, and executing the program. Data and the like necessary for the CPU 251 to execute various kinds of processes are stored in RAM 253 as appropriate.

The program executed by the CPU 251 can be recorded in, for example, the removable medium 271 as a package medium, and can be provided to the server 202. In this case, the program can be installed in the storage unit 263 via the input/output interface 260 when the removable medium 271 is mounted in the drive 265.

Further, the program can also be provided to the server 202 via a wired or wireless transmission medium such as a LAN, the Internet, or digital satellite broadcasting. In this case, the program can be received by the communication unit 264 via a wired or wireless transmission medium and can be installed in the storage unit 263.

Alternatively, this program may be preliminarily installed in the ROM 252 or the storage unit 263.

<Functional Block>

The terminal device 201 includes functions which are shown as functional blocks in A of FIG. 19 when the CPU 221 executes a predetermined program. As indicated by A in FIG. 19, the CPU 221 includes functional blocks such as an image pickup control unit 281, a metadata generation unit 282, a coding unit 283, and a transmission control unit 284.

The image pickup control unit 281 performs processing of controlling multi-view imaging. The metadata generation unit 282 performs processing of generating metadata of multi-view images obtained by multi-view imaging. The coding unit 283 performs processing of encoding the multi-view image. The transmission control unit 284 performs processing of controlling transmission of multi-view image data and the like.

Further, the server 202 includes functions which are shown as functional blocks in B of FIG. 19 when the CPU 251 executes a predetermined program. As shown in B of FIG. 19, the CPU 251 includes functional blocks such as a user management unit 291, an acquisition control unit 292, a depth detection unit 293, a file generation unit 294, and a data management unit 295.

The user management unit 291 performs processing of managing users to which the multi-view image utilization service is provided. For example, the user management unit 291 stores, for each user, user management information 301 as indicated by A in FIG. 20 into the storage unit 263 and manages the user management information. As shown in A of FIG. 20, the user management information 301 includes, for example, a user ID, which is user identification information, a user purchase history, file management information identification information, which is identification information of file management information associated to each user (registered with each user), favorite setting expectation, which is information indicating a result of expecting user's favorite settings by, for example, statistical analysis, points (or money) owned by each user, and comments sent to other users, or comments sent from other users. The contents of the user management information 301 are optional, as a matter of course. Some of the above-mentioned information may be omitted, or information other than the above-mentioned information may be included.

The acquisition control unit 292 performs processing of controlling acquisition of information such as multi-view image data transmitted from the terminal device 201. The depth detection unit 293 performs processing of detecting a depth value of each multi-view image. The file generation unit 294 performs processing of generating a multi-view image file obtained by converting various kinds of data including the multi-view image data into a file.

The data management unit 295 performs processing of managing data such as the multi-view image file. For example, the data management unit 295 stores, for each multi-view image file, file management information 302 as shown in B of FIG. 20 into the storage unit 263 and manages the file management information. As shown in B of FIG. 20, the file management information 302 includes, for example, multi-view image file identification information, which is identification information of the multi-view image file, edition result image identification information, which is associated with the multi-view image file and is identification information of an edition result image as a result of editing each multi-view image, and application parameter identification information which is associated with the multi-view image file and is identification information of an application parameter as a history of, for example, application operation using each multi-view image. The contents of the file management information 302 are optional, as a matter of course. Some of the above-mentioned information may be omitted, or information other than the above-mentioned information may be included.

<Flow of Multi-view Image Utilization Service Provision Processing>

The terminal device 201 and the server 202 of the multi-view image utilization service provision system having the configuration as described above executes multi-view image utilization service provision processing, thereby providing services utilizing multi-view images. In this embodiment, services such as management of multi-view images are provided. Referring to the flowchart in FIG. 21, an example of a flow of multi-view image utilization service provision processing executed by those devices will be described.

In step S101, the image pickup control unit 281 of the terminal device 201 controls the image pickup unit 236 and performs multi-view imaging of the subject to thereby obtain multi-view image. For example, the image pickup control unit 281 obtains multi-view image 311 formed of a plurality of captured images with different view points as shown in A of FIG. 22 by multi-view imaging. Note that after acquirement of multi-view images, the interpolation image may also be generated by the interpolation image generation processing described in the first embodiment. In this case, the CPU 251 of the server 202 may include, as appropriate, functional blocks necessary for generating the interpolation image as described above with reference to FIG. 1.

Referring again to FIG. 21, when multi-view image data is obtained by picking up multi-view images, in step S102, the metadata generation unit 282 generates metadata of multi-view image data. Although the metadata will be described in detail later, the metadata includes, for example, array information indicating a relative positional relationship between viewpoints of multi-view images, and viewpoint number information indicating the number of viewpoints of each multi-view image. In other words, the metadata generation unit 282 generates metadata including the array information and the viewpoint number information, and associates the metadata with the multi-view image data.

In step S103, the coding unit 283 encodes the multi-view image data by a predetermined encoding method, thereby generating multi-view image coded data. As the encoding method, any method may be employed as long as image data is encoded. For example, existing encoding methods, such as joint photographic experts group (JPEG) and moving picture experts group (MPEG), and a new encoding method exclusive for multi-view images may be employed. Note that after the multi-view image data is encoded, the metadata of multi-view image data (e.g., array information and viewpoint number information) is associated with the multi-view image coded data (which becomes metadata of the multi-view image coded data) by the metadata generation unit 282.

In step S104, the transmission control unit 284 controls the communication unit 234 and transmits, to the server 202, multi-view image coded data, which is generated in step S103, as well as the metadata generated in step S102. For example, the transmission control unit 284 transmits the multi-view image coded data and metadata as a bit stream or auxiliary information about a bit stream.

In step S111, the acquisition control unit 292 of the server 202 controls the communication unit 264 and acquires the multi-view image coded data and the metadata thereof which are transmitted from the terminal device 201 in step S104.

In step S112, the depth detection unit 293 decodes the multi-view image coded data acquired in step S111 by the decoding method corresponding to the encoding method in step S103. Note that instead of generating the interpolation image after step S101, the interpolation image may also be generated by the interpolation image generation processing described in the first embodiment after decoding. In this case, the CPU 251 of the server 202 may include, as appropriate, functional blocks necessary for generating the interpolation image as described above with reference to FIG. 1.

In step S113, the depth detection unit 293 detects the depth of the multi-view image by using the multi-view image data obtained by decoding the multi-view image coded data in step S112, thereby generating depth data. For example, the depth detection unit 293 generates a depth map 312 representing the distance to the subject as a luminance or color for each pixel as shown in B of FIG. 22 as depth data.

Note that details of the detection of the depth will be described later.

Referring again to FIG. 21, when the depth data is generated, the depth detection unit 293 encodes the multi-view image data in which the depth is detected in step S114, and generates the multi-view image coded data. As the encoding method, any method may be employed as long as image data is encoded. For example, existing encoding methods such as JPEG and MPEG, or a new encoding method exclusive for multi-view images may be employed. The same method as the encoding method used in step S103 may be used, or a method different from the encoding method may be used. The depth detection unit 293 associates the generated depth data with the multi-view image coded data.

Note that the detection of the depth (generation of depth data) may be performed in any device other than the server 202, and may be performed in, for example, the terminal device 201. In this case, the CPU 221 of the terminal device 201 may include, as appropriate, necessary functional blocks such as the depth detection unit 293. In this case, the depth detection unit 293 may detect the depth before the coding unit 283 encodes the multi-view image data (before execution of processing in step S103). Further, in step S103, as described above, the coding unit 283 may encode the multi-view image data; the depth detection unit 293 may associate the multi-view image coded data with the depth data; and the metadata generation unit 282 may associate the multi-view image coded data with the metadata (e.g., array information or viewpoint number information).

In step S115, the file generation unit 294 generates the multi-view image file including the multi-view image coded data generated in step S114, the metadata thereof, and the depth data generated in step S113. Note that the format of the multi-view image file is optional. For example, when the multi-view image is a still image, the image may be converted into a file by an exchangeable image file format (EXIF) file format. Further, for example, when the multi-view image is a moving image, the image may be converted into a file by an MP4 (MPEG-4 Part 14) file format. Other formats may also be used, as a matter of course, to convert the image into a file.

Figure 23:
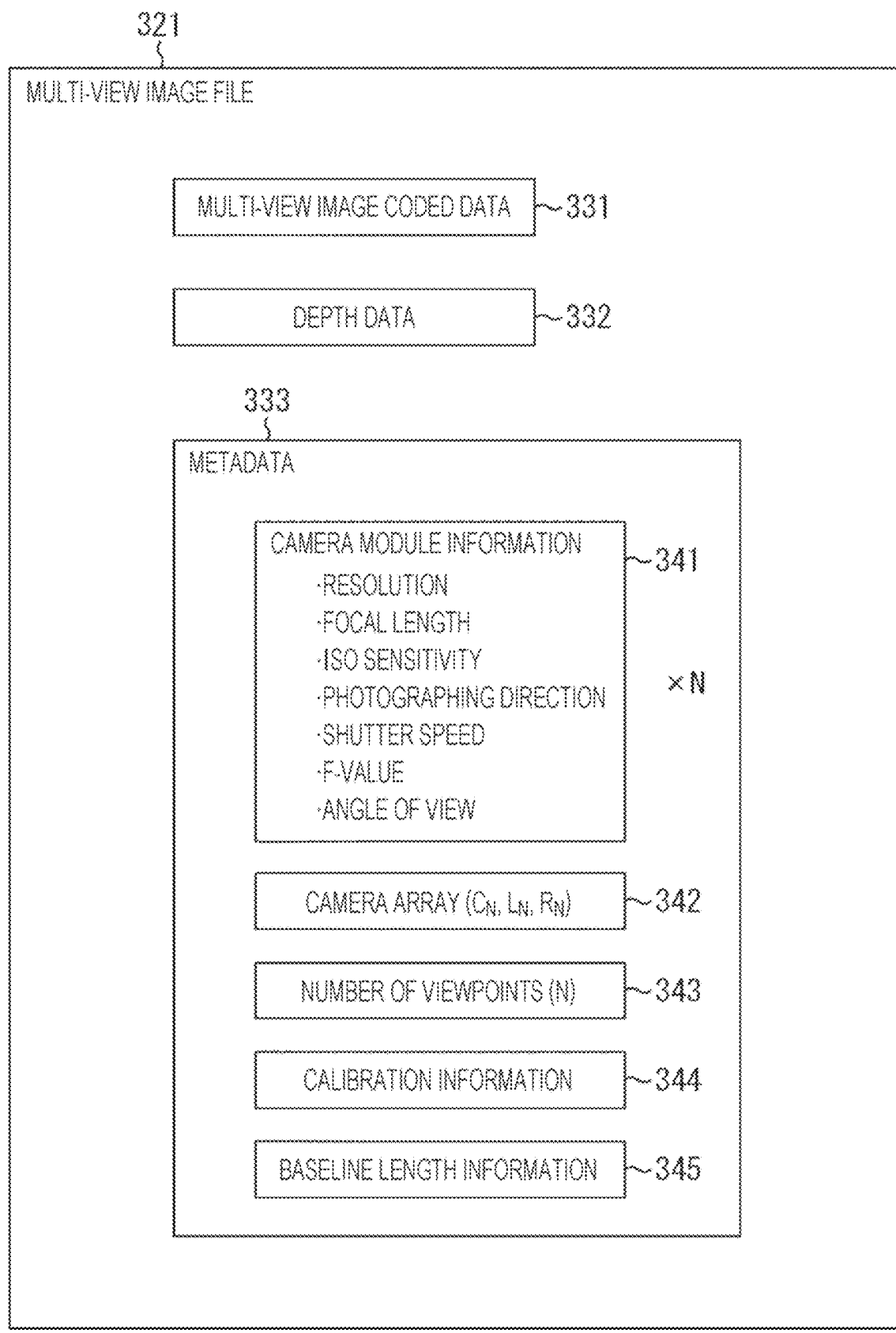
FIG. 23 is a diagram showing a main configuration example of a multi-view image file.

For example, the file generation unit 294 generates a multi-view image file 321 having a configuration as shown in FIG. 23. In the example shown in FIG. 23, the multi-view image file 321 includes multi-view image coded data 331, depth data 332, and metadata 333.

The multi-view image coded data 331 is the multi-view image coded data generated in step S114. The depth data 332 is the depth data generated in step S113, and is the depth data of the multi-view image of the multi-view image coded data 331. The metadata 333 is the metadata generated in step S102 and is the metadata of the multi-view image coded data 331.

As shown in FIG. 23, the metadata 333 includes, for example, camera module information 341, camera array information 342, viewpoint number information 343, calibration information 344, and baseline length information 345.

The camera module information 341 is information about imaging for obtaining each multi-view image, that is, information about each camera module 242 of the image pickup unit 236. For example, when N camera modules 242 are provided in the image pickup unit 236, the metadata 333 includes N pieces of camera module information 341. As shown in FIG. 23, the camera module information 341 includes information such as a resolution, a focal length, an ISO sensitivity, an image pickup direction, a shutter speed, an F-value, and an angle of view. The configuration of the camera module information 341 is optional, as a matter of course. Some of these pieces of information may be omitted, and information other than these pieces of information may be included.

Figure 24:
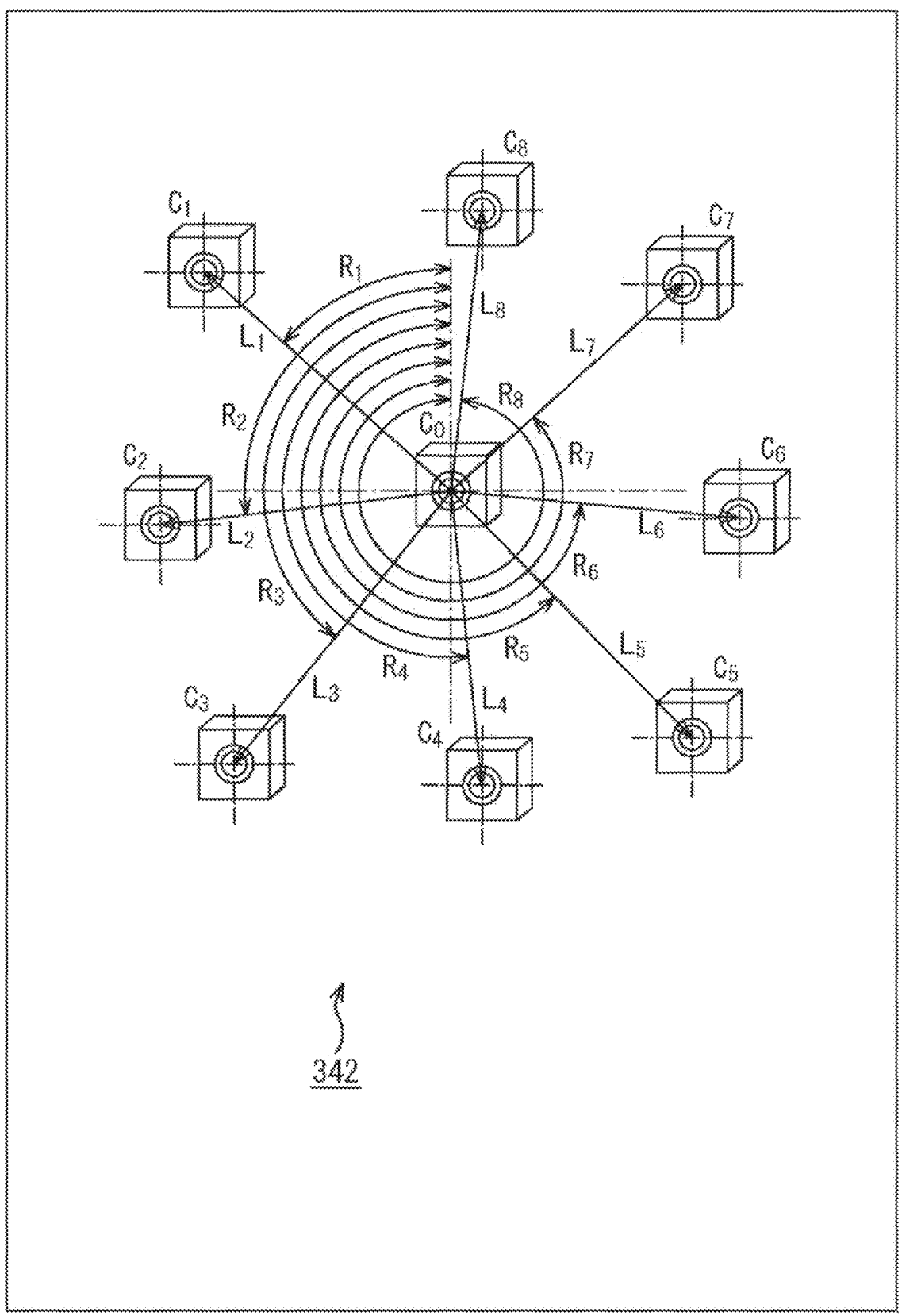
FIG. 24 is an example of a camera array.

The camera array information 342 is information indicating a relative positional relationship of each camera module 242. Specifically, the camera array information 342 is information indicating a relative positional relationship between viewpoints of multi-view images. For example, as shown in FIG. 24, the camera array information 342 includes a distance Lx from a reference camera module C0 to another camera module Cx (in the example shown in FIG. 24, x=1 to 8) (distance Lx from a reference viewpoint to each viewpoint), and a direction Rx from the reference camera module C0 to another camera module Cx (direction Rx from the reference viewpoint to each viewpoint).

The viewpoint number information 343 is information indicating the number of the camera modules 242 (the number of viewpoints). The calibration information 344 is information indicating a variation in the camera modules 242. The baseline length information 345 is information used as a reference for the length of a multi-view image.

Note that the configuration of the metadata 333 is optional. Some of these pieces of information may be omitted, and information other than these pieces of information may be included.

FIG. 25 is a diagram showing a configuration example of each piece of such metadata. As shown in A of FIG. 25, information such as a resolution, a focal length, an ISO sensitivity, an image pickup direction, a shutter speed, an F-value, and an angle of view, may be displayed as the camera module information 341 for each camera module 242.

Assuming that these parameters of each camera module 242 are different values, for example, in the case of overlapping captured images of multi-view images, the selection of captured images to overlap and the combination ratio thereof are controlled in accordance with the values of the parameters, thereby making it possible to obtain an image with a higher quality. For example, only captured images having those parameters closer to desired values are superimposed on one another, or captured images having those parameters closer to the desired values are superimposed at higher rates (the combination ratios of those captured images are made higher), so that an image having those parameters closer to the desired values can be easily obtained. As a result, unnecessary image processing to change the parameters can be reduced. Accordingly, image quality degradation due to the image processing can be reduced (an image with a higher quality can be obtained).

Further, as the respective captured images have various values as the parameters, a captured image having parameters closer to the desired values can be obtained, regardless of the values of the parameters of the image obtained as a result of the superimposition. That is, an image with a higher quality can be obtained, regardless of the values of the parameters.

The camera array information 342 may indicate the array of the camera modules 242 with the relative positional relationship (CN, LN, RN) as in the example shown in FIG. 23, or may indicate a predetermined type of array such as "X type" as in the example shown in A of FIG. 25. The degree of freedom of the array can be increased in the example shown in FIG. 23. An increase in the amount of information in the metadata can be reduced in the example shown in FIG. 25.

Further, the viewpoint number information 343 is shown as a number as in the example shown in A of FIG. 25.

The calibration information 344 may be formed with the information that indicates the positions of the respective viewpoints of the multi-view image, for example. In the example shown in A of FIG. 25, the calibration information 344 is formed with the coordinate information about the respective camera modules 242 (or the information indicating the central coordinates of the respective camera modules). Alternatively, the calibration information 344 may be formed with information that corrects the degrees of luminance of the respective images of the multi-view image, for example. In the example shown in B of FIG. 25, the calibration information 344 is formed with luminance correction data information about the respective camera modules 242.

The baseline length information 345 may include, for example, the information that indicates the distances from the reference viewpoint to the respective viewpoints of the multi-view image. In the example shown in C of FIG. 25, the baseline length information 345 includes the information that indicates the distances from the reference camera module 242 to the other camera modules 242.

Referring again to FIG. 21, in step S116, the data management unit 295 supplies and stores the multi-view image file generated in step S115 into the storage unit 263, and generates and manages the file management information 302 about the multi-view image file. Further, the user management unit 291 updates the user management information 301 about the user stored in the storage unit 263, and registers the multi-view image file with the user.

When the processing in step S116 is finished, the multi-view image utilization service provision process comes to an end.

As such a multi-view image utilization service provision processing is executed, a user can more easily register multi-view image data obtained by multi-view imaging in the server 202. Further, the multi-view image data and the data related to the multi-view image (such as depth data and metadata) are converted into a file and are then managed. Accordingly, the user can more easily use the multi-view image data he/she has registered. That is, the multi-view image utilization service provision system 200 (the multi-view image utilization service platform 100) can increase the convenience of the service using the multi-view image.

Further, in the above description, multi-view imaging is performed by using the image pickup unit 236 including the plurality of camera modules 242, to generate a multi-view image (multi-view image data). However, a multi-view image (multi-view image data) may be generated by any method. For example, a multi-view image may be generated by performing imaging (capturing a moving image or capturing a plurality of still images) while moving the imaging position and the imaging direction (or the viewpoint) by using an image pickup unit including a single image pickup element and an optical system (or an image pickup unit including a single camera module 242). Alternatively, the interpolation image may be generated by the interpolation image generation of the first embodiment. In this case, the information about a displacement in the imaging position and the imaging direction (or the viewpoint) is desirably associated as metadata with multi-view image data (multi-view image coded data).

Also, in the above description, the multi-view image file generated by the file generation unit 294 is stored and managed in the storage unit 263 of the server 202. However, a multi-view image file may be managed in any other site. For example, a multi-view image file may be stored and managed in a device other than the server 202 (such as a file management server (not shown)). In that case, the file generation unit 294 transmits the generated multi-view image file as a bit stream or auxiliary information about a bit stream to the device via the communication unit 264, for example. In this case, the device may include: a communication unit that acquires the multi-view image file by communicating with the server 202; a storage unit that stores the acquired multi-view image file; and a data management unit as the functional block that manages the multi-view image file stored in the storage unit, updates the multi-view image file, or supplies the multi-view image file to another device such as the terminal device 201 or the server 202, as needed.

Further, in the above description, a multi-view image file is generated in the server 202. However, a multi-view image file may be generated in any device. For example, a multi-view image file may be generated in the terminal device 201. In this case, the CPU 221 of the terminal device 201 may further include a necessary functional block such as the file generation unit 294, as appropriate. In such a case, the file generation unit 294 may generate a multi-view image file after multi-view image data is encoded by the coding unit 283 (or after the processing in step S103). Then, in step S104, the transmission control unit 284 transmits the multi-view image file as a bit stream or auxiliary information about a bit stream to the server 202, for example. In step S111, the acquisition control unit 292 may control the communication unit 264 to acquire the multi-view image file.

Further, in the above description, the interpolation image of the multi-view image can be generated in the server before the image is converted into a file. However, the interpolation image of the multi-view image can be generated by the method of the first embodiment described above before the image is displayed on the terminal device 201, and the multi-view image for which the interpolation image is generated can be displayed.

<Flow of Depth Detection Processing>

Figure 26:
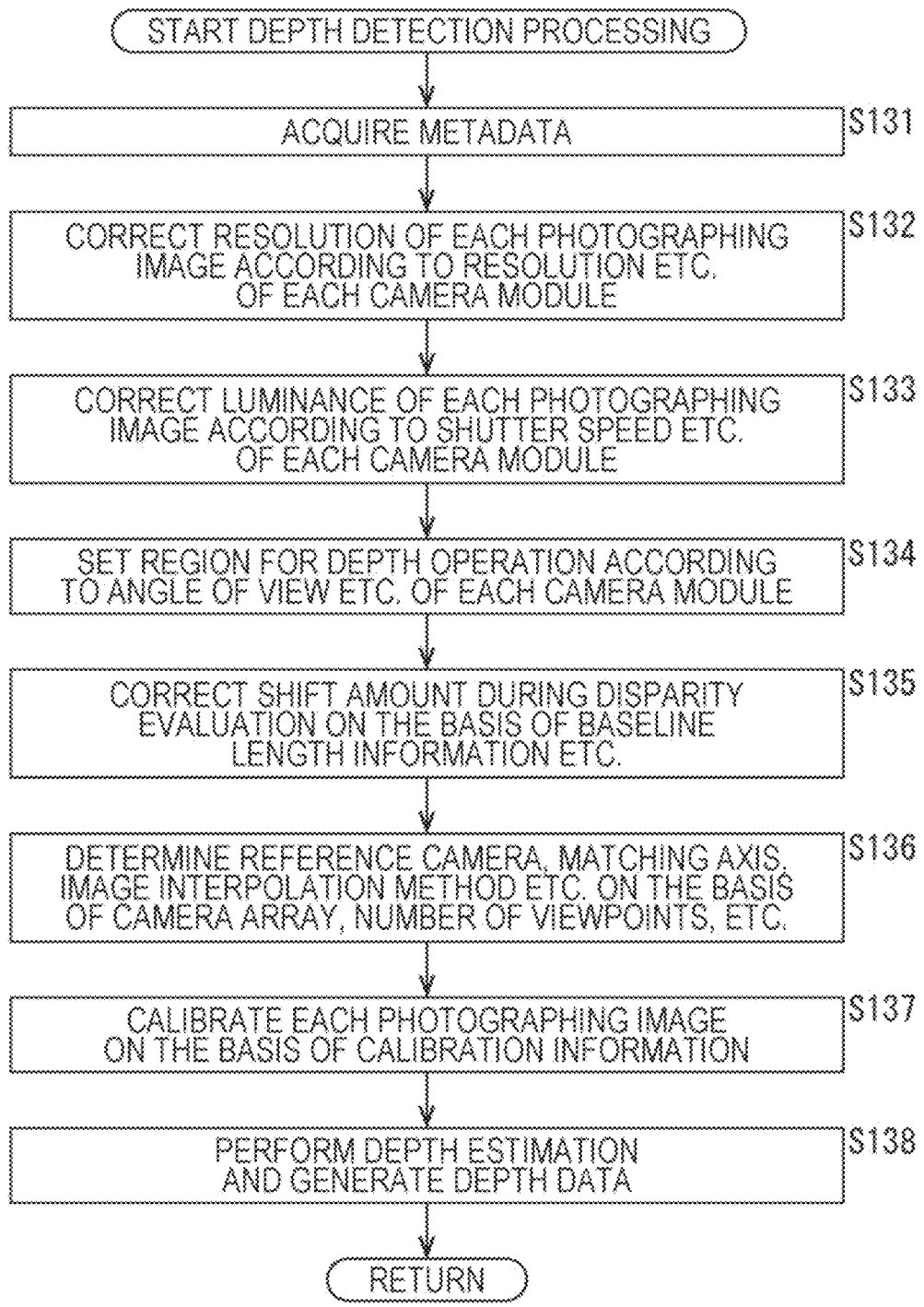
FIG. 26 is a flowchart illustrating an example of a flow of depth detection processing.

Next, an example of a flow of depth detection processing executed in step S113 shown in FIG. 21 will be described with reference to the flowchart in FIG. 26.

When the depth detection processing is started, the depth detection unit 293 acquires the metadata 333 in step S131. In step S132, the depth detection unit 293 corrects the resolution of each captured image in accordance with the resolution or the like of each camera module 242.

In step S133, the depth detection unit 293 corrects the luminance of each of the captured images in accordance with the shutter speed and the like of each of the camera modules. In step S134, the depth detection unit 293 sets the area to be used in the depth calculation in accordance with the angle of view of each of the camera modules.

In step S135, the depth detection unit 293 corrects the shift amount at the time of disparity evaluation on the basis of the baseline length information 345 and the like. In step S136, the depth detection unit 293 determines the reference camera, the matching axis, the image interpolation method, and the like on the basis of the camera array, the number of viewpoints, and the like.

In step S137, the depth detection unit 293 calibrates each of the captured images on the basis of the calibration information 344. In step S138, the depth detection unit 293 estimates the depth by repeating stereo matching or the like, and detects depth data.

After the depth data is detected, the process returns to FIG. 21.

As the depth detection processing is performed in the manner as described above, a user can generate and use depth data more easily.

Further, for example, when the first embodiment is applied to the third embodiment, the same advantageous effect as the advantageous effect of the first embodiment can be obtained in the third embodiment. For example, a high-definition viewpoint interpolation image can be generated at high speed. That is, a user can obtain a high-definition image.

<4. Fourth Embodiment>
<Application Sales>

As described in the second embodiment, the multi-view image utilization service platform 100 can provide, for example, a service for conducting sales of the application 112 in the application market 102. In this embodiment, such an application sales will be described.

<Multi-view Image Utilization Service Provision System>

Figure 27:
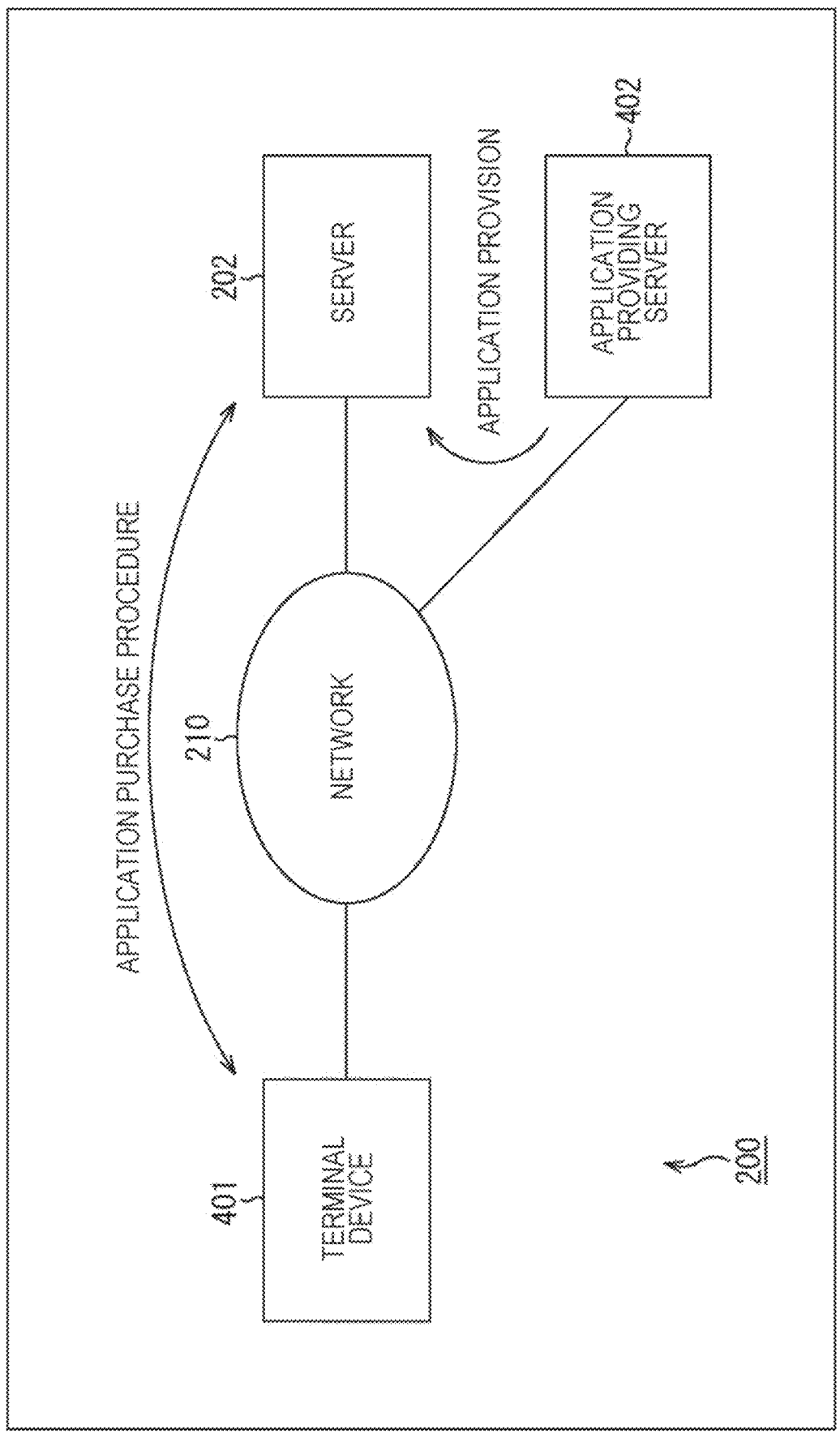
FIG. 27 is a diagram showing another configuration example of the multi-view image utilization service provision system.

FIG. 27 is a diagram showing a main configuration example of the multi-view image utilization service provision system. The multi-view image utilization service provision system 200 shown in FIG. 27 is an example of the system to which the present technology is applied, and is a system in which the server 202 provides services utilizing a multi-view image to the terminal device 201 connected to the server via the network 210. In other words, the multi-view image utilization service provision system 200 is an example of a configuration for implementing the multi-view image utilization service platform 100.

FIG. 27 shows an example of a configuration for providing a service for selling or providing the application 112 among the services to be provided by the multi-view image utilization service platform 100. In FIG. 27, the multi-view image utilization service provision system 200 includes a terminal device 401 connected to the network 210, the server 202, and an application providing server 402.

The terminal device 401 which is connected to the network 210 in a wired or wireless manner communicates with the server 202, thereby performing a procedure for purchase of the application 112. The terminal device 401 may be the terminal device 201, or may be a terminal device different from the terminal device 201. The terminal device 401 has a configuration which is basically similar to that of the terminal device 201. Accordingly, the configuration shown in FIG. 16 is also applicable to the terminal device 401. However, since the terminal device 401 does not require any function related to imaging, so that the image pickup unit 236 can be omitted.

The application providing server 402 is a server that provides the application 112 to the multi-view image utilization service platform 100 (application market 102). The server 202 sells or provides the application provided by the application providing server 402 to (the user of) the terminal device 401.

<Server>

Figure 28:
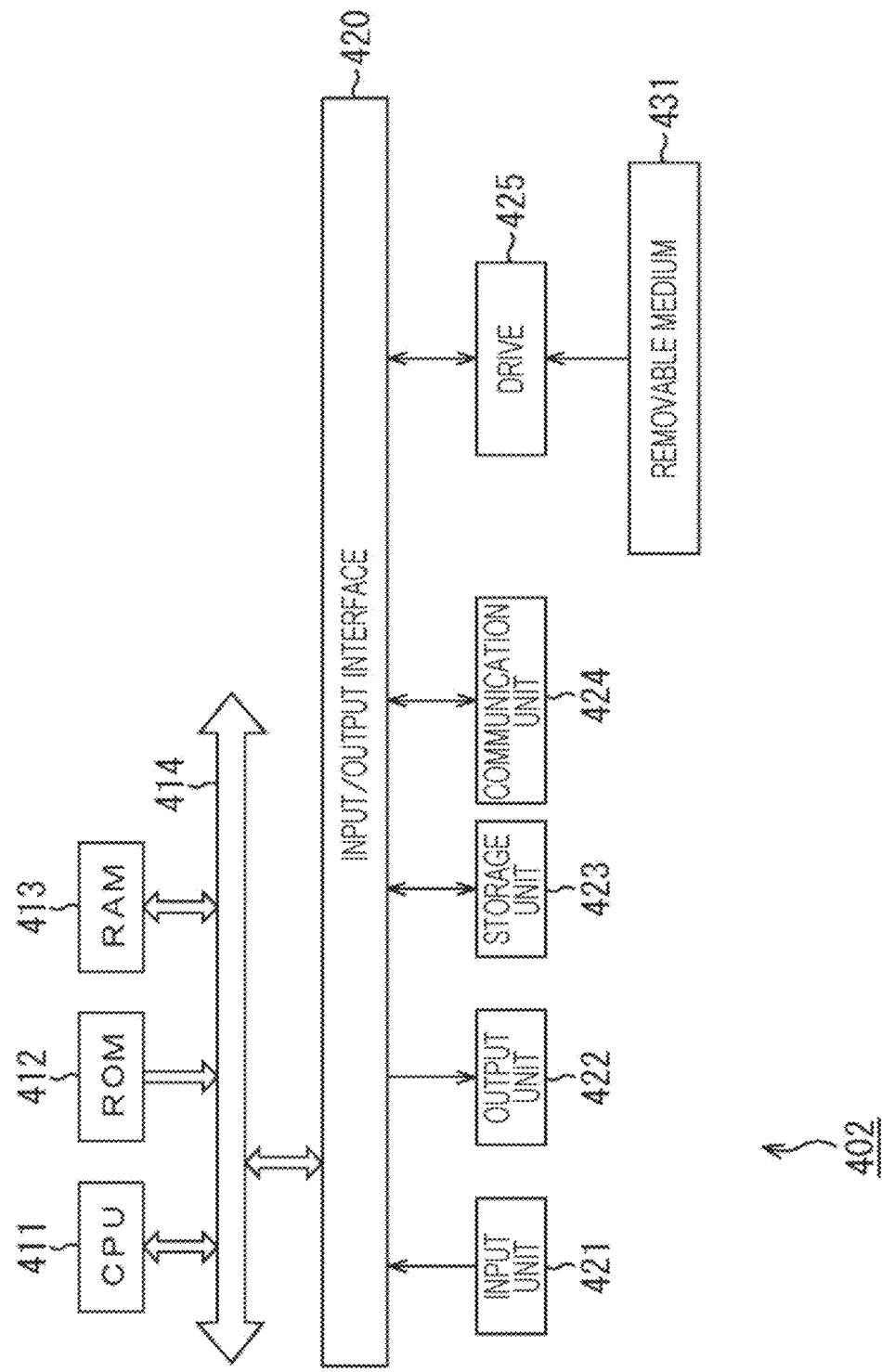
FIG. 28 is a diagram illustrating a main configuration example of an application providing server.

FIG. 28 is a block diagram showing a main configuration example of the application providing server 402. As shown in FIG. 28, in the application providing server 402, a CPU 411, a ROM 412, and a RAM 413 are interconnected via a bus 414.

The bus 414 is also connected with an input/output interface 420. The input/output interface 420 is connected with an input unit 421, an output unit 422, a storage unit 423, a communication unit 424, and a drive 425.

The input unit 421 is formed with an input device that accepts external information such as a user input. For example, the input unit 421 includes operation buttons, a touch panel, a microphone, a camera, an input terminal, and the like. Further, various sensors such as an acceleration sensor, an optical sensor, and a temperature sensor may be included in the input unit 421. The output unit 422 is formed with an output device that outputs information such as an image and audio. For example, the output unit 422 includes a display, a speaker, an output terminal, and the like.

The storage unit 423 is formed with, for example, a hard disk, a RAM disk, a non-volatile memory, or the like. The communication unit 424 is formed with, for example, a network interface. The drive 425 drives a removable medium 431 such as a magnetic disk, an optical disk, a magneto-optical disk, or a semiconductor memory.

The CPU 411 performs various kinds of processes by loading a program stored in the storage unit 423 into the RAM 413, for example, via the input/output interface 420 and the bus 414, and executing the program. Data and the like necessary for the CPU 411 to execute various kinds of processes are stored in the RAM 413 as appropriate.

The program executed by the CPU 411 can be recorded in a removable medium 431 as a package medium or the like, and can be provided to the application providing server 402. In this case, the program can be installed in the storage unit 423 via the input/output interface 420 when the removable medium 431 is mounted in the drive 425.

Further, this program can also be provided to the application providing server 402 via a wired or wireless transmission medium such as a LAN, the Internet, or digital satellite broadcasting. In this case, the program can be received by the communication unit 424 via the wired or wireless transmission medium and installed in the storage unit 423.

Alternatively, this program can also be preliminarily installed in the ROM 412 or the storage unit 423.

<Functional Blocks>

Figure 29:
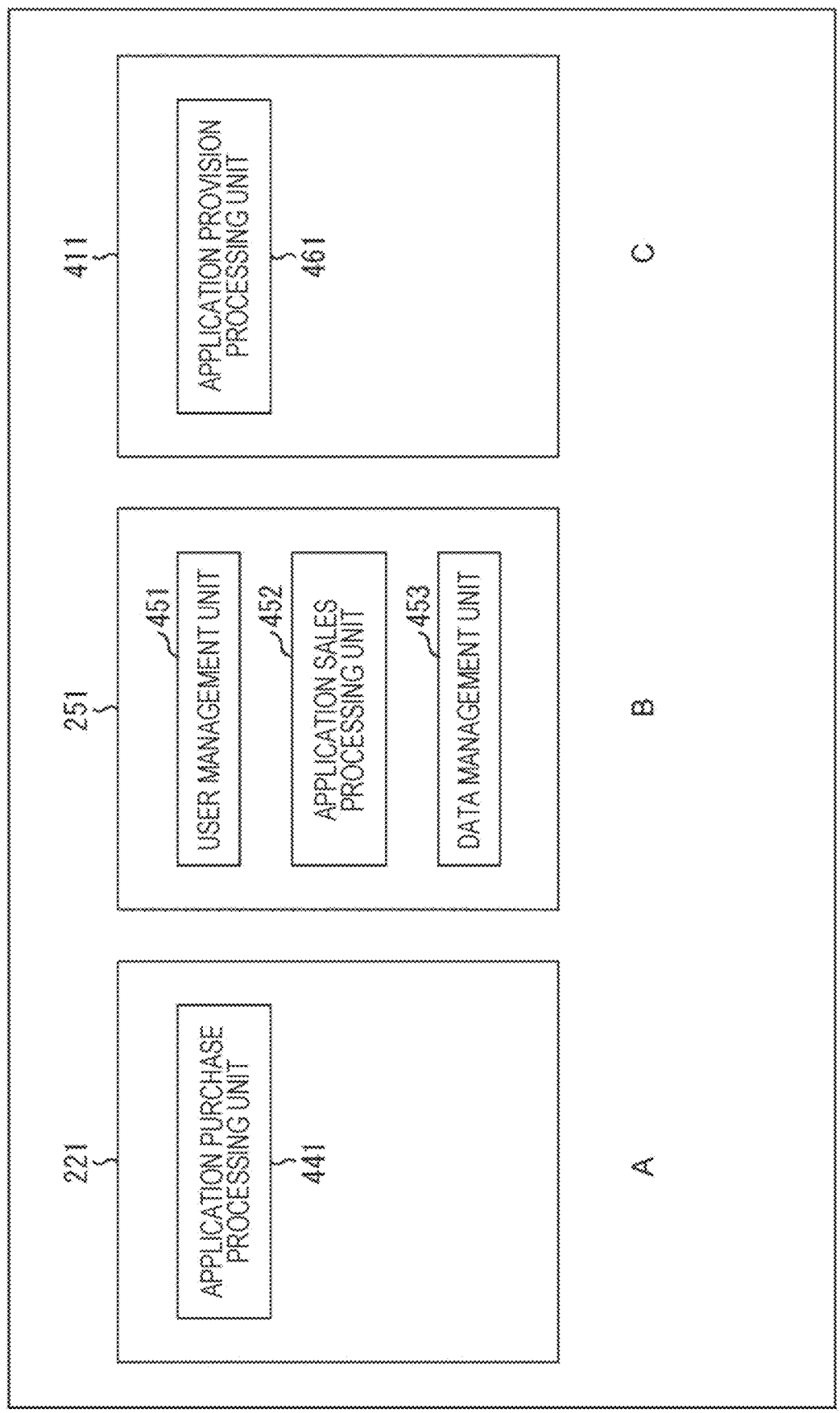
FIG. 29 is a functional block illustrating functions included in the terminal device, the server, and the application providing server.

The terminal device 401 includes functions which are shown as functional blocks in A of FIG. 29 when the CPU 221 executes a predetermined program. As shown in A of FIG. 29, the CPU 221 includes functional blocks such as an application purchase processing unit 441.

The application purchase processing unit 441 controls the respective units such as the input unit 231, the output unit 232, the storage unit 233, and the communication unit 234, communicates with the server 202, display images, and accepts user's instructions, thereby performing the processing related to purchase of the application.

Further, the server 202 includes functions shown as functional blocks in B of FIG. 29 when the CPU 251 executes a predetermined program. As shown in B of FIG. 29, the CPU 251 includes functional blocks such as a user management unit 451, an application sales processing unit 452, and a data management unit 453.

Like the user management unit 291, the user management unit 451 performs processing of managing the users to which the multi-view image utilization service is provided. The application sales processing unit 452 controls the communication unit 264 to, for example, communicate with the terminal device 401, thereby performing the processing related to sales of the application. Like the data management unit 295 (B in FIG. 19), the data management unit 453 performs the processing related to management of data such as the multi-view image file. Further, for example, the data management unit 453 performs the processing related to management of the application supplied from the application providing server 402.

Further, the application providing server 402 includes functions which are shown as functional blocks in C of FIG. 29 when the CPU 411 executes a predetermined program. As shown in C of FIG. 29, the CPU 411 includes functional blocks such as an application provision processing unit 461.

The application provision processing unit 461 controls the communication unit 424 to, for example, communicate with the server 202, thereby performing the processing related to the provision of the application to the server 202.

<Flow of Multi-view Image Utilization Service Provision Processing>

Figure 30:
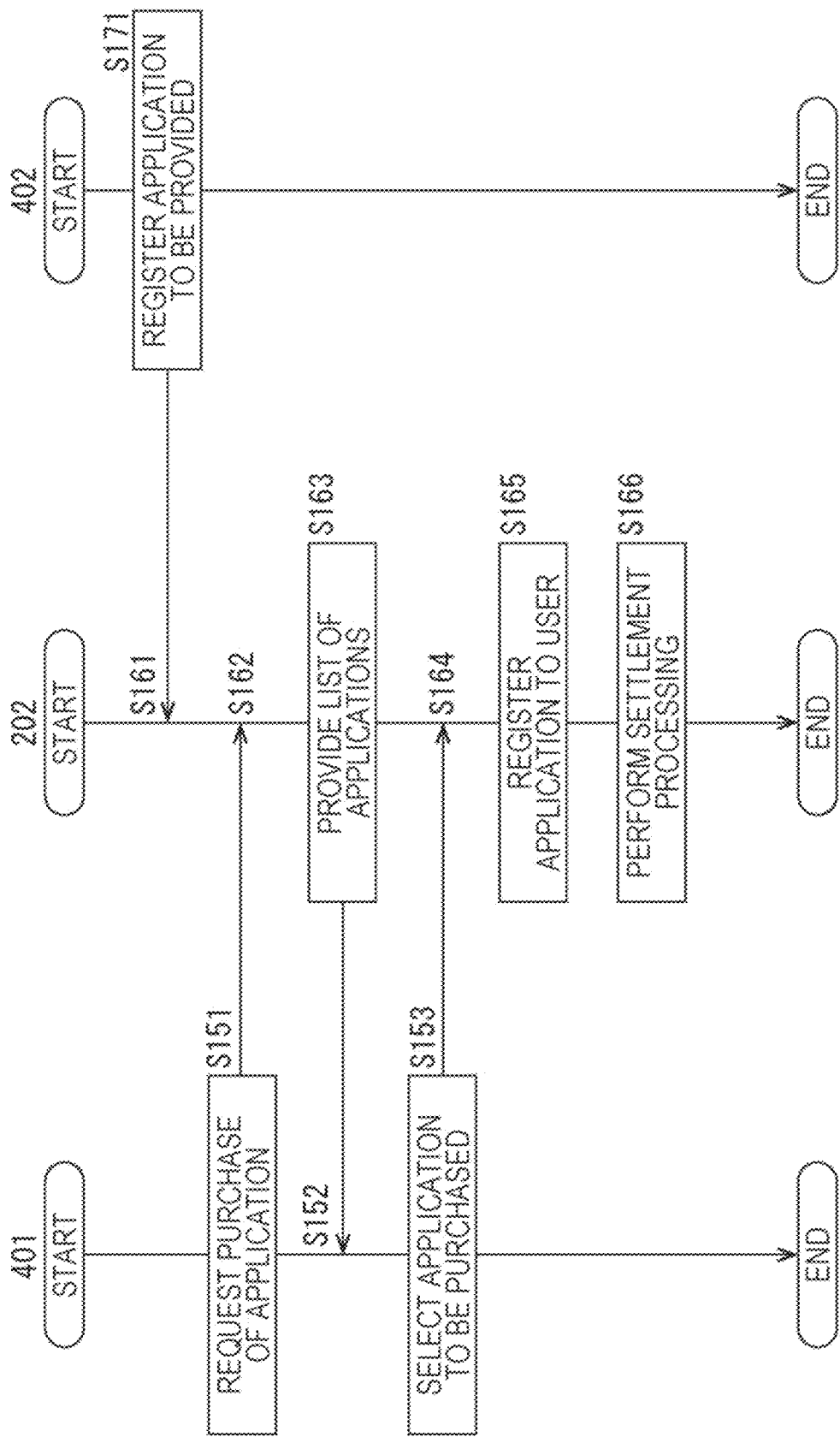
FIG. 30 is a flowchart showing another example of the flow of multi-view image utilization service provision processing.

The terminal device 401, the server 202, and the application providing server 402 of the multi-view image utilization service provision system having the configuration as described above executes the multi-view image utilization service provision processing, thereby providing services utilizing the multi-view image. In this embodiment, services for conducting sales or the like of an application are provided. An example of a flow of multi-view image utilization service provision processing executed by those devices will be described with reference to the flowchart in FIG. 30.

In step S171, the application provision processing unit 461 of the application providing server 402 supplies the application to be provided to the server 202 by, for example, controlling the communication unit 424, and registers the application.

In step S161, the data management unit 453 of the server 202 controls the communication unit 264 or the like to acquire the application supplied from the application providing server 402, causes the storage unit 263 to store the application, and manages the application so that the application can be sold to the terminal device 401.

In step S151, the application purchase processing unit 441 of the terminal device 401 controls the communication unit 234 and requests the server 202 to purchase the application.

In step S162, the application sales processing unit 452 of the server 202 acquires the request by, for example, controlling the communication unit 264.

In step S163, the application sales processing unit 452 cooperates with the user management unit 451 and the data management unit 453, to create a list of applications that can be sold to the user. Then, the application sales processing unit 452 provides the application list to the terminal device 401 by, for example, controlling the communication unit 264.

In step S152, the application purchase processing unit 441 of the terminal device 401 acquires the application list. The application purchase processing unit 441 controls the output unit 232, for example, to display the application list on a monitor or the like, for example, so that the application list is presented to the user, and accepts an instruction from the user.

Figure 31:
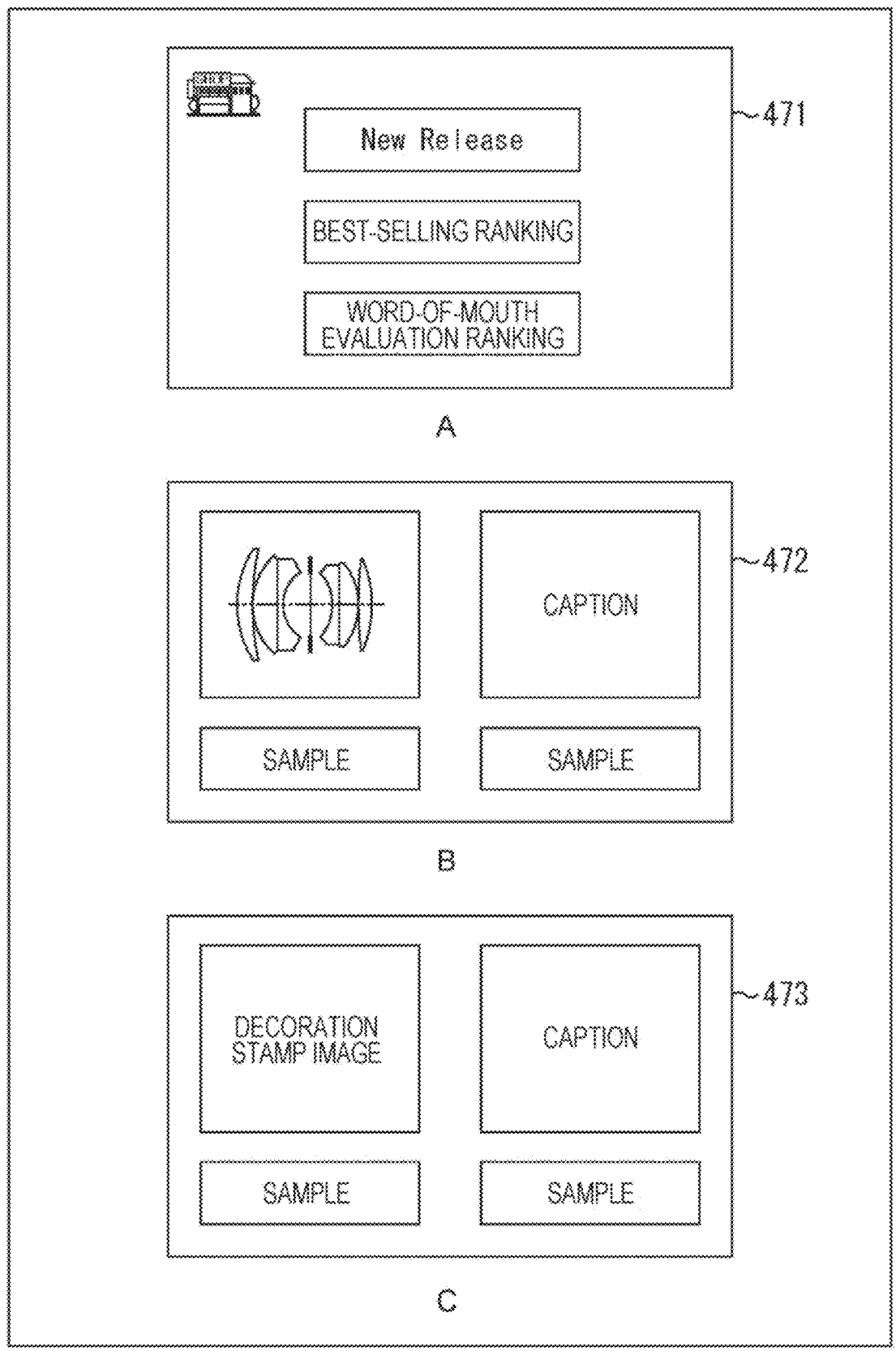
FIG. 31 is a diagram showing an example of an information display.

For example, a GUI (Graphical User Interface) 471 shown in A of FIG. 31 is displayed on the monitor of the terminal device 401. On the basis of such a GUI, the user selects a desired application from a number of applications. In a case where an application for lens simulation is selected, for example, a GUI 472 as shown in B of FIG. 31 is displayed, and a virtual lens is selected. Further, in a case where an application for editing images is selected, for example, a GUI 473 as shown in C of FIG. 31 is displayed, and an editing function such as a decorating stamp or reproduction of a multi-view image is selected.

Referring again to FIG. 30, in step S153, when the user selects the application to be purchased from the list, the application purchase processing unit 441 receives the selection instruction, and controls the communication unit 234, for example, to supply control information for selecting the application to be purchased to the server 202.

In step S164, the application sales processing unit 452 of the server 202, for example, controls the communication unit 264 to acquire control information thereof. In step S165, the application sales processing unit 452 cooperates with the user management unit 451 and the data management unit 453, and associates the user management information 301 about the user with the selected application (the application designated by the user in the instruction to purchase), so that the selected application is registered with the user.

In step S166, the application sales processing unit 452 performs settlement processing related to the sales of the application. The user management unit 451 causes the user management information 301 about the user to reflect the settlement information (e.g., the points equivalent to the price or fee are subtracted from the points or money owned by the user. Further, this sale is added to the history of purchases of the application.).

When the processing in step S166 is finished, the multi-view image utilization service provision processing comes to an end.

By executing such a multi-view image utilization service provision processing, a user can more easily purchase an application for performing processing using multi-view images. Further, since the purchased applications are registered with the user and are managed in the server 202, the user can more easily use the applications he/she has purchased. In other words, the multi-view image utilization service provision system 200 (the multi-view image utilization service platform 100) can increase the convenience of the services using multi-view images. Further, the image interpolation method of the first embodiment is applied in these applications, which makes it possible to provide a high-quality multi-view image at high speed.

Note that applications may not be sold, and may be provided for free. In this case, the settlement processing can be omitted.

<5. Fifth Embodiment>
<Virtual Lens Processing>

By executing an application provided to a user as described above, the multi-view image utilization service platform 100 can provide various services using multi-view images to the user.

In this embodiment, a state in which an application for performing the lens simulation (virtual lens processing) described in the second embodiment is executed is described as an example of the application.

<Multi-view Image Utilization Service Provision System>

Figure 32:
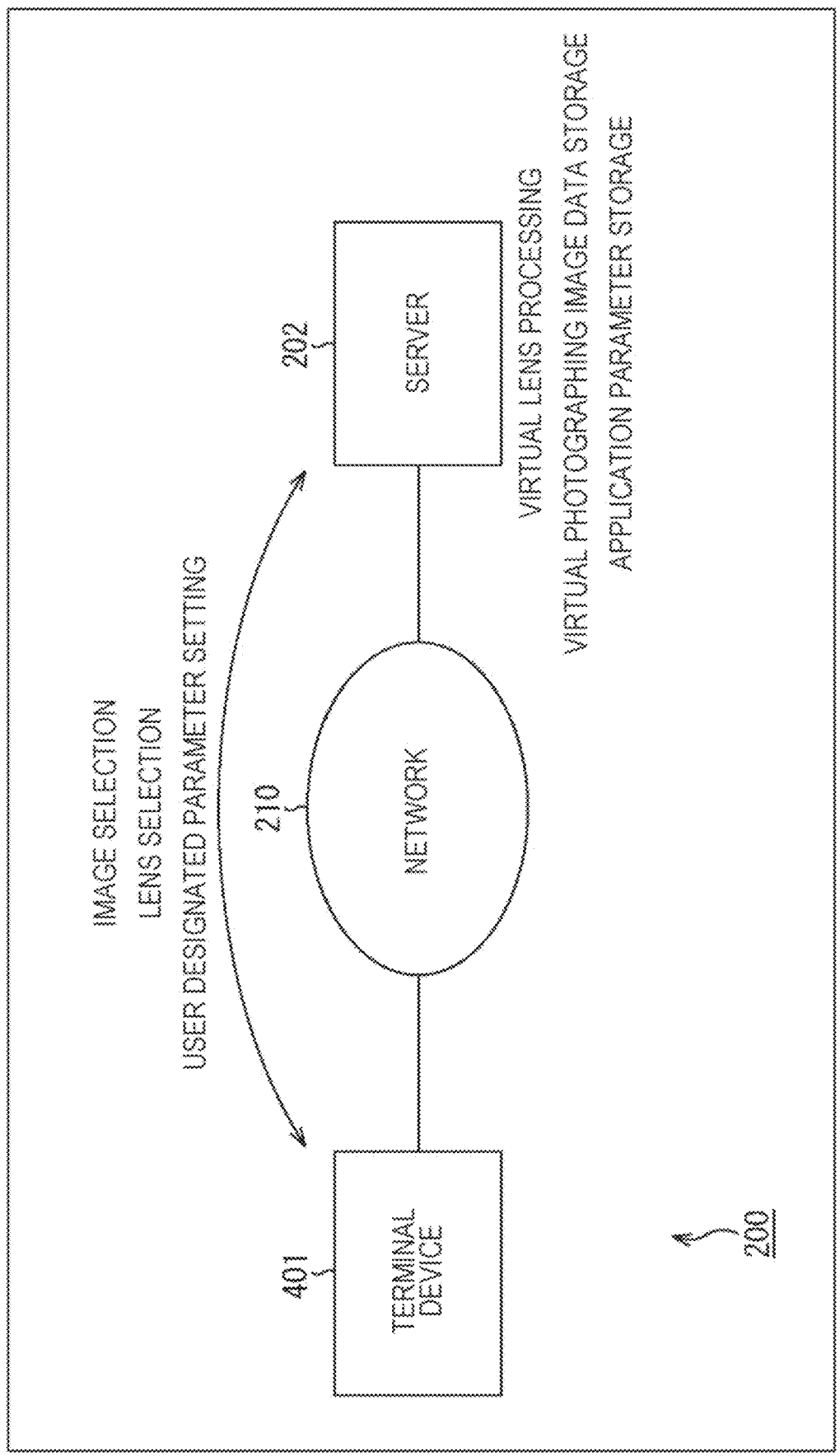
FIG. 32 is a diagram showing still one more configuration example of the multi-view image utilization service provision system.

FIG. 32 is a diagram showing a main configuration example of the multi-view image utilization service provision system. The multi-view image utilization service provision system 200 shown in FIG. 32 is an example of the system to which the present technology is applied, and a system in which the server 202 provides services utilizing multi-view images to the terminal device 201 connected to the server via the network 210. That is, the multi-view image utilization service provision system 200 is an example of a configuration for implementing the multi-view image utilization service platform 100.

FIG. 32 shows an example of a configuration for providing a service for the lens simulation (virtual lens processing) among the services to be provided by the multi-view image utilization service platform 100. In FIG. 32, the multi-view image utilization service provision system 200 includes the terminal device 401 and the server 202 which are connected to the network 210.

The terminal device 401 connected to the network 210 in a wired or wireless manner communicates with the server 202, to select the multi-view image to be used in the lens simulation, select the virtual lens to be simulated, and set user designated parameters that are imaging-related parameters having values designated by a user, such as a focusing position and a depth of field.

On the basis of those processes, the server 202 executes virtual lens processing to simulate a virtual lens, and generates virtual captured image data obtained by imaging using the virtual lens. The server 202 also saves (stores and manages) the virtual captured image data. Further, in the lens simulation described above, the server 202 generates and saves (stores and manages) history information, which indicates what value has been set for which parameter, what kind of operation (instruction) has been performed by the user, what kind of processing has been performed, and the like, as application parameters of the application for performing the lens simulation.

<Outline of Virtual Lens Processing>

Figure 14:
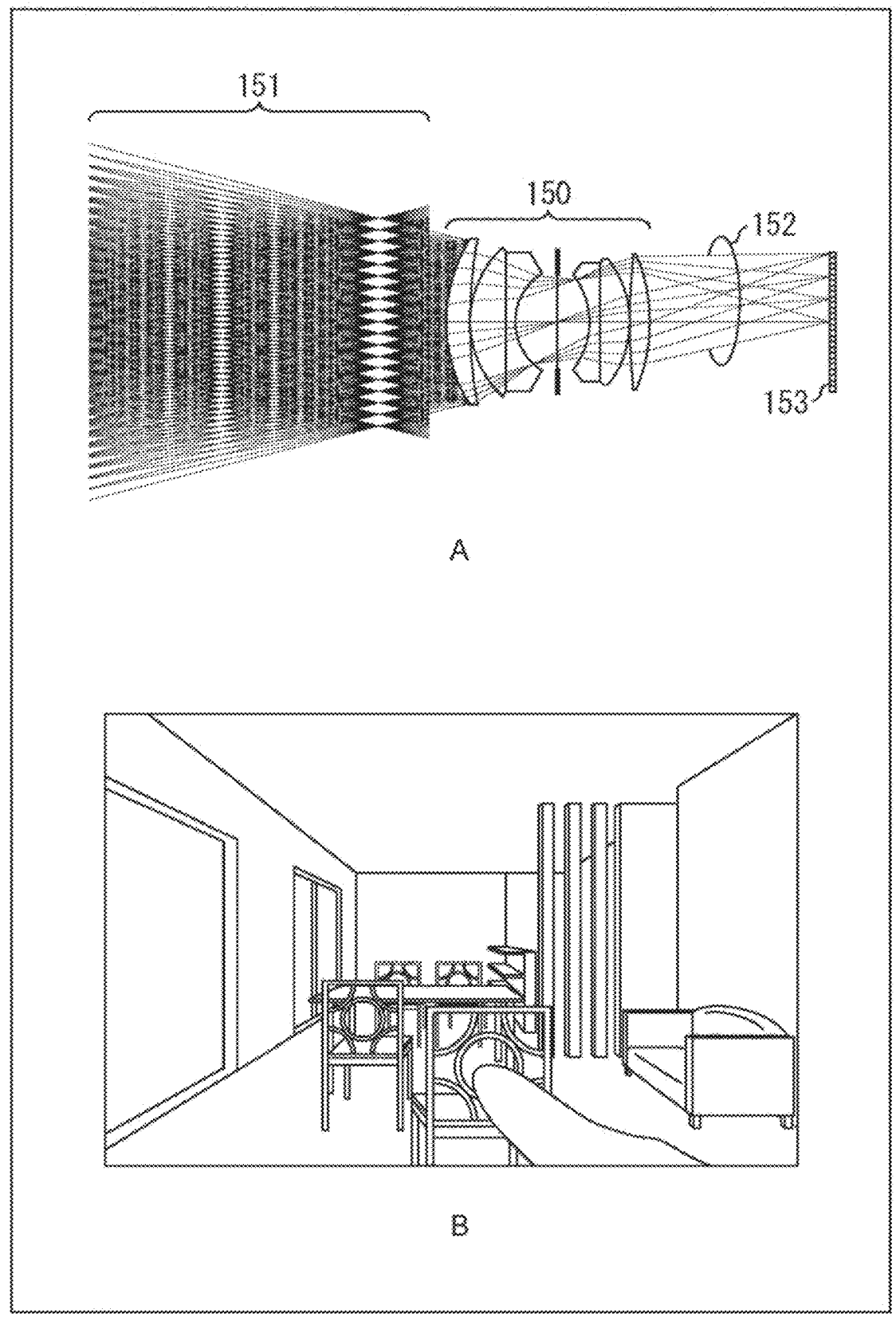
FIG. 14 is a diagram illustrating an example of an application using multi-view images.

Next, an outline of virtual lens processing is described. In the virtual lens processing, the virtual lens 150 designated by a user as shown in A of FIG. 14 is set, and the beam vector 151 that is light incident on the virtual lens 150 from a subject, a beam vector 152 that is the incident light after passing through the virtual lens 150, a virtual image sensor 153 that obtains a virtual captured image from the beam vector 152, and the like are simulated (appear in a pseudo manner), and a virtual captured image is generated from a multi-view image on the basis of the simulation.

Figure 33:
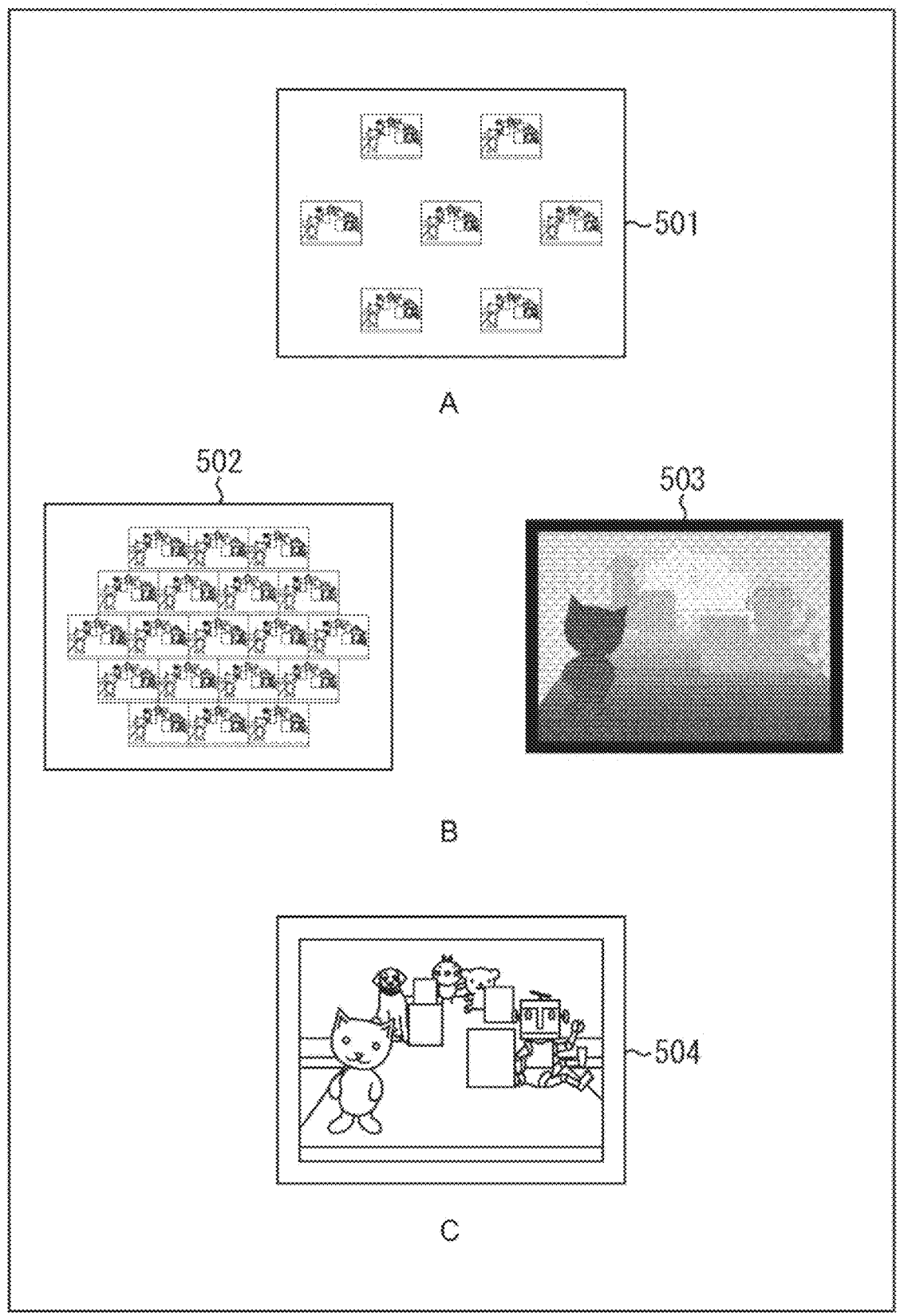
FIG. 33 is a diagram illustrating an example of a state of a flow of virtual lens processing.

For example, the interpolation images 502 and the depth data 503 shown in B of FIG. 33 are generated from a multi-view image 501 shown in A of FIG. 33, and a virtual captured image 504 obtained by imaging using the virtual lens 150 (the virtual optical system shown in A of FIG. 14) as shown in C of FIG. 33 is generated by using the interpolation images 502 and the depth data 503. The image interpolation method of the first embodiment can be applied to the generation of the interpolation image 502.

In the above manner, the virtual captured image 504 that is larger than the respective captured images of the multi-view image 501, and reflects the optical effects given by the virtual lens 150 is obtained. An optical system such as the virtual lens 150 is simulated by using profile information which is unique to the virtual optical system and is formed with parameters for reproducing the optical effects of the virtual optical system. Therefore, the server 202 can easily reproduce various optical systems that range from existing ones to unrealistic ones. In short, a user can obtain various kinds of captured images at lower costs through this service. That is, the multi-view image utilization service provision system 200 (multi-view image utilization service platform 100) can increase the convenience of services using multi-view images.

<Functional Blocks>

Figure 34:
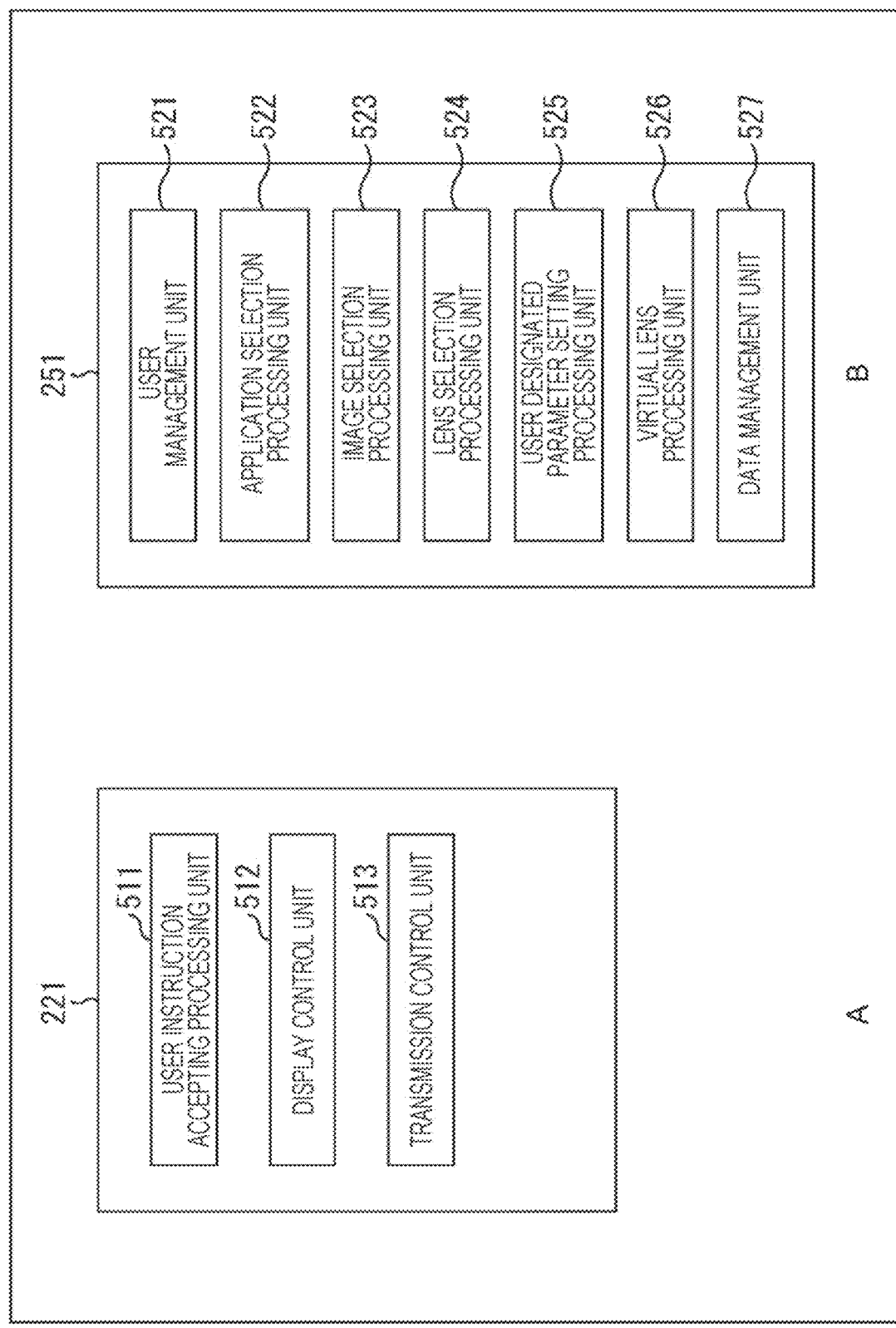
FIG. 34 is a functional block illustrating functions included in the terminal device and the server.

The terminal device 401 includes functions which are shown as functional blocks in A of FIG. 34 when the CPU 221 executes a predetermined program. As shown in A of FIG. 34, the CPU 221 includes functional blocks such as a user instruction acceptance processing unit 511, a display control unit 512, and a transmission control unit 513.

The user instruction acceptance processing unit 511 controls the input unit 231 or the like, to perform processing related to acceptance of a user instruction. The display control unit 512 controls the output unit 232 or the like, to perform processing related to display control to, for example, display an image such as a GUI or a guide on a monitor. The transmission control unit 513 controls the communication unit 234 or the like, to perform processing related to transmission of various kinds of information such as a user instruction accepted by the user instruction acceptance processing unit 511.

The server 202 includes functions which are shown as functional blocks in B of FIG. 34 when the CPU 251 executes a predetermined program. As shown in B of FIG. 34, the CPU 251 includes functional blocks such as a user management unit 521, an application selection processing unit 522, an image selection processing unit 523, a lens selection processing unit 524, a user designated parameter setting processing unit 525, a virtual lens processing unit 526, and a data management unit 527.

Like the user management unit 291, the user management unit 521 performs processing related to management of users to whom multi-view image utilization services are to be provided. The application selection processing unit 522 controls the communication unit 264 to, for example, communicate with the terminal device 401, and performs processing related to selection of the application to be executed. The image selection processing unit 523 controls the communication unit 264 to, for example, communicate with the terminal device 401, and performs processing related to selection of a multi-view image to be subjected to lens simulation processing (virtual lens processing). The user designated parameter setting processing unit 525 controls the communication unit 264 to, for example, communicate with the terminal device 401, and performs processing related to setting of user designated parameters transmitted from the terminal device 401. The virtual lens processing unit 526 performs processing related to the simulation (appearance in a pseudo manner) of a virtual optical system. Like the data management unit 295, the data management unit 527 performs processing related to management of data such as a multi-view image file, and management of an application and data related to the application.

For example, when the first embodiment is applied to the fifth embodiment, the interpolation image is generated. Accordingly, a high-definition multi-view image can be provided to a user at high speed in lens simulation.

<Flow of Multi-view Image Utilization Service Provision Processing>

The terminal device 401 and the server 202 of the multi-view image utilization service provision system having the above described configuration execute multi-view image utilization service provision processing to provide a service using multi-view images. In this embodiment, a service such as a lens simulation is provided. Referring now to the flowchart shown in FIG. 35, an example of a flow of the multi-view image utilization service provision processing to be executed by those devices is described.

In step S201, the user instruction acceptance processing unit 511 of the terminal device 401 controls the input unit 231 or the like, to accept an instruction to request activation of an application from a user. The transmission control unit 513 controls the communication unit 234 or the like, to supply the application activation request accepted by the user instruction acceptance processing unit 511 to the server 202.

In step S221, the application selection processing unit 522 of the server 202 controls the communication unit 264 or the like, to acquire the request. In response to the request, in step S222, the application selection processing unit 522 generates a list of applications that can be used by the user on the basis of the user management information managed by the user management unit 521, and controls the communication unit 264 or the like, to supply the list to the terminal device 401.

In step S202, the transmission control unit 513 of the terminal device 401 controls the communication unit 234 or the like, to acquire the list. The display control unit 512 controls the output unit 232, to display the acquired list as an image on a monitor. The user then selects the application to be activated on the basis of the list.

In step S203, the user instruction acceptance processing unit 511 controls the input unit 231 or the like, to accept an instruction as to the selection of the application to be activated from the user. The transmission control unit 513 controls the communication unit 234 or the like, to supply the application-to-be-activated selection instruction accepted by the user instruction acceptance processing unit 511 to the server 202.

In step S223, the application selection processing unit 522 of the server 202 controls the communication unit 264 or the like, to acquire the selection instruction. In step S224, the image selection processing unit 523 generates a list of multi-view images of the user on the basis of the user management information managed by the user management unit 521, and controls the communication unit 264 or the like, to supply the list to the terminal device 401.

In step S204, the transmission control unit 513 of the terminal device 401 controls the communication unit 234 or the like, to acquire the list. The display control unit 512 controls the output unit 232, to display the acquired list as an image on the monitor. The user then selects the multi-view image to be processed on the basis of the list.

In step S205, the user instruction acceptance processing unit 511 controls the input unit 231 or the like, to accept an instruction as to the selection of an image to be processed from the user. The transmission control unit 513 controls the communication unit 234 or the like, to supply the image-to-be-processed selection instruction accepted by the user instruction acceptance processing unit 511 to the server 202.

In step S225, the image selection processing unit 523 of the server 202 controls the communication unit 264 or the like, to acquire the selection instruction. In step S226, the lens selection processing unit 524 generates a list of the lenses registered with the user on the basis of the user management information managed by the user management unit 521, and controls the communication unit 264 or the like, to supply the list to the terminal device 401.

In step S206, the transmission control unit 513 of the terminal device 401 controls the communication unit 234 or the like, to acquire the list. The display control unit 512 controls the output unit 232, to display the acquired list as an image on the monitor. The user then selects the virtual lens to be simulated on the basis of the list.

In step S207, the user instruction acceptance processing unit 511 controls the input unit 231 or the like, to accept a lens selection instruction from the user. The transmission control unit 513 controls the communication unit 234 or the like, to supply the lens selection instruction accepted by the user instruction acceptance processing unit 511 to the server 202.

In step S227, the lens selection processing unit 524 of the server 202 controls the communication unit 264 or the like, to acquire the selection instruction.

Further, in step S208, the user instruction acceptance processing unit 511 of the terminal device 401 controls the input unit 231 or the like, to accept user designated parameters that are imaging-related parameters such as imaging conditions having values designated by the user. The transmission control unit 513 controls the communication unit 234 or the like, to supply the user designated parameters accepted by the user instruction acceptance processing unit 511 to the server 202.

In step S228, the user designated parameter setting processing unit 525 of the server 202 controls the communication unit 264 or the like, to acquire the user designated parameters.

In step S229, the virtual lens processing unit 526 executes virtual lens processing to generate a virtual captured image that is obtained by capturing an image of the subject in the multi-view image selected in step S225 with the virtual lens selected in step S227 while using the multi-view image data and the profile information including the parameters for reproducing the optical effects of a virtual optical system. In this case, the virtual lens processing unit 526 reproduces the optical influence of the virtual lens with higher precision by using the user designated parameters acquired in step S228. Further, in this case, the virtual lens processing unit 526 generates interpolation images for the multi-view image in accordance with the camera array information 342, the viewpoint number information 343, and the depth data 332 included in the multi-view image file of the multi-view image selected in step S225. The interpolation image generation method of the first embodiment can be applied to the interpolation image generation. The virtual lens processing will be described later in detail.

In step S230, the virtual lens processing unit 526 controls the communication unit 264 or the like, to supply the data of the virtual captured image generated by the processing in step S229 to the terminal device 401.

In step S209, the transmission control unit 513 of the terminal device 401 acquires the data of the virtual captured image. The display control unit 512 controls the output unit 232, to display the acquired virtual captured image on the monitor. On the basis of the virtual captured image, the user determines whether to save the virtual captured image.

In step S210, the user instruction acceptance processing unit 511 controls the input unit 231 or the like, to accept an instruction to save the data of the virtual captured image from the user. The transmission control unit 513 controls the communication unit 234 or the like, to supply the virtual captured image data saving instruction accepted by the user instruction acceptance processing unit 511 to the server 202.

In step S231, the data management unit 527 of the server 202 controls the communication unit 264 or the like, to acquire the virtual image data saving instruction. In step S232, the data management unit 527 generates application parameters about this lens simulation. The data management unit 527 stores and manages the data and the application parameters of the virtual captured image generated by the processing in step S229, and also registers the data and the application parameters with the user (or updates the user management information about the user).

When the processing in step S232 is finished, the multi-view image utilization service provision processing comes to an end.

By executing such multi-view image utilization service provision processing, a user can perform a virtual lens simulation more easily by using a multi-view image (or generate a virtual captured image obtained by imaging using a virtual lens). Further, since the generated virtual captured image data is registered with the user and is managed in the server 202, the user can use the virtual captured image data more easily. Furthermore, since the virtual captured image data is managed in association with the multi-view image, the application parameters, and the like used in generating the virtual captured image, the user can more easily use the virtual captured image data as well as the other related data. That is, the multi-view image utilization service provision system 200 (multi-view image utilization service platform 100) can increase the convenience of services using multi-view images.

Further, when the first embodiment is applied to the fifth embodiment, a high-definition viewpoint interpolation image can be generated at high speed. Therefore, a user can obtain a high-quality image with high lens reducibility.

<Example of Screen>

Figure 36:
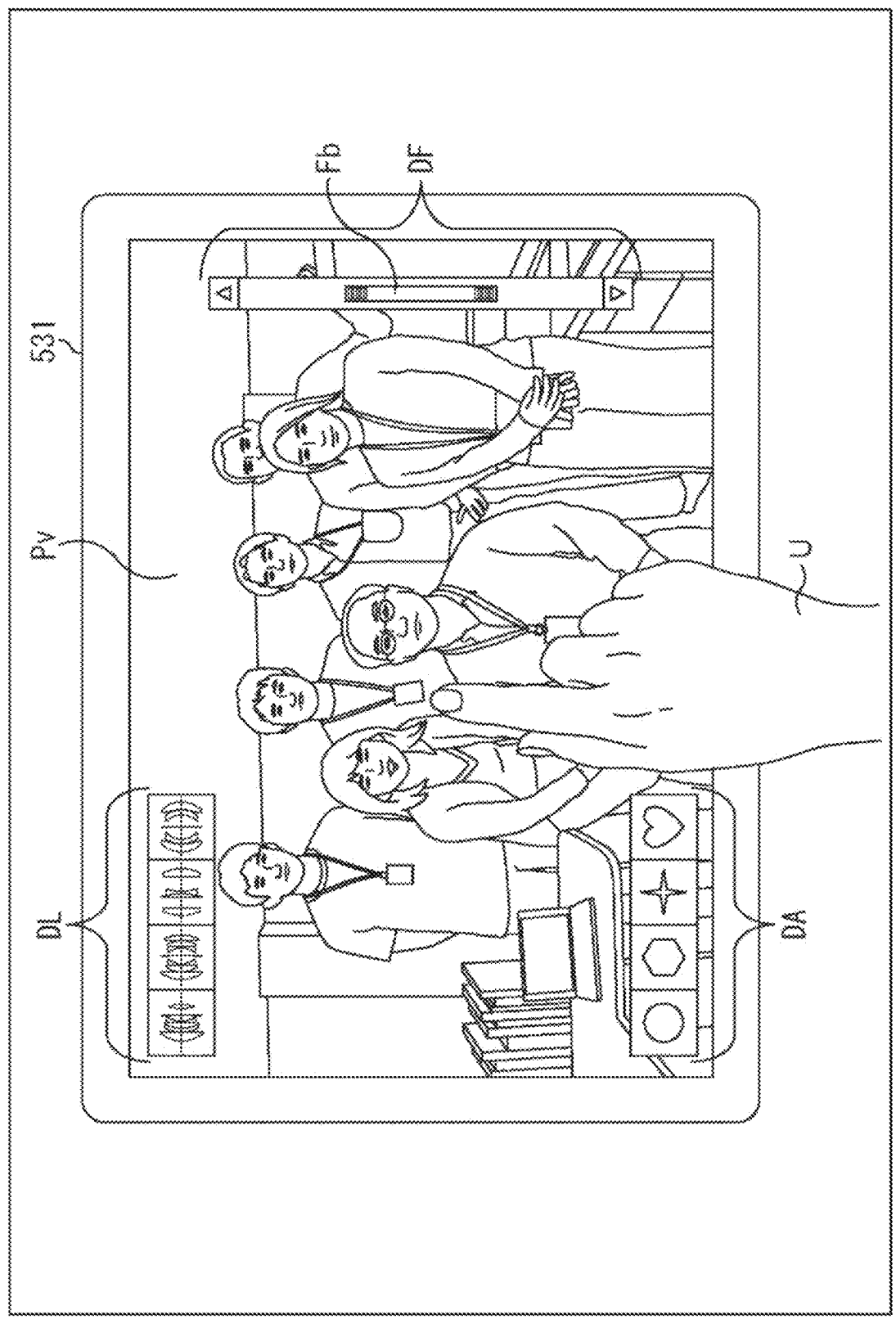
FIG. 36 is a diagram illustrating an example of a state of virtual lens selection.

FIG. 36 is a schematic diagram showing an example of a set GUI displayed on a display unit 531.

The screen shown in FIG. 36 displays a setting GUI as well as a preview image Pv. In the example shown in FIG. 36, development parameters are formed with the design information about the lens, the shape of the diaphragm, and the focus position.

In this case, a lens unit selection portion DL, a diaphragm shape selection portion DA, and a focus position selection portion DF are superimposed on the preview image Pv, and are displayed as the setting GUI on the display unit 531.

The lens unit selection portion DL displays figures that represent lens units based on selection candidates for the design information about a lens in the development parameters. The diaphragm shape selection portion DA displays figures that represent selection candidates for the diaphragm shape in the development parameters. The focus position selection portion DF displays a setting bar Fb that indicates the position of a selection candidate for the focus position.

The user touches, with a finger U, the figure that represents a desired lens unit displayed in the lens unit selection portion DL, to select a selection candidate for the design information about the lens corresponding to the lens unit. The user also touches, with the finger U, the figure that represents a desired diaphragm shape displayed in the diaphragm shape selection portion DA, to select a selection candidate for the diaphragm shape.

The user also touches, with the finger U, the setting bar Fb in the focus position selection portion DF, and moves the finger U up and down, to thereby move the setting bar Fb to the position corresponding to a desired focus position. This allows the user to select a selection candidate in a desired focus position.

Note that the setting bar Fb may not be moved by the user moving the finger U after touching the setting bar Fb with the finger U. Instead, the setting bar Fb may be moved to a desired position in the focus position selection portion DF by the user touching the desired position. Further, a selection candidate for the focus position may not be displayed. Instead, the selection candidate for the focus position closest to the subject in the position touched with the finger U in the screen may be selected.

Further, in the example shown in FIG. 36, the lens unit selection portion DL is located in the upper left corner of the preview image Pv; the diaphragm shape selection portion DA is located in the lower left corner; and the focus position selection portion DF is located on the right side. However, the positions of the respective portions are not limited to the above.

Although not shown in the drawing, selection candidates for other development parameters related to white balance, exposure correction, and the like may be displayed as well as the lens unit selection portion DL, the diaphragm shape selection portion DA, the focus position selection portion DF, and the like.

Further, the display unit 531 is integrated with a touch panel in the fifth embodiment. However, if the display unit is not integrated with the touch panel, the user moves a pointer to be displayed on a screen by an operation of a mouse or the like, which is not shown, to thereby perform the selection operation corresponding to the touch operation.

<Flow of Virtual Lens Processing>

Figure 37:
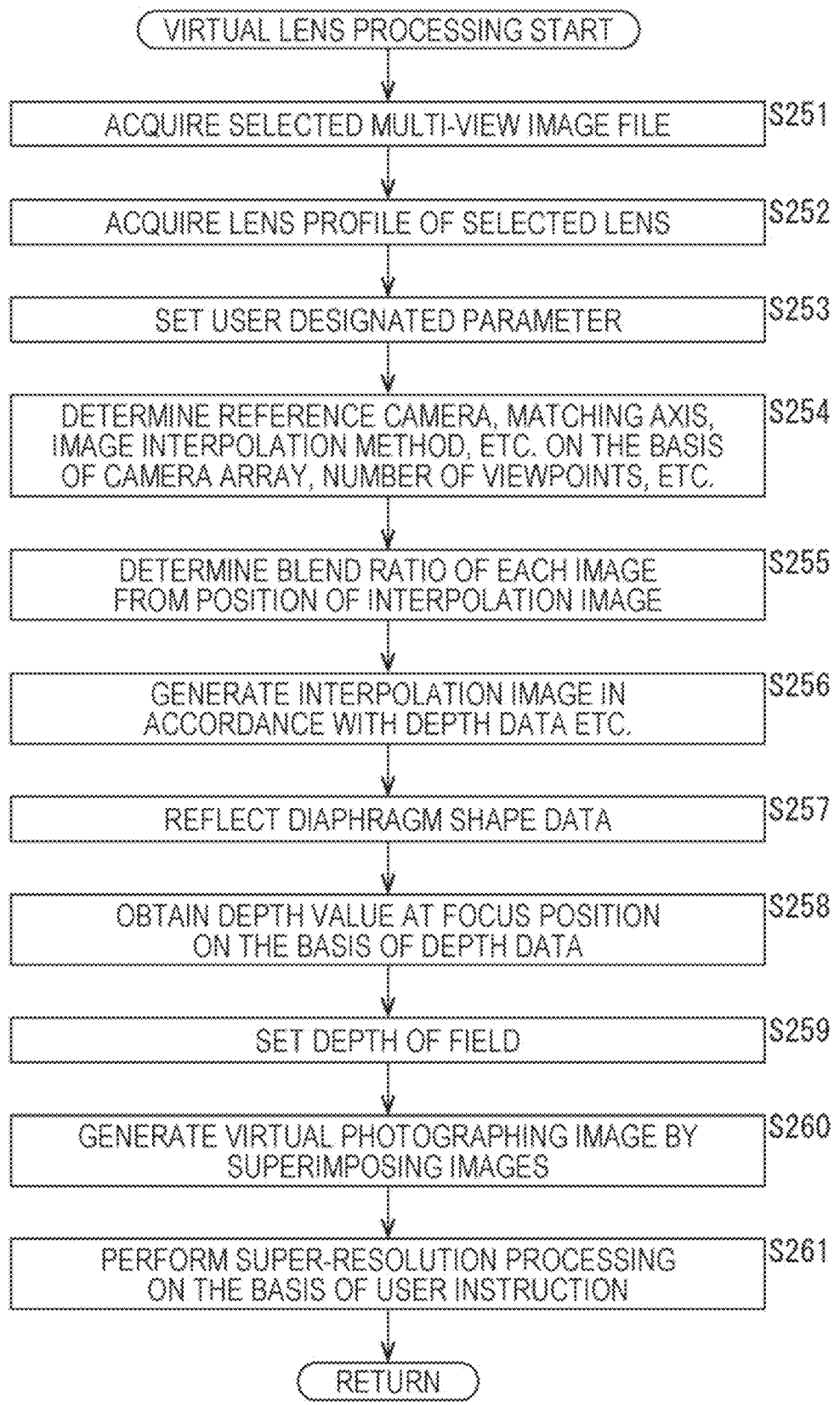
FIG. 37 is a flowchart illustrating an example of a flow of virtual lens processing.

Next, an example of the detailed flow of virtual lens processing executed in step S229 of FIG. 35 will be described with reference to the flowchart in FIG. 37.

When the virtual lens processing is started, the virtual lens processing unit 526 acquires the selected multi-view image file from the storage unit 263 in step S251. In step S252, the virtual lens processing unit 526 acquires the profile information of the selected lens from the storage unit 263.

Note that the site where multi-view image files and profile information are stored and managed is optional, and may not be the storage unit 263. For example, multi-view image files and profile information may be stored and managed in a device other than the server 202, such as the terminal device 401. In this case, the virtual lens processing unit 526 controls the communication unit 264, for example, to acquire a multi-view image file and profile information from the device in which the file and the information are stored. Note that the site where multi-view image files are stored and the site where profile information is stored may differ from each other.

Profile information is formed with parameters for reproducing the optical effects of a virtual optical system, and is unique to the virtual optical system. The profile information includes the point spread function (PSF) data of the respective colors of RGB, a diaphragm shape, interpolation number designation information, and the like.

The PSF data is also referred to as a point spread function or a point-image distribution function, and is the function that indicates responses of the virtual lens included in the virtual optical system to a point light source. In other words, the PSF data is the data that indicates the influence of a virtual lens on beams of the respective colors of RGB passing through the virtual lens. A of FIG. 38 shows an example of the PSF data. In this example, the PSF data in accordance with distances to the in-focus portion (or the point light source) are shown for the respective colors (in the respective rows).

The diaphragm shape is the information that indicates the shape of the virtual diaphragm included in the virtual optical system. This diaphragm shape may be an actually existing diaphragm shape, or may be an unrealistic shape such as a round shape, the shape of a star, or the shape of an X shown on the left side in B of FIG. 38. Note that the diaphragm shape can be designated by any method. For example, a predetermined shape may be designated by identification information (ID) or the like. Further, the diaphragm shape may be expressed by, for example, an intensity distribution 542 as shown on the right side in B of FIG. 38. The size of the intensity distribution (the number of intensities) depends on the number of interpolation images (the interpolation number) designated by the interpolation number designation information. Assuming that the interpolation number is N, for example, the diaphragm shape is expressed by the N×N intensity distribution 542.

The interpolation number designation information is the information that designates the number of interpolation images to be generated when a virtual captured image is generated. That is, in the virtual lens processing, the virtual lens processing unit 526 generates a number of interpolation images as designated by the interpolation number designation information. As the number of interpolation images is larger, a virtual captured image with higher definition can be obtained. Generally, as the virtual lens has a higher grade (higher performance), the number of interpolation images is larger.

As described above, the lens profile information is formed with the information that indicates the features of the virtual lens. Note that the contents of the lens profile information are optional. Some of the above-mentioned pieces of information may be omitted, or information other than the above-mentioned information may be included. For example, the physical design information about the lens to be used for emulating the virtual lens may be included in the lens profile information.

Figure 35:
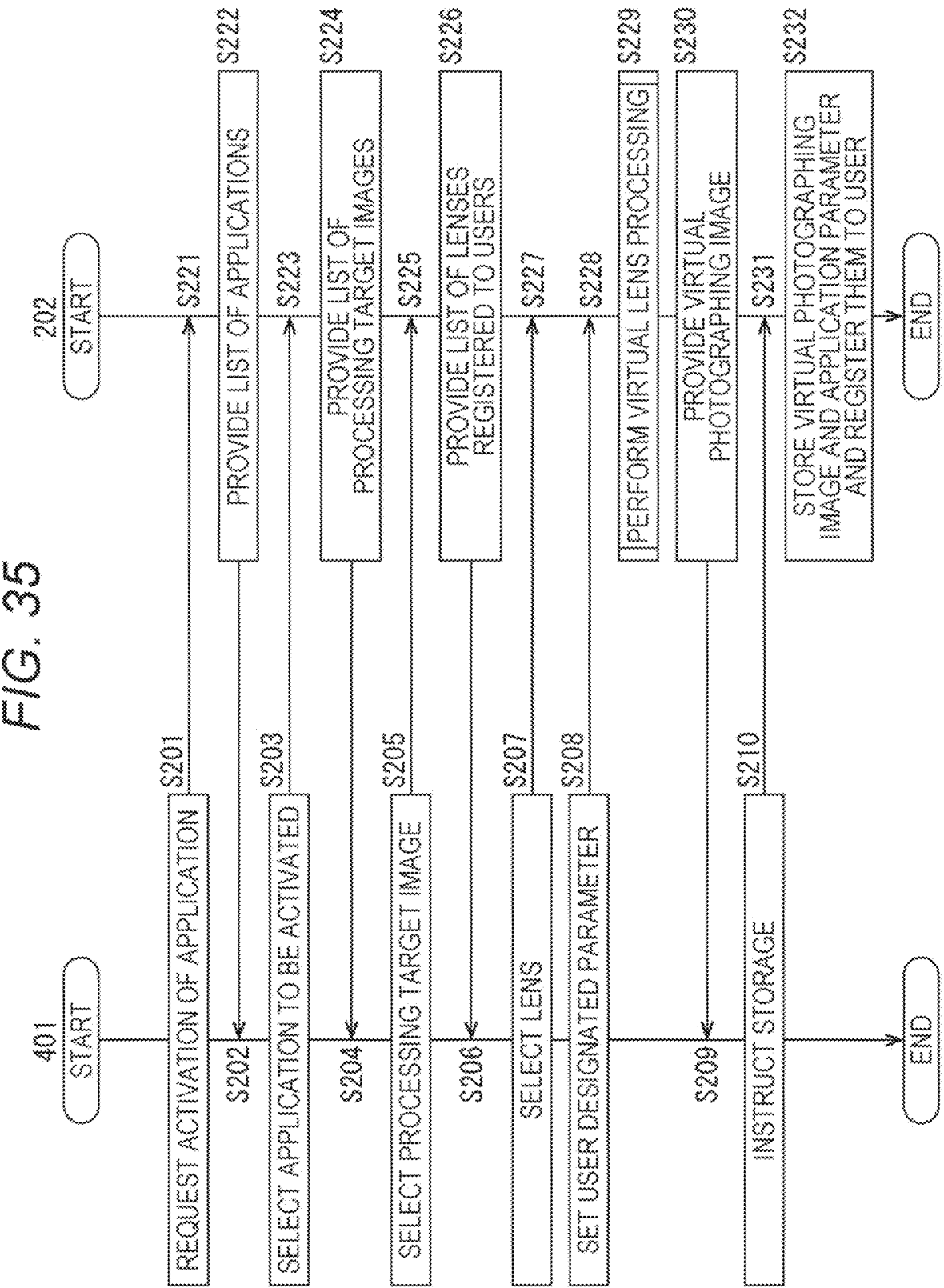
FIG. 35 is a flowchart showing still one more example of a flow of multi-view image utilization service provision processing.

Referring again to FIG. 37, in step S253, the virtual lens processing unit 526 sets the user designated parameters acquired in step S228 shown in FIG. 35.

The user designated parameters are imaging-related parameters that have values designated by the user. In accordance with the user designated parameters, the virtual lens processing unit 526 generates a virtual captured image. For example, the user designated parameters include focusing position designation information, a depth-of-field designation information, super-resolution processing execution instruction information, and the like.

The focusing position designation information (focus position designation information) is the information that designates an area (or a point) where the subject on which the focus is to be put is located in the captured image. When the user designates any position in the captured image as the focusing position, a virtual captured image is generated so that the focal point is on (the distance of) the subject located in the focusing position.

Further, the depth-of-field designation information is the information that designates a depth of field (a diaphragm size). Furthermore, the super-resolution processing execution instruction information is the information that includes instructions related to super-resolution processing, such as an instruction as to whether super-resolution processing is to be performed when the captured images of the multi-view image are superimposed on one another to generate a virtual captured image, and an instruction as to in which area and to what extent the super-resolution processing is to be performed if it is determined to be performed. The super-resolution processing at the time of the superimposition of the captured images of the multi-view image is performed on the basis of the super-resolution processing execution instruction information.

The contents of the user designated parameters are optional, as a matter of course. Some of the above-mentioned pieces of information may be omitted, or information other than the above-mentioned information may be included.

In step S254, the virtual lens processing unit 526 determines the reference camera (reference viewpoint image), the matching axis, the image interpolation method, and the like on the basis of the camera array information, the viewpoint number information, and the like included in the metadata associated with the multi-view image data to be processed.

In step S255, the virtual lens processing unit 526 determines the combination ratios of the respective images to be used in image interpolation (or the respective images to be superimposed) in accordance with the positions of the interpolation images to be generated.

In step S256, the virtual lens processing unit 526 generates interpolation images in accordance with the depth data and the various kinds of parameters that are set in the manner as described above. For example, the virtual lens processing unit 526 generates the interpolation image by superimposing an image of the reference viewpoint determined in step S254 and the images designated by the interpolation method determined in step S254 by using the matching axis determined in step S254, in accordance with the depth data. The virtual lens processing unit 526 generates a number of interpolation images as designated by the interpolation number designation information in the profile information. Note that the interpolation image generation method of the first embodiment described above can be applied to the interpolation image generation in step S256. This makes it possible to generate a high-definition viewpoint interpolation image at high speed.

In step S257, the virtual lens processing unit 526 reflects the data indicating the diaphragm shape of the profile information in each interpolation image.

In step S258, the virtual lens processing unit 526 obtains the depth value of the focusing position (focus position) designated by a user on the basis of the depth data. Specifically, the virtual lens processing unit 526 obtains the depth value (distance to the subject) of the subject at the position (coordinates) designated in the focusing position designation information (focus position designation information) included in the user designated parameter, which is acquired in step S228, for example, of the generated virtual captured image.

In step S259, the virtual lens processing unit 526 sets the depth of field designated by depth-of-field designation information in the user designated parameter.

In step S260, the virtual lens processing unit 526 generates the virtual captured image by overlapping the multi-view image or interpolation image by, for example, repeatedly performing stereo matching. In this case, the virtual lens processing unit 526 reflects PSF data according to the depth data of the virtual lens (the depth value of the subject). Further, the virtual lens processing unit 526 generates a virtual captured image so that the focus is on the depth value (distance) obtained in step S258. Further, the virtual lens processing unit 526 can reflect the shape of the virtual diaphragm in the virtual captured image by reflecting the diaphragm shape data in each interpolation image in step S257. Further, the virtual lens processing unit 526 generates the virtual captured image so as to obtain the depth of field set in step S259.

In step S261, the virtual lens processing unit 526 performs super-resolution processing on the virtual captured image according to super-resolution processing execution instruction information of a user designated parameter. For example, when the super-resolution processing execution instruction information indicates not to perform the super-resolution processing, the virtual lens processing unit 526 does not perform the super-resolution processing. Further, for example, when the super-resolution processing execution instruction information indicates that the super-resolution processing is to be performed, the virtual lens processing unit 526 performs the super-resolution processing.

Note that the super-resolution processing may be performed on the entire virtual captured image, or may be performed on only some of the depth values within a predetermined range including the depth value of the focusing position. The super-resolution processing to be performed on an out-of-focus portion of the subject produces little effect (improvement in image quality). Accordingly, the super-resolution processing is performed only on the portion where the focusing position and the depth value match or are approximate to each other, thereby making it possible to reduce the processing load, while reducing image quality degradation. Note that the super-resolution processing execution instruction information may indicate the portion on which the super-resolution processing is performed.

When the processing of step S261 is finished, the virtual lens processing comes to an end, and the process returns to FIG. 35.

By performing the virtual lens processing in the manner as described above, a user can obtain a virtual captured image more easily. Further, the application of the interpolation image generation method of the first embodiment described above makes it possible to generate a high-definition viewpoint interpolation image at high speed.

Note that the virtual lens processing described above may not be performed by the server 202. Instead, the virtual lens processing may be executed in any device. For example, the CPU 221 of the terminal device 401 may include the virtual lens processing unit 526 or the like, and the virtual lens processing may be performed in the terminal device 401. Also in this case, the virtual lens processing can be executed basically in a similar manner to the above-described examples. Note that the information, such as a multi-view image file and profile information of the virtual lens, which is used for virtual lens processing and stored (managed) in the server 202 may be transmitted to the terminal device 401 as appropriate.

As described above, the interpolation image generation method of the first embodiment may be performed by the server or the terminal device in the systems of the second to fifth embodiments. Further, the generated interpolation image may be managed by the server and subjected to image processing and then provided to the terminal device, or may be provided from the server and used for image processing in the terminal device. Alternatively, the generated interpolation image may be managed by the terminal device and subjected to image processing by the terminal, or may be transmitted to the server and processed by the server.

As described above, the application of the first embodiment described above to the second to fifth embodiments provides advantageous effects, such as an advantageous effect of providing a high-quality image to a user at high speed, in addition to the advantageous effects of the second to fifth embodiments.

<6. Others>

The above-described series of processes may be executed by hardware or may be executed by software. In a case where the above-described series of processes are executed by software, the program forming the software is installed from a network or a recording medium.

This recording medium is formed with a removable medium (such as the removable medium 241, the removable medium 271, or the removable medium 431) that is distributed for delivering the program to users independently of the device, and has the program recorded therein, for example, as shown in FIGS. 16, and 18, and 28. This removable medium may be a magnetic disk (including a flexible disk) or an optical disk (including a CD-ROM and a DVD). The removable medium also includes a magneto-optical disk (including a MD (Mini Disc), a semiconductor memory, or the like.

In this case, the program can be installed into a storage unit via an input/output interface when the removable medium is mounted in the drive.

Alternatively, this program can be provided via a wired or wireless transmission medium such as a local area network, the Internet, or digital satellite broadcasting. In this case, the program can be received by the communication unit (e.g., the communication unit 234, the communication unit 264, or the communication unit 424) of each device, and can be installed in the storage unit (e.g., the storage unit 233, the storage unit 263, or the storage unit 423) of each device.

Alternatively, this program can be preliminarily installed in the ROM (e.g., the ROM 222, the ROM 252, or the ROM 412, for example) of each device, and can be installed in the storage unit (e.g., the storage unit 233, the storage unit 263, or the storage unit 423) of each device.

Note that the programs to be executed by the computer may be programs for performing processes in chronological order in accordance with the sequence described in the present specification, or may be programs for performing processes in parallel or performing a process when necessary, such as when there is a call.

Further, in the present specification, the steps written in the programs recorded in a recording medium include not only processes to be performed in chronological order in accordance with the sequence described herein, but also processes to be executed in parallel or individually if the processes are not necessarily executed in chronological order.

Further, in the present specification, a system means an entire device composed of a plurality of devices.

Further, in the above-described examples, any configuration described as one device (or one processing unit) may be divided into a plurality of devices (or processing units). On the contrary, any configuration described as a plurality of devices (or processing units) may be combined to form one device (or one processing unit). Also, it is possible to add a configuration other than the above-described ones to the configuration of any of the devices (or any of the processing units), as a matter of course. Further, as long as the configuration and operation of the entire system remain the same, part of the configuration of a device (or a processing unit) may be incorporated into another device (or another processing unit). That is, the present technology is not limited to the above embodiments and can be modified in various ways without departing from the gist of the present technology.

Preferred embodiments of the present disclosure have been described in detail above with reference to the accompanying drawings, but the present disclosure is not limited to these embodiments. It is obvious to a person with common knowledge in the technical field to which the present disclosure belongs to conceive and obtain various altered examples and modified examples within the scope of the technical idea described in the claims. It can be understood that these examples also belong to the technical scope of the present disclosure, as a matter of course.

Note that the present technology can have the following configuration as well.

(1) An image processing apparatus including:
a reconstruction processing unit that performs processing of reconstructing a space in which multi-view images are photographed in accordance with depth information of a subject in the multi-view images; and
an interpolation image generation unit that generates an interpolation image by changing an inclination of the space reconstructed by the reconstruction processing unit and sampling the reconstructed space.

(2) The image processing apparatus according to (1), wherein the reconstruction processing unit performs processing of reconstructing the space in which the multi-view images are photographed according to a pixel shift amount of the subject between the multi-view images as the depth information.

(3) The image processing apparatus according to (1) or (2), wherein the reconstruction processing unit performs processing of reconstructing the space by reflecting a luminance and a pixel shift amount of another viewpoint in a space formed of a luminance of a reference viewpoint and the pixel shift amount.

(4) The image processing apparatus according to any of (1) to (3), wherein when a value is already set in the same coordinates, the reconstruction processing unit performs processing of reconstructing the space by storing an average value of RGB values as values of the coordinates.

(5) The image processing apparatus according to any of (1) to (4), wherein the reconstructed space has a value indicating a position where an occlusion occurs at any viewpoint.

(6) The image processing apparatus according to any of (1) to (5), wherein the reconstructed space has an average value of the plurality of viewpoints as a value present at the plurality of viewpoints.

(7) The image processing apparatus according to any of (1) to (6), wherein the interpolation image generation unit starts sampling in a descending order of the pixel shift amount in the reconstructed space.

(8) An image processing method including:
performing, by an image processing apparatus, processing of reconstructing a space in which multi-view images are photographed in accordance with depth information of a subject in the multi-view images; and
generating, by the image processing apparatus, an interpolation image by changing an inclination of the reconstructed space and sampling the reconstructed space.

REFERENCE SIGNS LIST

11 Image pickup device
21, 21-L, 21-C, 21-R Camera
22 Disparity calculation unit
23 Interpolation image generation unit
31 Space reconstruction unit
32 Interpolation position setting unit
33 Data search unit
100 Multi-view image utilization service platform
200 Multi-view image utilization service provision system
201 Terminal device
202 Server
221 CPU
236 Image pickup unit
251 CPU
281 Image pickup control unit
282 Metadata generation unit
283 Coding unit
284 Transmission control unit
291 User management unit
292 Acquisition control unit
293 Depth detection unit
294 File generation unit
295 Data management unit
321 Multi-view image file
331 Multi-view image coded data
332 Depth data
333 Metadata
401 Terminal device
402 Application providing server
411 CPU
441 Application purchase processing unit
451 User management unit
452 Application sales processing unit
453 Data management unit
461 Application provision processing unit 511 User instruction acceptance processing unit
512 Display control unit
513 Transmission control unit
521 User management unit
522 Application selection processing unit
523 Image selection processing unit
524 Lens selection processing unit
525 User designated parameter setting processing unit
526 Virtual lens processing unit
527 Data management unit

The invention claimed is:

1. An image processing apparatus, comprising:
a central processing unit (CPU) configured to:
reflect a first value of coordinates in a space;
determine an RGB value is set in the same coordinates in the space;
store, based on the determination, an average value of the RGB value and the first value as a second value of the coordinates;
reconstruct, based on the stored average value, a photographing space that comprises a first luminance of a first viewpoint and a first pixel shift amount of the first viewpoint in the space, wherein
the space comprises a second luminance of a reference viewpoint and a second pixel shift amount of a subject between multi-view images, and
the multi-view images are photographed in the photographing space;
change an inclination of the reconstructed photographing space;
sample, in a descending order of the second pixel shift amount, the reconstructed photographing space at the changed inclination; and
generate an interpolation image based on the change of the inclination of the reconstructed photographing space and the sampled reconstructed photographing space.

2. The image processing apparatus according to claim 1, wherein the reconstructed photographing space comprises a third value indicating a position where an occlusion occurs at any viewpoint.

3. The image processing apparatus according to claim 1, wherein the reconstructed photographing space comprises an average value of a plurality of viewpoints as a third value present at the plurality of viewpoints.

4. The image processing apparatus according to claim 1, wherein the CPU is further configured to:
change the inclination of the reconstructed photographing space to $1/\alpha$, wherein $\alpha$ is a distance between the reference viewpoint and a second viewpoint; and
sample the reconstructed photographing space at the inclination of $1/\alpha$.

5. An image processing method, comprising:
in an image processing apparatus:
reflecting a first value of coordinates in a space;
determining an RGB value is set in the same coordinates in the space;
storing, based on the determination, an average value of the RGB value and the first value as a second value of the coordinates;
reconstructing, based on the stored average value, a photographing space that comprises a first luminance of a viewpoint and a first pixel shift amount of the viewpoint in the space, wherein
the space comprises a second luminance of a reference viewpoint and a second pixel shift amount of a subject between multi-view images, and
the multi-view images are photographed in the photographing space;
changing an inclination of the reconstructed photographing space;
sampling, in a descending order of the second pixel shift amount, the reconstructed photographing space at the changed inclination; and
generating an interpolation image based on the change of the inclination of the reconstructed photographing space and the sampled reconstructed photographing space.

* * * * *